United States Patent
Redfern et al.

(10) Patent No.: US 10,817,587 B2
(45) Date of Patent: Oct. 27, 2020

(54) RECONFIGURABLE MATRIX MULTIPLIER SYSTEM AND METHOD

(71) Applicant: TEXAS INSTRUMENTS INCORPORATED, Dallas, TX (US)

(72) Inventors: Arthur John Redfern, Plano, TX (US); Donald Edward Steiss, Richardson, TX (US); Timothy David Anderson, University Park, TX (US); Kai Chirca, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 8 days.

(21) Appl. No.: 15/905,250

(22) Filed: Feb. 26, 2018

(65) Prior Publication Data

US 2018/0246855 A1    Aug. 30, 2018

Related U.S. Application Data

(60) Provisional application No. 62/465,620, filed on Mar. 1, 2017, provisional application No. 62/464,964, filed
(Continued)

(51) Int. Cl.
*G06F 17/16* (2006.01)
(52) U.S. Cl.
CPC .................. *G06F 17/16* (2013.01)
(58) Field of Classification Search
CPC ....................................................... G06F 17/16
See application file for complete search history.

(56) References Cited

U.S. PATENT DOCUMENTS

| 4,897,717 A | 1/1990 | Hamilton et al. |
| 5,099,447 A | 3/1992 | Myszewski |

(Continued)

OTHER PUBLICATIONS

Notification of Transmittal of the International Search Report and the Written Opinion of the International Searching Authority, or the Declaration; PCT/US 2018/019746; dated Jan. 31, 2019; 8 pages.
(Continued)

*Primary Examiner* — Chuong D Ngo
(74) *Attorney, Agent, or Firm* — Ebby Abraham; Charles A. Brill; Frank D. Cimino

(57) ABSTRACT

A reconfigurable matrix multiplier (RMM) system/method allowing tight or loose coupling to supervisory control processor application control logic (ACL) in a system-on-a-chip (SOC) environment is disclosed. The RMM provides for C=A*B matrix multiplication operations having A-multiplier-matrix (AMM), B-multiplicand-matrix (BMM), and C-product-matrix (CPM), as well as C=A*B+D operations in which D-summation-matrix (DSM) represents the result of a previous multiplication operation or another previously defined matrix. The RMM provides for additional CPM LOAD/STORE paths allowing overlapping of compute/data transfer operations and provides for CPM data feedback to the AMM or BMM operand inputs from a previously calculated CPM result. The RMM anticipates the use of 8, 16, and 32-bit operand reconfigurable matrix datum in conjunction with a typical external memory bus data width of 512 bits and an instruction control unit (ICU) implemented using a series of RMM configuration words (RCW) and streaming opcode functions (SOF).

20 Claims, 49 Drawing Sheets

Related U.S. Application Data on Feb. 28, 2017, provisional application No. 62/464,954, filed on Feb. 28, 2017.

(56) References Cited

U.S. PATENT DOCUMENTS

| | | | |
|---|---|---|---|
| 5,745,793 | A | 4/1998 | Atsatt et al. |
| 5,870,568 | A | 2/1999 | Culkey et al. |
| 5,982,375 | A | 11/1999 | Nelson et al. |
| 8,301,749 | B1 | 10/2012 | Finklestein et al. |
| 9,606,803 | B2 | 3/2017 | Anderson et al. |
| 9,645,974 | B1 * | 5/2017 | Patil .................. G06F 17/16 |
| 10,114,613 | B2 | 10/2018 | Bekas et al. |
| 2002/0191692 | A1 | 12/2002 | Fallon et al. |
| 2004/0136316 | A1 | 7/2004 | Kwak et al. |
| 2009/0300091 | A1 | 12/2009 | Brokenshire et al. |
| 2011/0153707 | A1 * | 6/2011 | Ginzburg ............. G06F 9/3001 708/523 |
| 2012/0011348 | A1 | 1/2012 | Eichenberger et al. |
| 2012/0072917 | A1 | 3/2012 | Boldyrev et al. |
| 2012/0140814 | A1 | 6/2012 | Sole Rojals et al. |
| 2012/0251013 | A1 | 10/2012 | Porikli |
| 2012/0268298 | A1 | 10/2012 | Oh |
| 2013/0262548 | A1 * | 10/2013 | Ge ...................... G06F 17/16 708/520 |
| 2014/0167987 | A1 | 6/2014 | Pell et al. |
| 2014/0365548 | A1 * | 12/2014 | Mortensen ........... G06F 9/3001 708/523 |
| 2016/0373158 | A1 | 12/2016 | Ardalan |
| 2017/0139710 | A1 | 5/2017 | Zbiciak |
| 2017/0153890 | A1 | 6/2017 | Anderson et al. |
| 2017/0153959 | A1 | 6/2017 | Zbiciak |
| 2017/0168898 | A1 | 6/2017 | Zbiciak et al. |
| 2017/0249150 | A1 | 8/2017 | Zbiciak et al. |
| 2017/0308381 | A1 | 10/2017 | Zbiciak |
| 2019/0266218 | A1 | 8/2019 | Scott et al. |

OTHER PUBLICATIONS

Inotification of Transmittal of the International Search Report and the Written Opinion of the International Searching Authority, or the Declaration; PCT/US 2018/020462; dated Aug. 9, 2018, 6 pages.

Notification of Transmittal of the International Search Report and the Written Opinion of the International Searching Authority, or the Declaration; PCT/US 2018/020283; dated Aug. 23, 2018, 8 pages.

Extended European Search Report; App. Pat.No. 18760733.8-1231/3590048 PCT/US2018020462; dated Feb. 4, 2020; 8 pages.

Utku Aydoinat, et al."An Open CL(TM) Deep Learning Accelerator on Arria 10", arxiv.org,Cornell University Library, 201 Olin Library, Cornell University Ithaca, NY 14853, Jan. 13, 2017, XP080741254.

Hussain Tassadaq, et al."PPMC: A Program Pattern Based Mwmory Controller", Mar. 19, 2012, International Conference on Financial Cryptography and Data Security; [Lecture Notes in Computer Science; Lect. Noptes Computer], Springer, Berlin,Heidelberg, pp. 89-101, XP047379471, ISBN: 978-3-642-17318-9.

Chen Zhang et al."Optinrnizing FPGA-based Accelerator Design for Deep Convolutional Neural Networks", Proceedings of the 2015 ACM/SIGDA International Symposium of Field-Programmable Gate Arrays,FPGA,15, Feb. 22, 2015, pp. 161-170, XP055265150, New, NY, USA, DOI: 10.1145/2684746.2689060, ISBN:978-45033315-3.

* cited by examiner

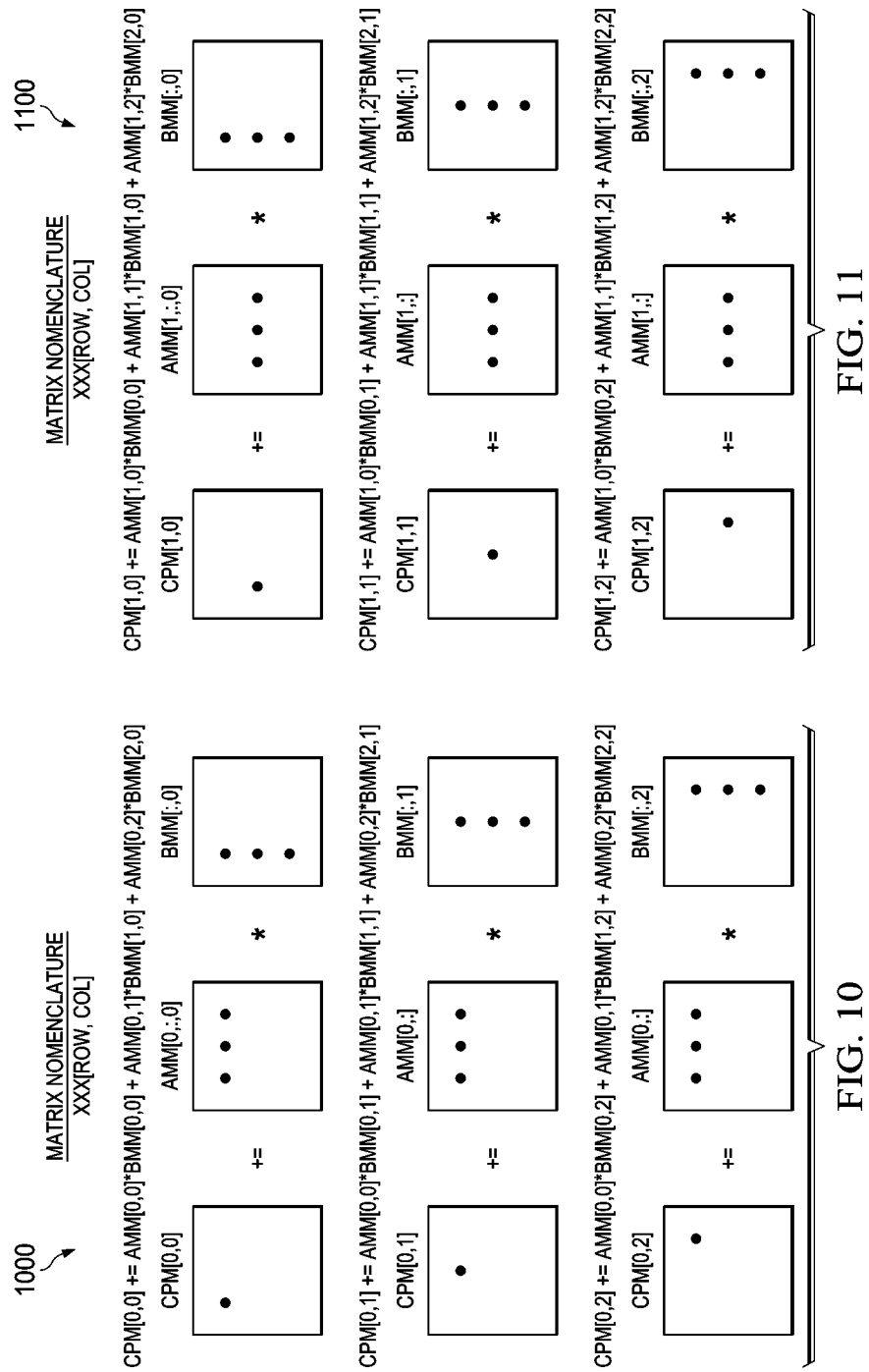

1200

MATRIX NOMENCLATURE
XXX[ROW, COL]

CPM[2,0] += AMM[2,0]*BMM[0,0] + AMM[2,1]*BMM[1,0] + AMM[2,2]*BMM[2,0]

CPM[2,0]  +=  AMM[2,:,0]  *  BMM[:,0]

CPM[2,1] += AMM[2,0]*BMM[0,1] + AMM[2,1]*BMM[1,1] + AMM[2,2]*BMM[2,1]

CPM[2,1]  +=  AMM[2,:]  *  BMM[:,1]

CPM[2,2] += AMM[2,0]*BMM[0,2] + AMM[2,1]*BMM[1,2] + AMM[2,2]*BMM[2,2]

CPM[2,2]  +=  AMM[2,:]  *  BMM[:,2]

FIG. 12

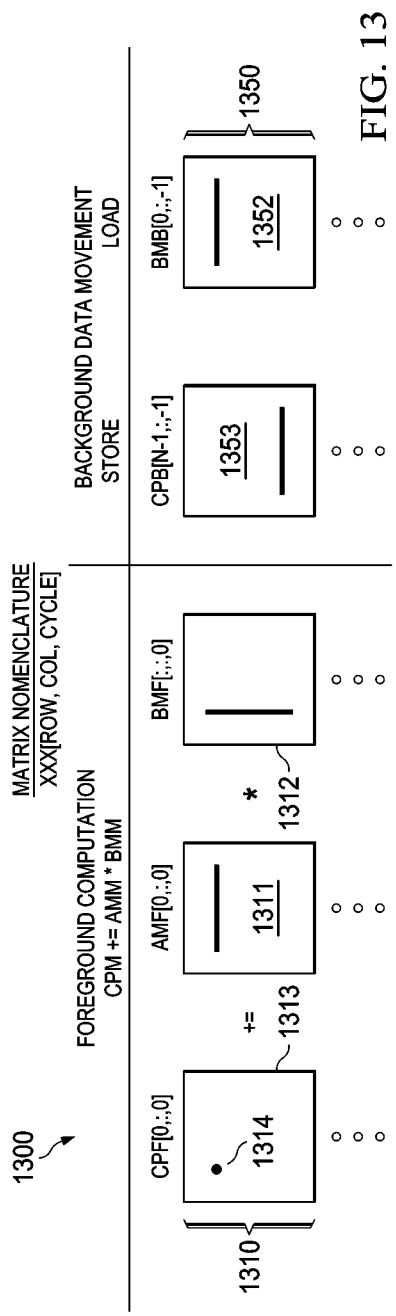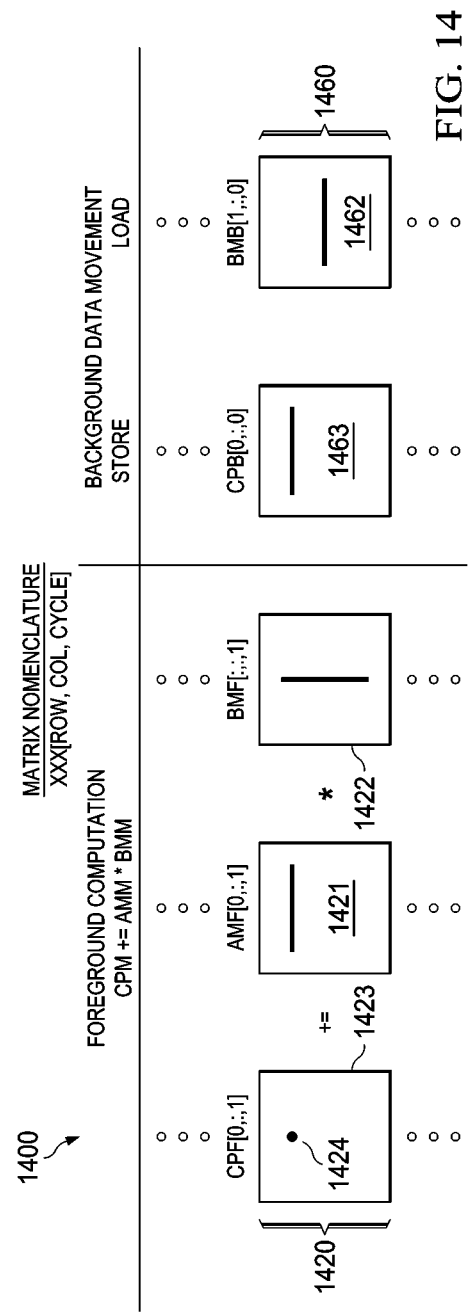

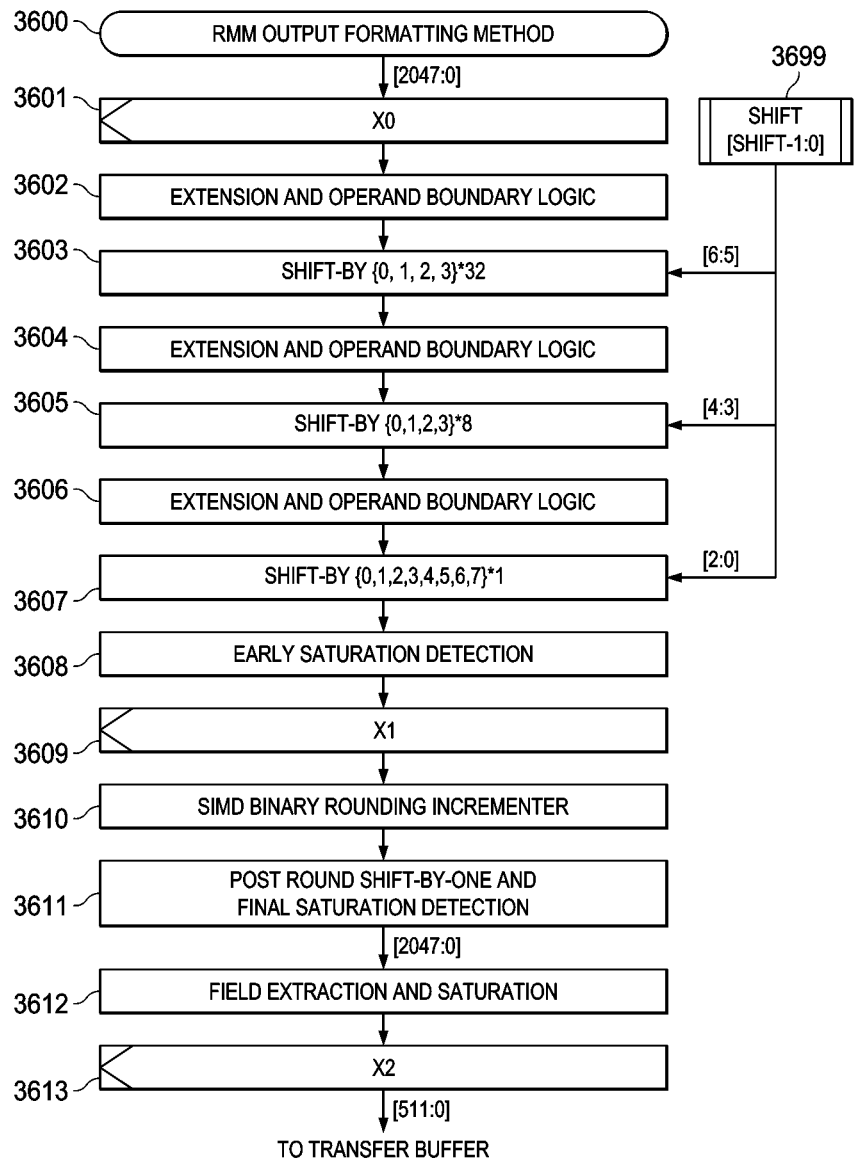

RECONFIGURABLE MATRIX MULTIPLIER SYSTEM AND METHOD

CROSS-REFERENCE TO RELATED APPLICATIONS

This patent application claims benefit under 35 U.S.C. § 119 and incorporates by reference United States Provisional patent application for A METHOD FOR USING A MATRIX MULTIPLICATION ACCELERATOR (MMA) TO IMPLEMENT FUNDAMENTAL COMPUTATIONAL PRIMITIVES by inventors Arthur John Redfern, Timothy David Anderson, Kai (nmn) Chirca, Chenchi Eric Luo, and Zhenhua (nmn) Yu, filed electronically with the USPTO on Mar. 1, 2017, with Ser. No. 62/465,620.

This patent application claims benefit under 35 U.S.C. § 119 and incorporates by reference United States Provisional patent application for A FIXED POINT MATRIX MULTIPLICATION ACCELERATOR (MMA) by inventors Arthur John Redfern, Donald Edward Steiss, Timothy David Anderson, and Kai (nmn) Chirca, filed electronically with the USPTO on Feb. 28, 2017, with Ser. No. 62/464,954.

This patent application claims benefit under 35 U.S.C. § 119 and incorporates by reference United States Provisional patent application for METHODS FOR EFFICIENT CONVOLUTIONAL NEURAL NETWORK (CNN) DATA MOVEMENT by inventors Arthur John Redfern and Asheesh (nmn) Bhardwaj, filed electronically with the USPTO on Feb. 28, 2017, with Ser. No. 62/464,964.

FIELD OF THE DISCLOSURE

The present disclosure relates to hardware implementing matrix multiplication of the forms C=A*B and C=A*B+D wherein the data widths of the A-multiplier-matrix (AMM), B-multiplicand-matrix (BMM), C-product-matrix (CPM), and D-summation-matrix (DSM) may be dynamically reconfigured to interpret data contained within a fixed external memory data bus (EMB).

BACKGROUND OF THE DISCLOSURE

The present disclosure pertains to a reconfigurable matrix multiplier (RMM) system and method implementing fixed point matrix multiplication. The RMM provides for C=A*B matrix multiplication operations having A-multiplier-matrix (AMM), B-multiplicand-matrix (BMM), and C-product-matrix (CPM), as well as C=A*B+D operations in which D-summation-matrix (DSM) represents the result of a previous multiplication operation or another previously defined matrix. The multi-bit input data (A, B, D) may be interpreted as replicated within a fixed external memory data bus in a reconfigurable manner, thus allowing matrix multiplier hardware reuse matched to matrix scaling that starts from a baseline of lowest precision and for every doubling of precision:
  The C matrix size reduces by one-half in each dimension;
  Matrix Multiplier-Accumulators (MACs) scale by one-fourth enabling efficient matrix multiplier reuse;
  C matrix accumulator precision remains at four times that of input data (A, B, D) precision irrespective of the input data type (in some embodiments the C matrix accumulator precision remains at a bipolygonal multiple of that of the input data (A, B, D) precision);
  One-half of previously used B matrix and C matrix rows may be freed up and can be used for alternative algorithms.

The present disclosure also anticipates that the C accumulator matrix may include an additional LOAD-STORE data path that:
  Improves performance for long convolutions and C=A*B+D operations;
  In the case of 8-bit input data includes the use of an additional C matrix memory;
  In the cases of 16-bit and 32-bit input data may include an extra C matrix memory that can be implemented or extra rows of existing two C matrix memories may be implemented.

Furthermore, the ability of the present disclosure to dynamically reconfigure the interpretation of a fixed external memory data bus (EMB) as having different scalar data bit widths allows a single multiplication/accumulation processor to both reuse multiplication hardware but also permit changing the point scalar resolution dynamically thus allowing a variety of data interpretations to occur within the context of a single data source.

BRIEF DESCRIPTION OF THE DRAWINGS

For a fuller understanding of the advantages provided by the disclosure, reference should be made to the following detailed description together with the accompanying drawings wherein:

FIG. 10 illustrates detailed computations of a typical matrix multiplication/accumulation operation for row 0 of a 3×3 matrix;

FIG. 11 illustrates detailed computations of a typical matrix multiplication/accumulation operation for row 1 of a 3×3 matrix;

FIG. 12 illustrates detailed computations of a typical matrix multiplication/accumulation operation for row 2 of a 3×3 matrix;

FIG. 13 illustrates an exemplary foreground/background execution/transfer STAGE 0 initial timing diagram depicting an embodiment in which the RMM may be pipelined and overlapped such that a multiplication/accumulation compute cycle may be overlapped with a data transfer between a local memory bus (LMB) and an external memory bus (EMB);

FIG. 14 illustrates an exemplary foreground/background execution/transfer STAGE 1 timing diagram depicting an embodiment in which the RMM may be pipelined and overlapped such that a multiplication/accumulation compute cycle may be overlapped with a data transfer between a local memory bus (LMB) and an external memory bus (EMB);

FIG. 36 illustrates a flowchart depicting an RMM output formatting method embodiment that permits reconfigurable output formatting as data is transferred from the CPM product result registers to the EMB;

DETAILED DESCRIPTION OF THE DISCLOSURE

Figure 1:
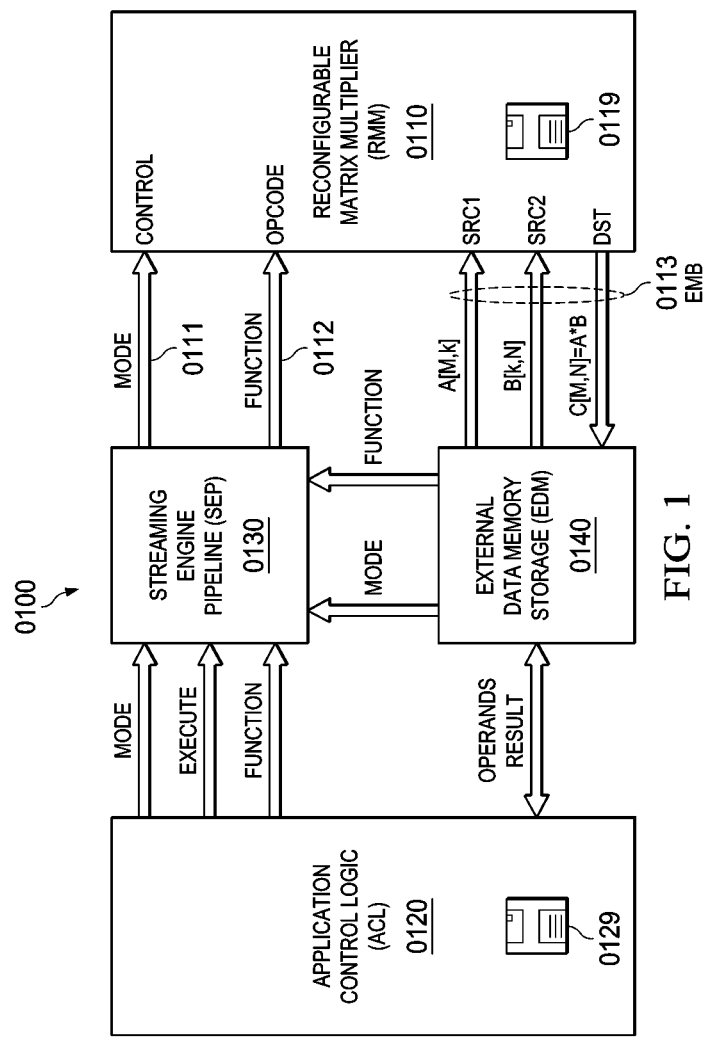
FIG. 1 illustrates a system block diagram of an embodiment of the present disclosure.

The numerous innovative teachings of the present application will be described with particular reference to the embodiments, wherein these innovative teachings are advantageously applied to the particular problems of a RECONFIGURABLE MATRIX MULTIPLIER SYSTEM AND METHOD. However, it should be understood that this embodiment is only one example of the many advantageous uses of the innovative teachings herein. In general, statements made in the specification of the present application do not necessarily limit any of the various claimed embodiments. Moreover, some statements may apply to some inventive features but not to others.

Matrix Nomenclature

The present disclosure relates to the generation of a matrix multiplication product of the form C=A*B+D. Within this document the variables in this function will be equivalently identified as "A" or the A-multiplier-matrix (AMM), "B" or the B-multiplicand-matrix (BMM), "C" or the C-product-matrix (CPM), and "D" or the D-summation-matrix (DSM).

Matrix Ranges

References to matrices in the form XXX[row,col] may refer to all column elements on a given row by XXX[row,:] and all row elements on a given column by XXX[:,col]. Ranges of row/column may be represented by XXX[r1:r2, c1:c2] and represent the submatrix of XXX from row r1 to r2 and column c1 to c2.

Matrix not Limitive

Within the context of the present system description the term "matrix" should be given a broad definition. In some embodiments, multiplication operations of the form C=A*B or C=A*B+D may be configured such that the A-multiplier-matrix (AMM) is a vector having a single row and a fixed length in bits that is divided into equal-sized individual datum. Thus, the term "matrix" includes single row or single column vectors.

For example, a system configured with fixed 512-bit external memory data busses may be configured with AMM having 512 bits that are divided into 64 8-bit datum, 32 16-bit datum, 16 32-bit datum, 8 64-bit datum, 4 128-bit datum, or 2 256-bit datum depending on the dynamic reconfiguration of the matrix multiplication system.

Matrix Dimensions

The numerical matrix dimensions as provided in this disclosure are only exemplary and do not limit the scope of the claimed invention. Additionally, while many embodiments implement matrix multiplication and/or accumulation using square matrices (having an equal number of rows and columns), this is not a limitation of the claimed disclosure. Furthermore, while the dimensionality of the depicted matrices is of order two (two dimensional), the present disclosure is not limited to matrices having a two dimensional configuration and anticipates higher order matrices having dimensionality greater than two (e.g. CPM[x,y,z], CPM[w, x,y,z], etc.) being supported.

Memory Bus Width

The present disclosure is herein described in many embodiments as having an exemplary data bus width of 512 bits. This exemplary data bus width is not a limitation on the scope of the present disclosure and as a wide variety of data bus widths are anticipated in a variety of application contexts. However, it should be noted that in many embodiments a data bus width corresponding to a power-of-two data bits is considered optimal.

Natural/Counting Numbers

The phrases "natural number", "natural numbers", "counting number", and "counting numbers", and multiples thereof will herein refer to the mathematical set of positive integers greater than zero (1, 2, 3, . . . ).

Polygonal Numbers

The phrases "polygonal number", "polygonal numbers", and multiples thereof are numbers that can be represented as dots that are arranged in the shape of a regular polygon. As used herein, these phrases will refer to the mathematical set of positive integers greater than two (3, 4, 5, . . . ). The definition of polygonal number used herein may be defined alternatively as the set of natural numbers (as defined above) with the integer values of unity (1) and two (2) removed.

Bipolygonal Numbers

The phrases "bipolygonal number", "bipolygonal numbers", and multiples thereof will herein refer to the mathematical set of positive integers greater than unity (2, 3, 4, . . . ). This definition includes the combined set of polygonal integers (3, 4, 5, . . . ) and the positive integer 2. The definition of bipolygonal number used herein may be defined alternatively as the set of natural numbers (as defined above) with the integer value of unity (1) removed.

Power-of-Two Numbers

The phrases "power-of-two", "powers-of-two", and multiples thereof will herein refer to the mathematical set of integers of the form $2^N$ where N is a natural number as defined above.

Bipolygonal-Power-of-Two Numbers

The phrases "bipolygonal-power-of-two", "bipolygonal-powers-of-two", and multiples thereof will herein refer to the mathematical set of integers of the form $2^N$ where N is a bipolygonal number as defined above.

Data Bus Interpretation

The present disclosure anticipates that the multiplication/accumulation operations executed by the RMM may operate on a variety of data types as present on the various external and internal data busses and that the mode/control and/or function/opcode information provided to the RMM may control the interpretation of data retrieved from the EMB and operated on by the RMM. Within this context the following operand data types are anticipated to be supported by the RMM:
  4-bit unsigned integer;
  4-bit signed integer;
  8-bit unsigned integer;
  8-bit signed integer;
  16-bit unsigned integer;
  16-bit signed integer;
  32-bit unsigned integer;
  32-bit signed integer;
  64-bit unsigned integer; and
  64-bit signed integer.

While the accumulation function within the RMM may incorporate a variety of data types, the following accumulation data types are anticipated to be supported by the RMM:
  16-bit unsigned integer for 4-bit unsigned operands;
  16-bit signed integer for 4-bit signed or mixed signed/unsigned operands;
  32-bit unsigned integer for 8-bit unsigned operands;
  32-bit signed integer for 8-bit signed or mixed signed/unsigned operands;
  64-bit unsigned integer for 16-bit unsigned operands;
  64-bit signed integer for 16-bit signed or mixed signed/unsigned operands;
  128-bit unsigned integer for 32-bit unsigned operands;
  128-bit signed integer for 32-bit signed or mixed signed/unsigned operands;
  256-bit unsigned integer for 64-bit unsigned operands; and
  256-bit signed integer for 64-bit signed or mixed signed/unsigned operands.

While output data of the RMM may incorporate a variety of data types, the following output data types are anticipated to be supported by the RMM:
  4-bit unsigned integer;
  4-bit signed integer;
  8-bit unsigned integer;
  8-bit signed integer;
  16-bit unsigned integer;
  16-bit signed integer;
  32-bit unsigned integer;
  32-bit signed integer;
  64-bit unsigned integer;
  64-bit signed integer;
  128-bit unsigned integer;
  128-bit signed integer;
  256-bit unsigned integer; and
  256-bit signed integer.

One skilled in the art will recognize that other data types are possible.

System Overview (0100)

A typical application context overview of the present disclosure is generally depicted in FIG. 1 (0100) wherein a reconfigurable matrix multiplier (RMM) (0110) is interfaced to application control logic (ACL) (0120) via an optional streaming engine pipeline (SEP) (0130) and external data memory storage (EDM) (0140). In situations where the optional streaming engine pipeline (SEP) (0130) is absent, data may be transferred to/from the RMM (0110) via the use of conventional hardware registers accessible by the ACL (0120) and the RMM (0110). The application control logic (ACL) (0120) typically represents central processing unit (CPU) to which the RMM (0110) represents a matrix multiplication accelerator (MMA) that may be tightly or loosely integrated into the operation of the ACL (0120).

The SEP (0130) represents a hardware interface between the ACL (0120) and RMM (0110) that allows RMM (0110) mode/control (0111) and function/opcode (0112) configuration information to be streamed to the RMM (0110) so as to allow continuous operation of the RMM (0110) without the need for further intervention by the ACL (0120). The SEP (0130) may also represent a hardware interface between the EDM (0140) and RMM (0110) that allows RMM (0110) mode/control (0111) and function/opcode (0112) configuration information to be streamed to the EDM (0140) so as to allow continuous operation of the RMM (0110) without the need for further intervention by the ACL (0120) after streaming is initially executed by the ACL (0120). The RMM (0110) mode/control (0111) bus defines how data operated on by the RMM (0110) is to be interpreted and/or formatted and the RMM (0110) function/opcode (0112) bus defines what mathematical operations are to be performed on the data (AMM, BMM, etc.) presented to the RMM (0110). While the external data memory storage (EDM) (0140) is typically a slower form of random access memory (RAM) such as dynamic random access memory (DRAM), this is not necessarily a limitation of the present disclosure but rather a typical application implementation. Typically, but not necessarily, memory contained within the RMM (0110) has faster read/write/access timing than that of the EDM (0140).

The RMM (0110) interfaces to the EDM (0140) via an external memory bus (EMB) (0113) that allows source matrix operands (SRC1, SRC2) to be loaded via one or more data busses (A[M,K]; B[K,N]) and the results (DST) of the matrix multiplication operation (C[M,N]) stored via a common or separate data bus. In typical application contexts the external memory bus (EMB) (0113) may include a single data bus having a data width that is a multiple of the individual datum width associated with the A, B, and C matrices. For example, the EMB (0113) data width might be set at 512 bits with the matrix datum width being set to 8, 16, 32, or 64 bit depending on the mode/control (0111) configuration information that determine the interpretation of data bits within the EMB (0113).

Generally, the present disclosure permits matrices having the form X[rows, cols] to be multiplied together such that C[M,N]=A[M,K]*B[K,N] or C[M,N]=A[M,K]*B[K,N]+D[M,N] where M, N, and K are natural numbers. However, in many embodiments of the present disclosure the A-multiplier-matrix (AMM) is configured as a single row vector such that matrix multiplication of the forms C[1,N]=A[1,K]*B[K,N] or C[1,N]=A[1,K]*B[K,N]+D[1,N] are implemented. Within this context one skilled in the art will recognize that the ACL (0120) in conjunction with the SEP (0130) will be capable of implementing the functions C[M,N]=A[M,K]*B[K,N] or C[M,N]=A[M,K]*B[K,N]+D[M,N] by simply replicating multiplications of the form C[I,N]=A[I,K]*B[K,N] or C[I,N]=A[I,K]*B[K,N]+D[I,N] with the index I set to the appropriate row in the source/destination matrices and multiple multiplications performed as the index I is incremented from 1 to M. As indicated, the RMM (0110) and/or ACL (0120) may incorporate a tangible non-transitory computer readable medium (0119, 0129) that contains machine instructions that are executed by the internal logic of the RMM (0110) and ACL (0120) respectively.

Tightly Coupled Application Context (0200)

Figure 2:
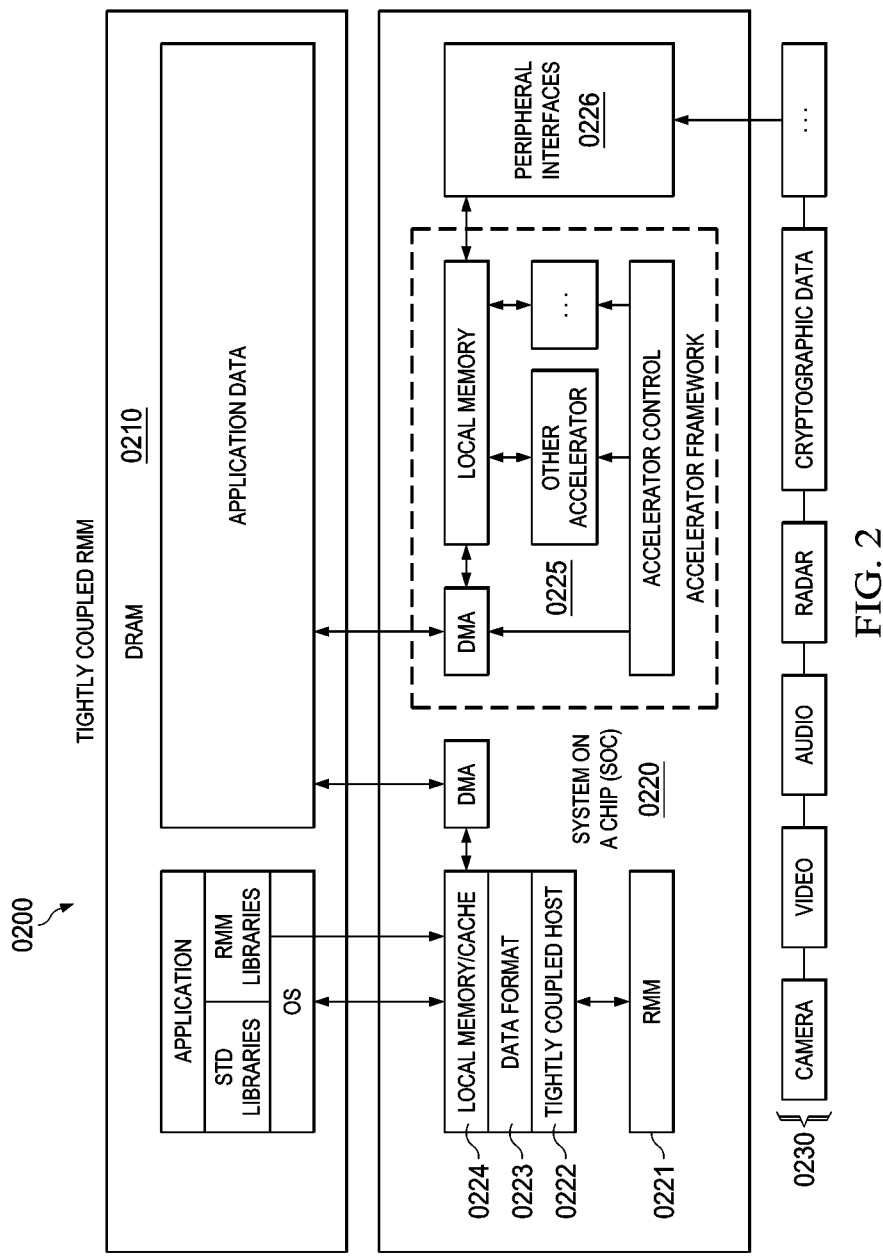
FIG. 2 illustrates a system block diagram of an embodiment of the present disclosure as implemented in a tightly coupled reconfigurable matrix multiplier (RMM) application context.

The present disclosure may be implemented in a variety of application contexts with an example of a tightly coupled application context generally presented in FIG. 2 (0200) wherein DRAM memory (0210) interfaces with a system-on-a-chip (SOC) (0220) incorporating the tightly coupled RMM (0221) that interfaces to a host CPU (0222), formatting hardware (0223), and local memory (0224). This tightly coupled approach may be integrated within an accelerator framework (0225) incorporating other application specific accelerators in combination that support processing of data from a variety of peripheral interfaces (0226) coupled to hardware devices (0230) such as cameras, imaging data, video data, streaming video, audio data, streaming audio, ultrasonic data, ultrasonic sensors, radar data, radar, cryptographic data, encrypted data sources, and other applications requiring high performance multiplication and/or accumulation operations.

Loosely Coupled Application Context (0300)

Figure 3:
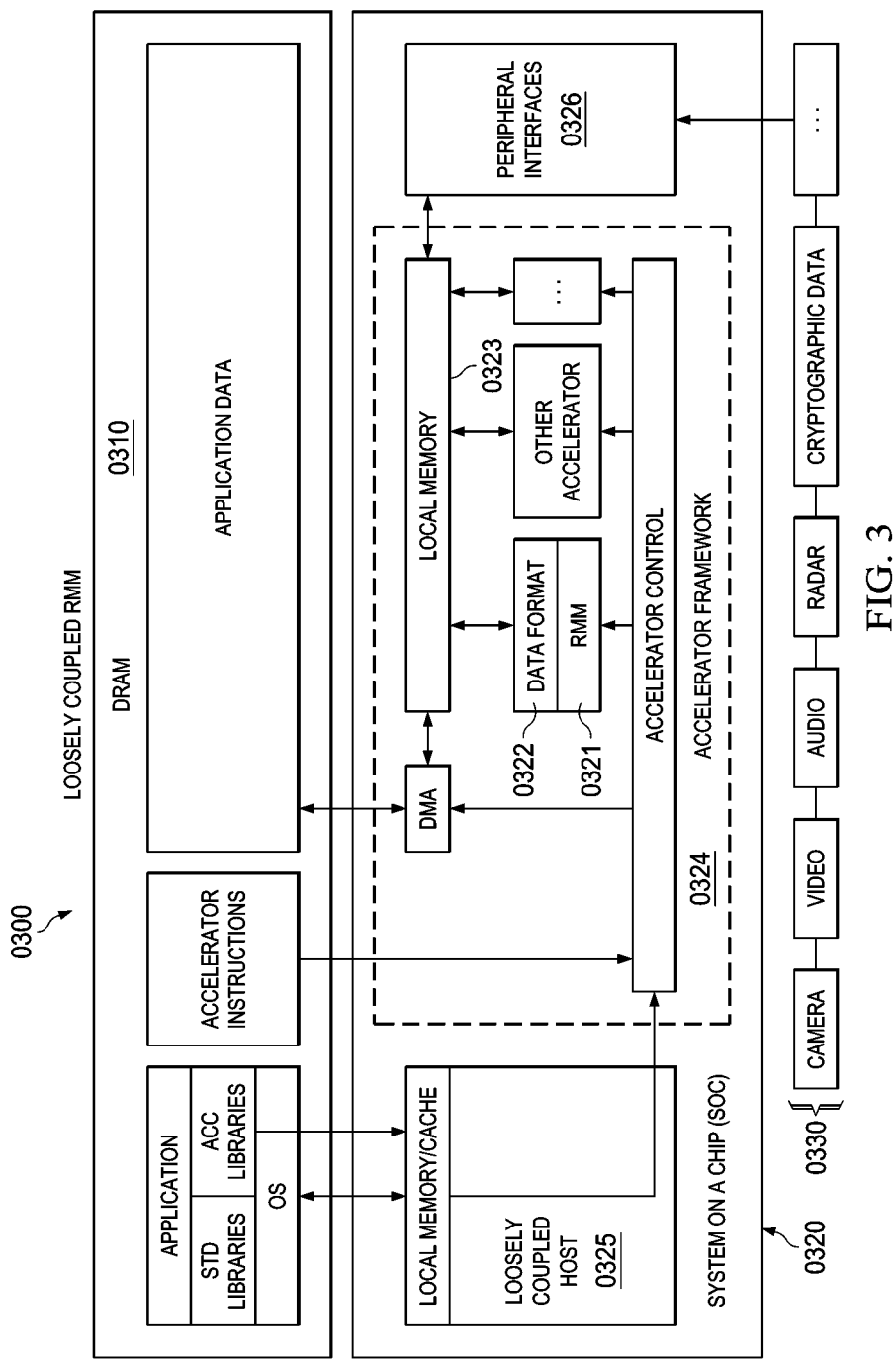
FIG. 3 illustrates a system block diagram of an embodiment of the present disclosure as implemented in a loosely coupled reconfigurable matrix multiplier (RMM) application context.

The present disclosure may be implemented in a variety of application contexts with an example of a loosely coupled application context generally presented in FIG. 3 (0300) wherein DRAM memory (0310) interfaces with a system-on-a-chip (SOC) (0320) incorporating the loosely coupled RMM (0321) that interfaces to formatting hardware (0322) and local memory (0323) within an accelerator framework (0324) that interfaces to a loosely coupled host CPU (0325). The accelerator framework (0324) may incorporate other application specific accelerators in combination with the RMM (0321) that support processing of data from a variety of peripheral interfaces (0326) coupled to hardware devices (0330) such as cameras, imaging data, video data, streaming video, audio data, streaming audio, ultrasonic data, ultrasonic sensors, radar data, radar, cryptographic data, encrypted data sources, and other applications requiring high performance multiplication and/or accumulation operations.

Hardware Interface (0400)

Figure 4:
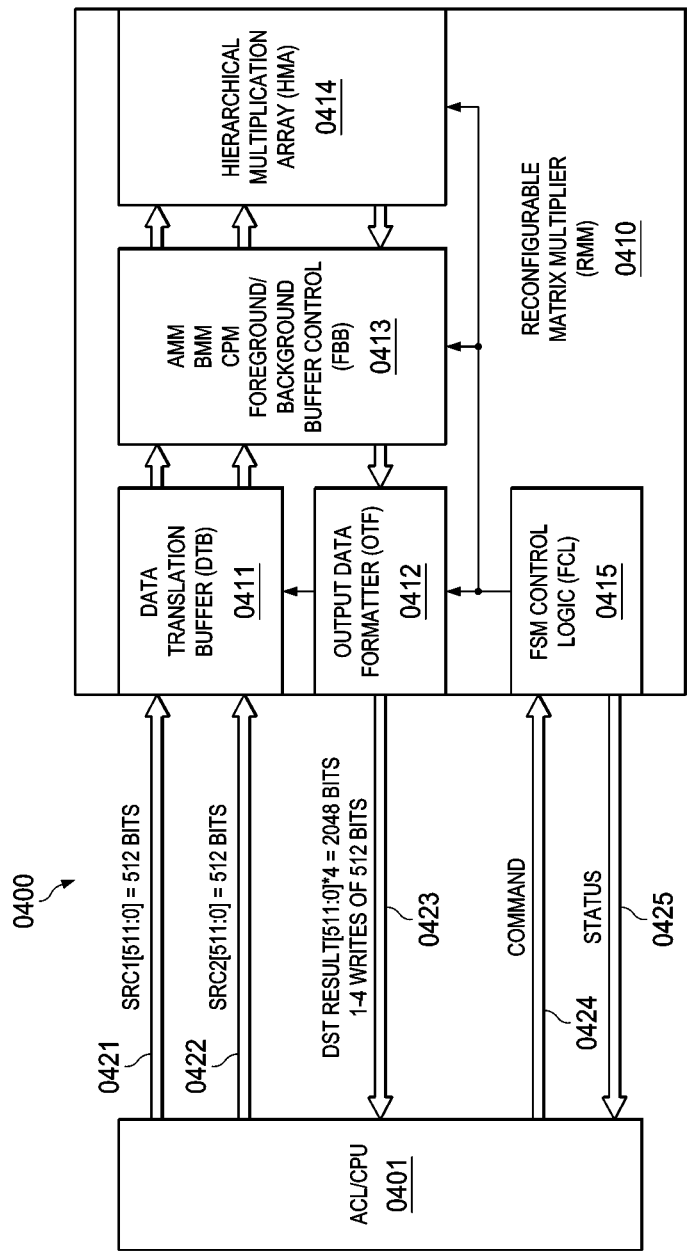
FIG. 4 illustrates a system block diagram of an embodiment of the present disclosure as interfaced to a typical CPU using a 512-bit external memory bus (EMB)

While the present disclosure may be interfaced to external application control logic (ACL) in a wide variety of ways, a hardware interface is generally depicted in FIG. 4 (0400) wherein a general purpose CPU (0401) (which may be a portion of a highly integrated system-on-a-chip (SOC)) interfaces with a RMM (0410) via 512-bit SRC1 (0421) and SRC2 (0422) data busses and which returns product results via a 512-bit DST RESULTS data bus (0423) in one to four write cycles (for a total of 512-2048 bits). While the bus width of 512 bits is employed in many contexts, the bus width for the SRC1 data bus (0421), SRC2 data bus (0422), and the DST RESULTS bus (0423) is arbitrary and not limited by the scope of the present disclosure. For example the DST RESULTS bus (0423) may be wider than that of the SRC1 (0421) and SRC2 (0422) data busses. Furthermore, while these busses are depicted as separate data busses, in some embodiments these busses may be in fact a singular external memory data bus (EMB) connecting the RMM to memory that is physically separate from the RMM. It should be noted that generally speaking if the SRC1 (AMM) multiplier and SRC2 (BMM) multiplicand have a scalar data width of W data bits, the resulting scalar data width of the multiply/accumulated DST (CPM) result will generally be 4*W data bits in many embodiments. However, the number of data bits written back to the resulting DST or EMB data busses may be selected as W, 2*W, or 4*W in many embodiments.

In addition to these data busses the RMM (0410) is provided with COMMAND lines (0424) (which may include mode/control information as well as function/opcode instructions and/or operation initiation control lines) from the CPU (0401). The RMM (0410) may also provide to the CPU (0401) a number of STATUS lines (0425) that indicate the status of the RMM (0410), error conditions, operation completion status indicators, and timing/sequencing control lines. All of these busses (0421, 0422, 0423) and COMMAND (0424)/STATUS (0425) interfaces may optionally incorporate parity and/or error correcting code (ECC, SECDED) functionality to ensure data integrity between the CPU (0401) and the RMM (0410).

Within the RMM (0410) a data translation buffer (DTB) (0411) permits data from the SRC1 (0421), SRC2 (0422) (or equivalent singular EMB) busses to be transformed via a lookup table (LUT) or other function transform before being used internally within the RMM (0410). Similarly, an output data formatter (OTF) (0412) permits results data calculated by the RMM (0410) to be formatted and/or function transformed before being presented to the DST RESULTS (0423) data bus (or equivalently the singular EMB bus). Incoming data translated by the DTB (0411) is stored within registers coordinated by a foreground/background buffer control (FBB) (0413) that provides for data storage for the AMM, BMM, and CPM data that is operated on by a hierarchical multiplication array (HMA) (0414) to produce a CPM-fore dot product result from the multiplication of AMM-fore multiplier and BMM-fore multiplicand registers maintained by the FBB (0413). While computations within the HMA (0414) occur, data is transferred in the background using AMM-back, BMM-back, and CPM-back register sets maintained by the FBB (0413) so as to overlap compute and data transfer cycles within the RMM (0410). Finite state machine (FSM) control logic (0415) coordinates the operation of the major subsystems within the RMM (0410) in response to COMMAND (0424) inputs from the ACL/CPU (0401) and produces a variety of STATUS (0425) responses that may be interrogated by the ACL/CPU (0401).

Lookup Table (LUT) and Data Transformation (0500)-(0700)

Figure 5:
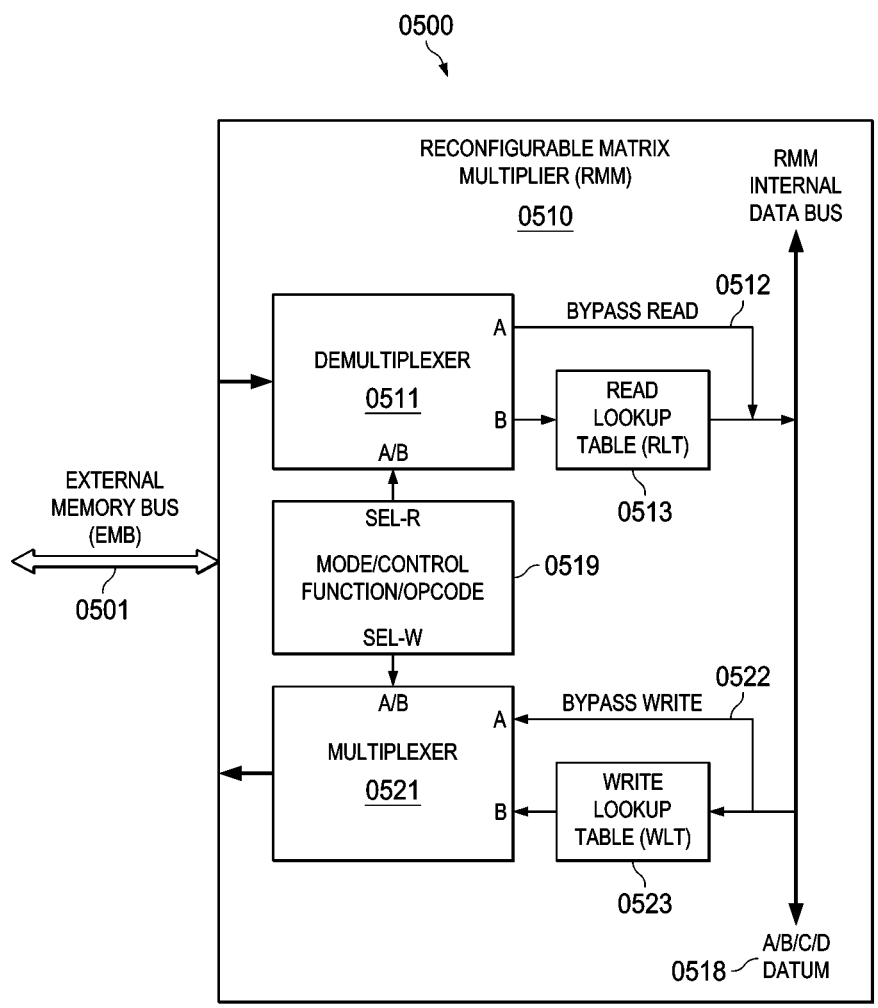
FIG. 5 illustrates a system embodiment employing exemplary read/write lookup tables used in conjunction with a demultiplexer/multiplexer to translate data transferred between the EMB and the RMM.

In some embodiments of the present disclosure a lookup table (LUT) data transformation may be implemented in which data that is read and/or written via an external memory data bus (EMB) may be translated before and/or after multiplication/accumulation operations on the data by the RMM. An example of how this may be typically implemented is generally depicted in FIG. 5 (0500) wherein the RMM (0510) interfaces with an external memory data bus (EMB) (0501). Depending on SEL-R data provided by the RMM (0510) mode/control and/or function/opcode instructions (0519), on read cycles from the EMB (0501) a demultiplexer (0511) selects either a bypass read (0512) or a read lookup translation (RLT) (0513) to transfer data from the EMB (0501) to an internal RMM (0510) A/B/C/D data bus (0518). Similarly, depending on SEL-W data provided by the RMM (0510) mode/control and/or function/opcode instructions (0519), on write cycles to the EMB (0501) a multiplexer (0521) selects either a bypass write (0522) or a write lookup translation (WLT) (0523) to transfer data from the internal RMM (0510) A/B/C/D data bus (0518) to the EMB (0501).

Figure 6:
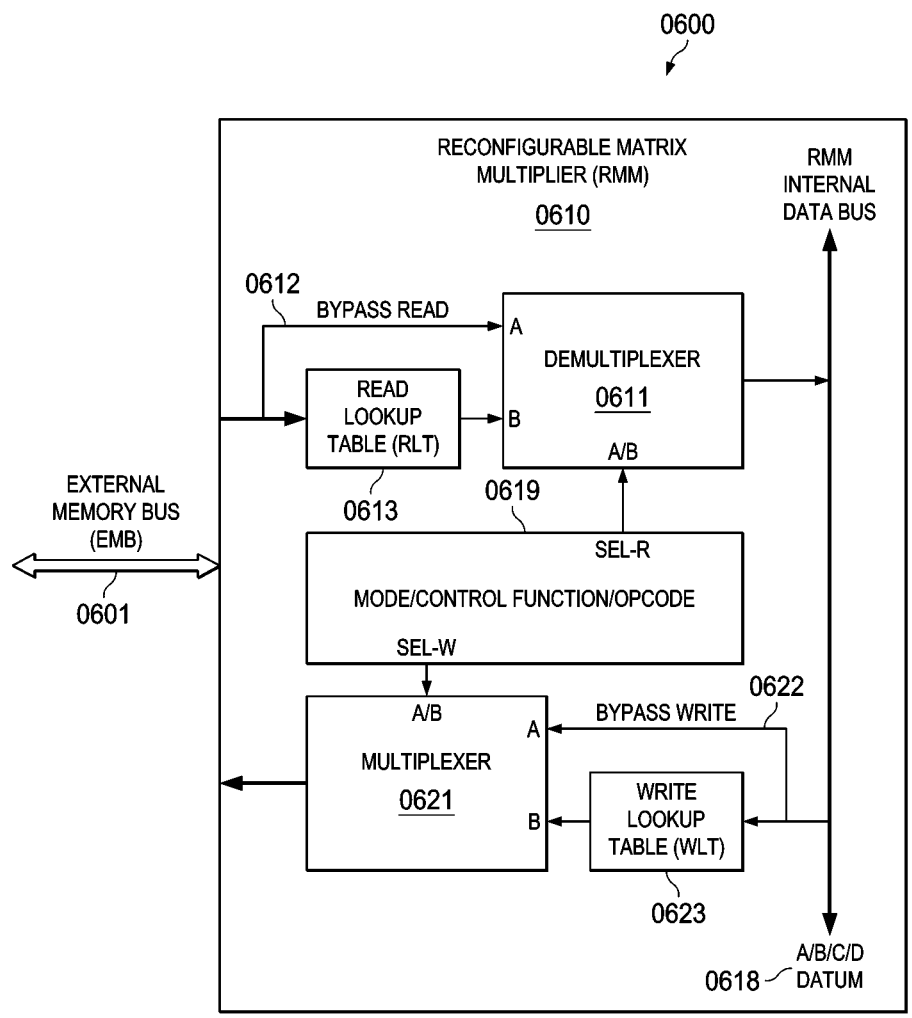
FIG. 6 illustrates a system embodiment employing exemplary read/write lookup tables used in conjunction with multiplexers to translate data transferred between the EMB and the RMM.

The lookup table implementation depicted in FIG. 5 (0500) utilizes a demultiplexer (0511) (with selectable drive outputs) to perform the read data translation and a multiplexer (0521) to perform the write data translation functions. FIG. 6 (0600) depicts a functionally equivalent configuration in which multiplexers are utilized for the read translation (0611) and write translation (0621) functions.

Figure 7:
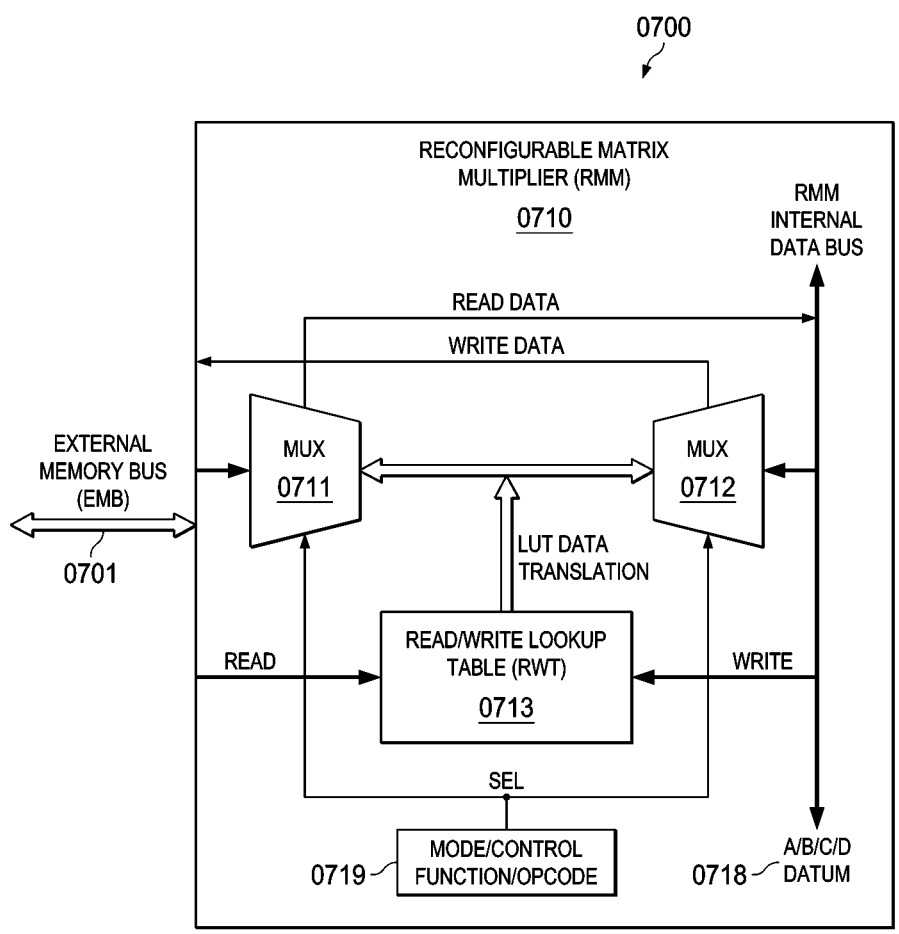
FIG. 7 illustrates a system embodiment employing an exemplary bidirectional lookup table used in conjunction with multiplexers to translate data transferred between the EMB and the RMM.

The translation functions generally depicted in FIG. 5 (0500) and FIG. 6 (0600) may be integrated into a tautological mapping function as generally depicted in FIG. 7 (0700) wherein multiplexers (0711, 0712) interface with an integrated read/write lookup table (RWT) (0713) and operate on both read and write operations to the EMB (0701) under control of the RMM (0710) mode/control and/or function/opcode instructions (0719).

In some embodiments the LUT function may be applied to 4-bit signed or unsigned data representing filter coefficients that are loaded into the AMM. In this configuration, a non-uniform quantization may be performed on the data with the LUT function and the result of the translation expanded into 8-bit filter data that is then placed in the AMM. In this common configuration, the BMM matrix includes 8-bit data that is multiplied by the translated AMM 8-bit data to produce an accumulation result that is typically 32-bits wide in the CPM matrix.

Data Translation/Transformation (0800)

The present disclosure anticipates that the RMM may incorporate a data translation function in which accumulated data as a result of a matrix multiplication operation may be translated to a different data type when transferred to the EMB. Thus, signed/unsigned 32-bit, signed/unsigned 64-bit, signed/unsigned 128-bit, and signed/unsigned 256-bit, may be converted and output to the RMB as signed/unsigned 4-bit, signed/unsigned 8-bit, signed/unsigned 16-bit, signed/unsigned 32-bit, signed/unsigned 64-bit, signed/unsigned 128-bit, or signed/unsigned 256-bit data. Provisions within these translation functions are anticipated to include optional right/left shifting (extracting the output) from upper/lower bits in the accumulation result), half-LSB rounding, upper saturation bounding (forcing a fixed value based on accumulation values above a certain value), negative-to-zero bounding (bounding a signed value to a minimum of zero), and absolute value translation (clearing the sign of the result), and offsetting the output result by a fixed value.

Figure 8:
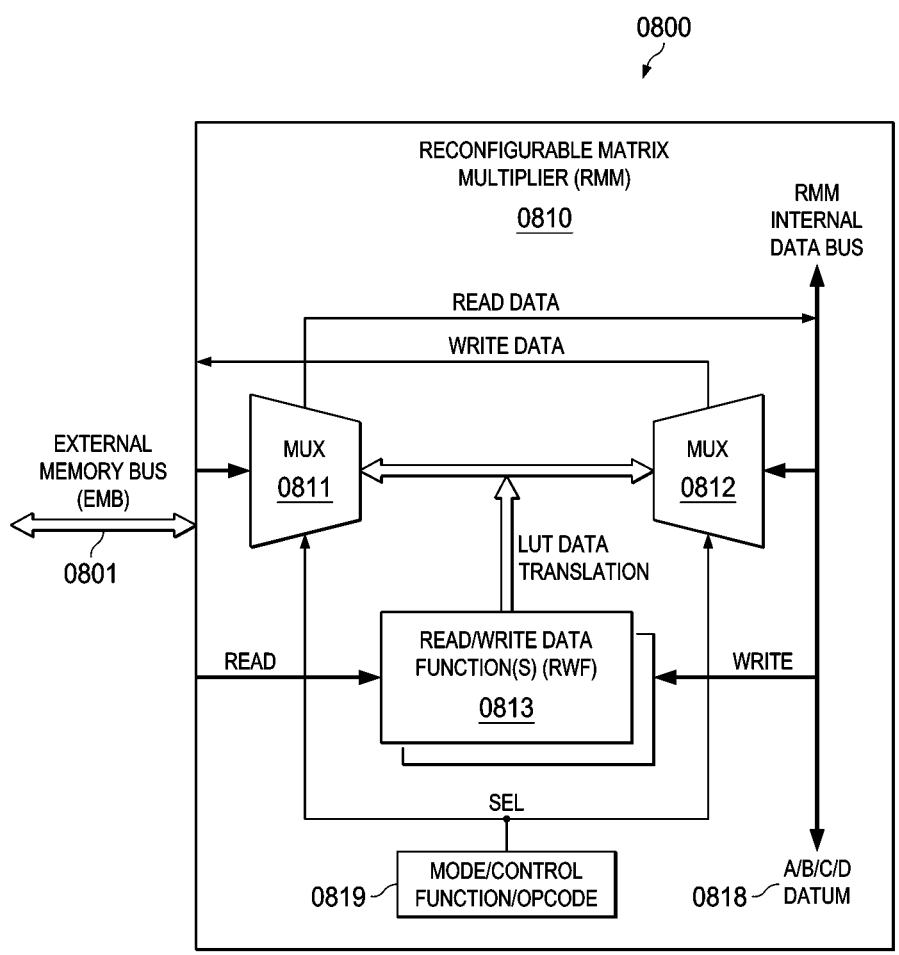
FIG. 8 illustrates a system embodiment employing an exemplary bi-directional function translation block used in conjunction with multiplexers to translate data transferred between the EMB and the RMM under control of a specific translation function.

As generally depicted in FIG. 8 (0800), the lookup table translation (0713) depicted in FIG. 7 (0700) may be replaced by one or more data translation/transformation function blocks (0813) that operates on the data to perform a function on the data before and/or after the multiplication computation performed by the RMM (0810) in the context of internal A/B/C/D data busses (0818). These data translation/transformation functions (0813) may include a variety of operators, such as data translation (as discussed above), range limiting, range expansion, linearization, and non-linearization of the data. The function block (0813) may be uni-directional (operating as a single function in both directions), bi-directional (operating as a function in one direction and its inverse in the reverse direction), or may incorporate different functions in both directions. As these functions involve data transfer to/from the EMB, they may be performed in parallel with arithmetic operations of the RMM and may be pipelined with data bus transfers to/from the EMB. The range of these functions is not limited by the scope of the present disclosure.

The lookup table translation and data translation/transformation mapping functions described above may be equally applied to any RMM A/B/C/D matrix and may be in some instances applied to selective matrices such that data translation may be performed before and/or after a matrix mathematical operation has been executed.

Generalized Matrix Multiplication Operation (0900)-(1200)

Figure 9:
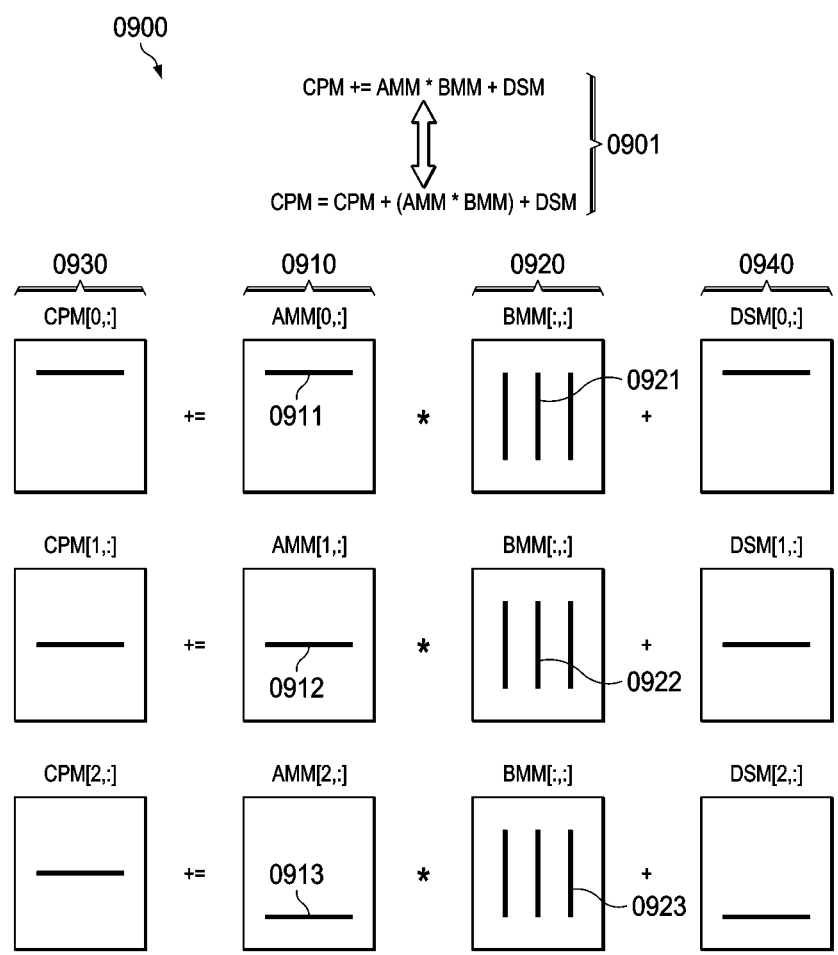
FIG. 9 illustrates a generalized matrix multiplication/accumulation operation.
Figure 15:
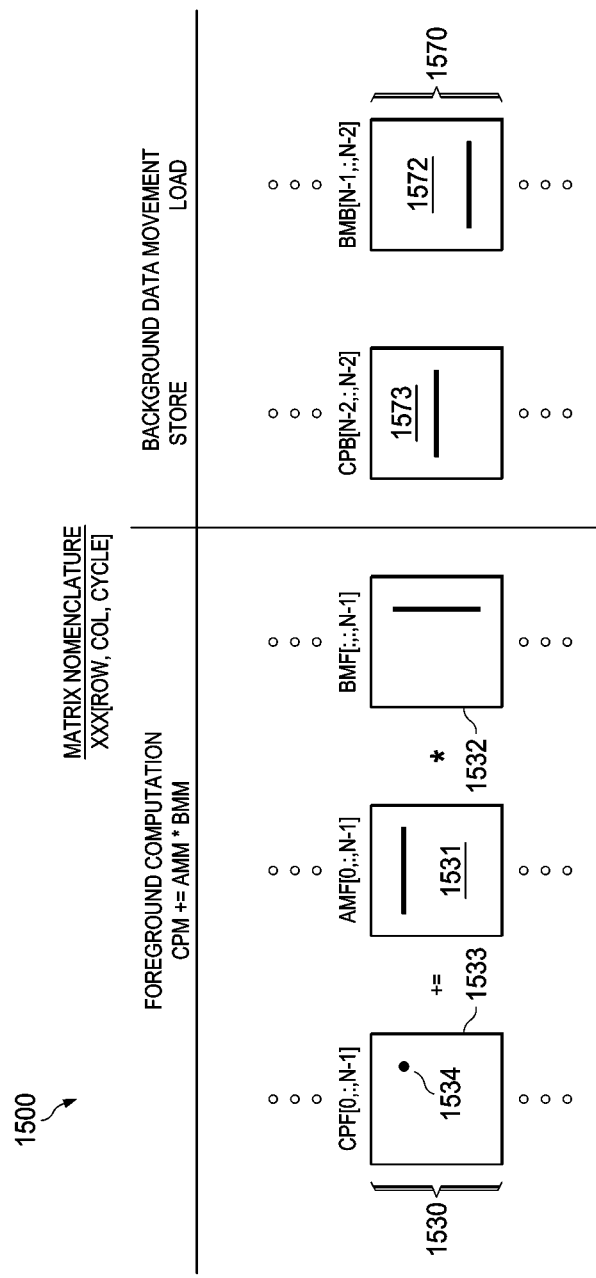
FIG. 15 illustrates an exemplary foreground/background execution/transfer STAGE N-1 pre-terminal timing diagram depicting an embodiment in which the RMM may be pipelined and overlapped such that a multiplication/accumulation compute cycle may be overlapped with a data transfer between a local memory bus (LMB) and an external memory bus (EMB)

For some predefined initial value of C[i,j], the present disclosure in many embodiments implements a matrix multiplier/accumulator function as generally depicted in FIG. 9 (0900). Here the A-multiplier-matrix (AMM), B-multiplicand-matrix (BMM), C-product-matrix (CPM), and D-summation-matrix (DSM) are related by the following multiplication/accumulation formulas:

$$i = 0K \ M - 1 \ \text{rows in } A, C, D \qquad (1)$$
$$j = 0K \ N - 1 \ \text{columns in } B, C, D$$
$$k = 0K \ K - 1 \ \text{columns in } A, \text{rows in } B$$

$$C[i, j] = C[i, j] + \sum_{k=0}^{K-1} (A[i, k] \times B[k, j]) \qquad (2)$$

$$C[i, j] = C[i, j] + D[i, j] + \sum_{k=0}^{K-1} (A[i, k] \times B[k, j]) \qquad (3)$$

These equations may be equivalently be expressed using assignment-summation operators ("A+=B" equivalent to "A=A+B" (0901)) as $$C[i, j] + = \sum_{k=0}^{K-1} (A[i, k] \times B[k, j]) \qquad (4)$$

$$C[i, j] + = D[i, j] + \sum_{k=0}^{K-1} (A[i, k] \times B[k, j]) \qquad (5)$$

A general depiction of this multiplication/accumulation process is depicted in FIG. 9 (0900), wherein rows (0911, 0912, 0913) of the AMM matrix/vector (0910) are multiplied by columns (0921, 0922, 0923) of the BMM matrix (0920) and summed to individual elements of the CPM matrix (0930), optionally along with individual elements of the optional DSM matrix (0940).

In variants of the present disclosure the AMM matrix is configured as a single static row vector and multiplied by a column of a locally stored BMM matrix to produce a multiplier product that is summed to individual elements of the CPM matrix. This process is replicated for each column of the locally stored BMM matrix until a full row of the CPM matrix is completed. Within this context the above equations reduce to the following:

$$C[0, j]\mathrel{+}= \sum_{k=0}^{K-1} (A[0, k] \times B[k, j]) \quad (6)$$

$$C[0, j]\mathrel{+}= D[0, j] + \sum_{k=0}^{K-1} (A[0, k] \times B[k, j]) \quad (7)$$

The AMM vector in this instance may be reloaded for each row of the CPM that is to be calculated. Alternatively, the AMM vector may be implemented using a bi-phase foreground/background methodology that enables foreground computation of the matrix product while the next vector row of the AMM matrix is loaded in parallel with the matrix multiplication operation. After the computation is complete (during which time new AMM data has been loaded), foreground and background pointers to AMM register data are swapped and a new calculation may proceed using newly loaded AMM data.

In some embodiments the B, C, and D matrices are square, in which the above equations can be reduced to the following:

$$i = 0K\ N-1\ \text{rows in } A, B, C, D \quad (8)$$
$$j = 0K\ N-1\ \text{columns in } A, B, C, D$$

$$C[i, j]\mathrel{+}= \sum_{k=0}^{N-1} (A[i, k] \times B[k, j]) \quad (9)$$

$$C[i, j]\mathrel{+}= D[i, j] + \sum_{k=0}^{N-1} (A[i, k] \times B[k, j]) \quad (10)$$

In the case of the A matrix being a single row vector, this reduces to the following:

$$i = 0K\ N-1\ \text{rows in } B, D \quad (11)$$
$$j = 0K\ N-1\ \text{columns in } A, B, C, D$$

$$C[0, j]\mathrel{+}= \sum_{k=0}^{N-1} (A[0, k] \times B[k, j]) \quad (12)$$

$$C[0, j]\mathrel{+}= D[0, j] + \sum_{k=0}^{N-1} (A[0, k] \times B[k, j]) \quad (13)$$

FIG. 10 (1000)-FIG. 12 (1200) provide some detail on a typical multiplication/accumulation operation involving a 3×3 matrix and include the arithmetic operations executed during the calculation of each of row 0 (FIG. 10 (1000)), row 1 (FIG. 11 (1100)), and row 2 (FIG. 12 (1200)) of the CPM matrix.

Foreground/Background Execution/Transfer (1300)-(1600)

The present disclosure anticipates that the computation and data transfer operations associated with the RMM may be pipelined and overlapped such that a multiplication/accumulation compute cycle may be overlapped with a data transfer between a local memory bus (LMB) and an external memory bus (EMB) (which is typically slower than the LMB). This overlap of execution/data transfer is generally depicted in FIG. 13 (1300)-FIG. 16 (1600) wherein an exemplary three-stage multiplication/accumulation operation incorporating foreground (1310, 1420, 1530, 1640) and background (1350, 1460, 1570, 1680) operations is illustrated. To achieve this compute/transfer overlap, a set of foreground (1310, 1420, 1530, 1640) and background (1350, 1460, 1570, 1680) registers is maintained in which a memory pointer or other hardware register is used to swap ("ping-pong") between the foreground/background memory/register sets. As depicted, the foreground (1310, 1420, 1530, 1640) and background (1350, 1460, 1570, 1680) registers represent two sets of registers that are selectively multiplexed by a foreground/background control signal that alternatively selects each primary set of registers associated with computation and a background set that are associated with data transfer operations. One skilled in the art will recognize that this represents a two-stage pipeline and can be expanded to include a number of foreground compute cycles (for example, each associated with the computation of a dot product in a ROW×COL multiplication operation) and a number of background data transfer operations (for example, each associated with the retrieval of a COL element of a BMM matrix or the storage of a COL element of the CPM matrix).

A typical operational cycle would provide for the computation of CPM+=AMM*BMM by multiplying a row of AMF (1311) times a column of BMF (1312) to produce a product-sum that is summed to the currently indexed CPF (1314) element in the CPF matrix (1313) result. During this compute cycle the background data transfer occurs in parallel for the following two processes. A previously computed CPM row result stored in the background CPB matrix (1353) is transferred to the EMB and stored in external memory. Simultaneously or sequentially, another row of a to-be-used background BMM matrix (1352) is loaded into the BMB matrix from the EMB. Computation of another row element of the CPF matrix (1423) is then executed in a similar fashion wherein a row of AMF (1421) is multiplied times a column of BMF (1422) to produce a product-sum that is summed to the currently indexed CPF (1424) element in the CPF matrix (1423) result. In conjunction with this operation data transfer occurs to store the CPB row result (1463) and load the next BMB row (1462). These paired compute/transfer operations continue in sequence/parallel until the final computation of the last row element of the CPF matrix (1533) is then executed in a similar fashion wherein the last row of AMF (1531) is multiplied times the last column of BMF (1532) to produce a product-sum that is summed to the currently indexed CPF (1534) element in the CPF matrix (1533) result. In conjunction with this operation data transfer occurs to store the next-to-last CPB row result (1573) and load the last BMB row (1572). The cycle repeats as indicated in FIG. 16 (1600) wherein the computations continue with the last CPB row result (1683) stored and loading the next BMB row (1682) for processing.

Note that while this compute/transfer overlap has been indicated such that computation of each individual element of a CPF row (1314, 1424, 1534, 1644) results in a corresponding data transfer to store a CPB row and load a BMB row, it is also possible for the compute/transfer overlap to be sequenced such that a complete row of the CPF matrix is computed during the CPB/BMB store/load data transfers. Thus, if the EMB is much slower than the LMB, the compute cycles associated with a complete ROW*COL product/summation may be used to overlap the slower EMB-LMB data transfers that occur with the CMB and the BMB. Furthermore, as indicated elsewhere, the EMB may be shared among the AMM/BMM/CPM (and thus in this scenario shared among the AMF/BMF/CPF and AMB/BMB/CPB) in which data congestion may occur making data transfers to the EMB significantly slower and the need for full-row compute cycles to be performed to overlap the EMB data transfer. In other scenarios where the EMB is separated among various elements of the AMF/BMF/CPF/AMB/BMB/CPB, it may be possible to simply overlap portions of the compute cycle with data transfer so as to reduce the wait time for either compute cycles to finish or for data transfer to the various EMB busses to occur.

Partial-Row Foreground/Background Method
(1700)-(2000)

Figure 16:
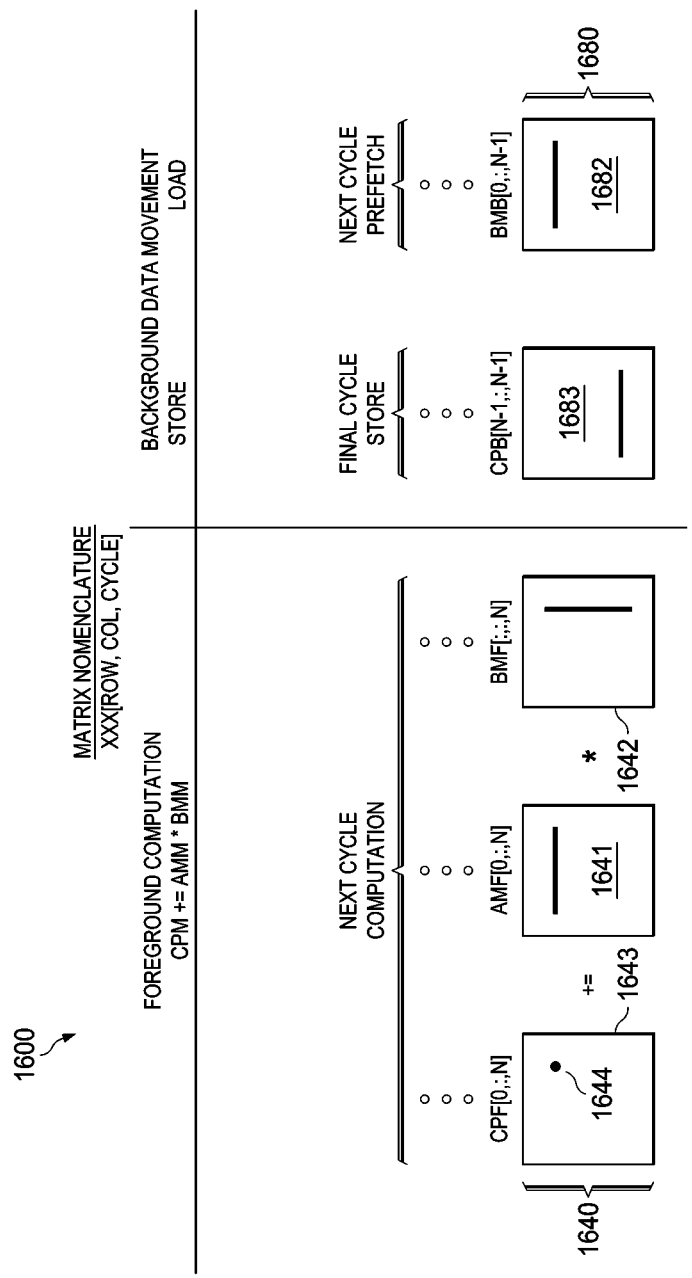
FIG. 16 illustrates a foreground/background execution/transfer STAGE N terminal timing diagram depicting an embodiment in which the RMM may be pipelined and overlapped such that a multiplication/accumulation compute cycle may be overlapped with a data transfer between a local memory bus (LMB) and an external memory bus (EMB)
Figure 17:
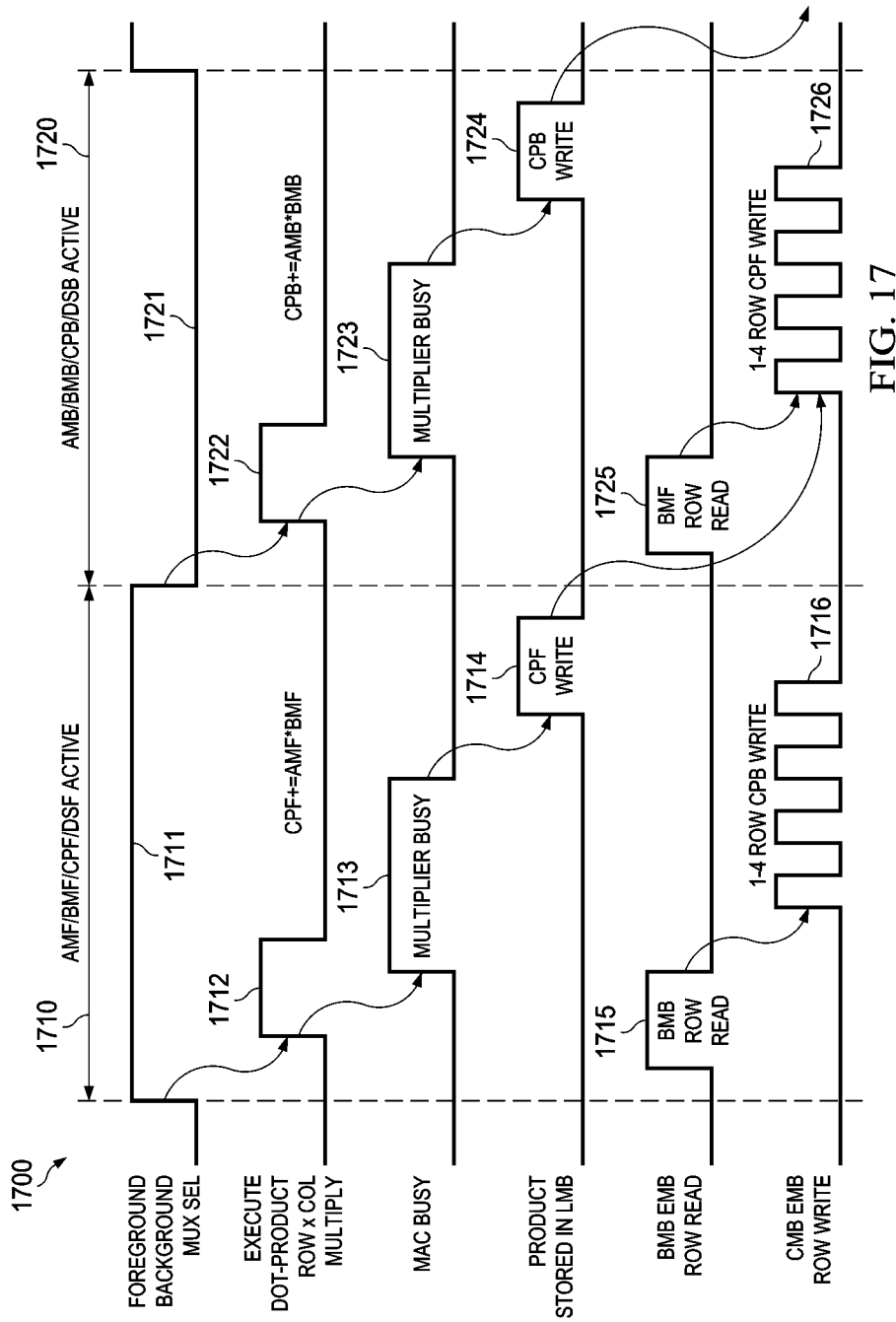
FIG. 17 illustrates a timing diagram depicting an embodiment of foreground/background matrix multiplier method in which partial-row multiplication/accumulation compute cycles overlap data transfer cycles between a local memory bus (LMB) and an external memory bus (EMB)
Figure 20:
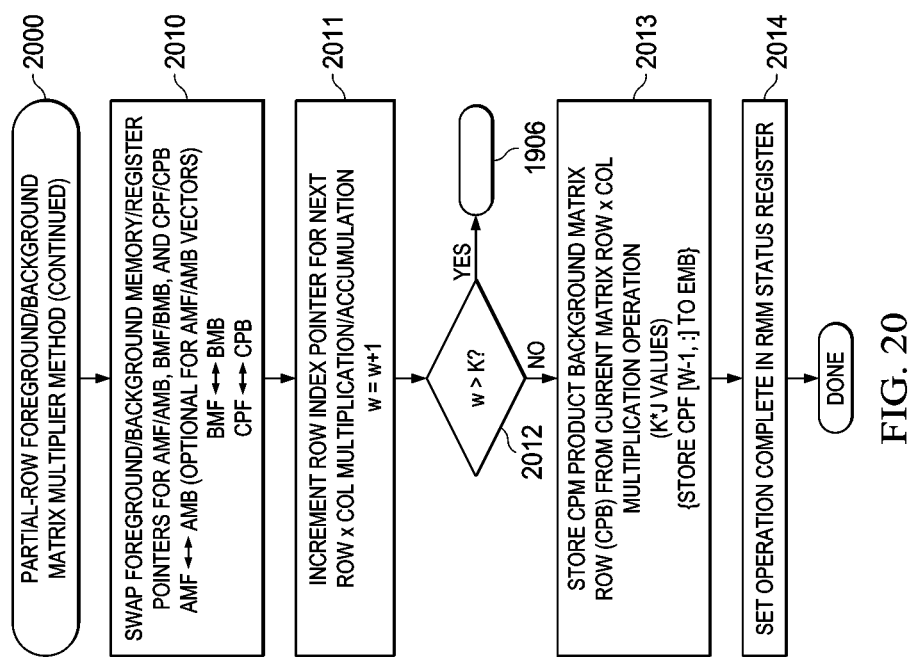
FIG. 20 illustrates a flowchart depicting an embodiment of a foreground/background matrix multiplier method in which partial-row multiplication/accumulation compute cycles overlap data transfer cycles between a local memory bus (LMB) and an external memory bus (EMB) (page 3/3)
Figure 18:
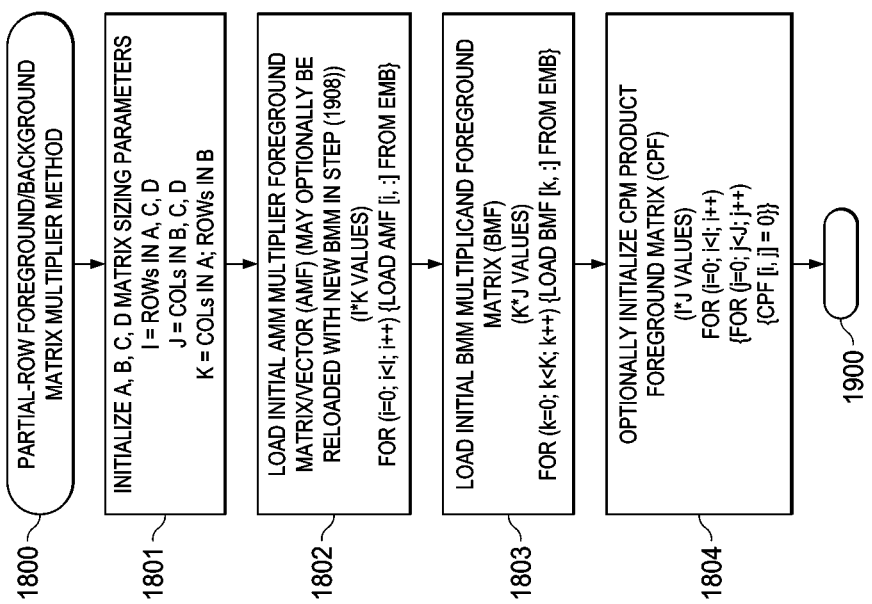
FIG. 18 illustrates a flowchart depicting an embodiment of a foreground/background matrix multiplier method in which partial-row multiplication/accumulation compute cycles overlap data transfer cycles between a local memory bus (LMB) and an external memory bus (EMB) (page 1/3)
Figure 19:
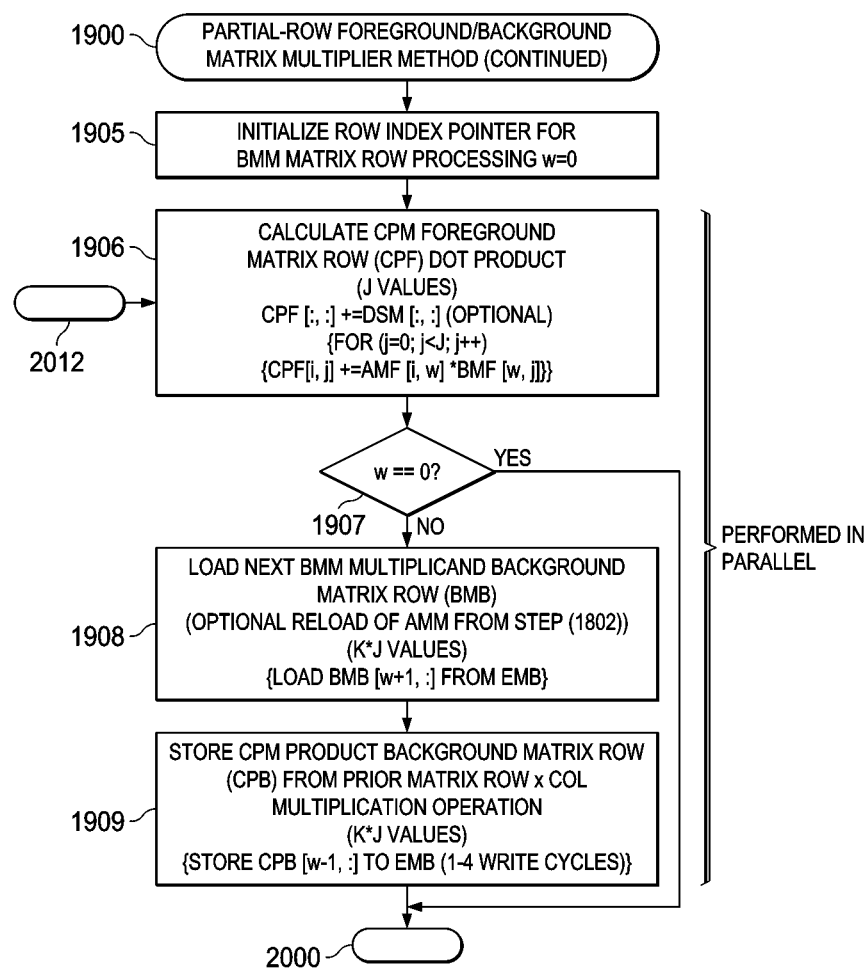
FIG. 19 illustrates a flowchart depicting an embodiment of a foreground/background matrix multiplier method in which partial-row multiplication/accumulation compute cycles overlap data transfer cycles between a local memory bus (LMB) and an external memory bus (EMB) (page 2/3)

The present disclosure teaches a partial-row foreground/background matrix multiplier method in conjunction with the hardware functionality described in FIG. 13 (1300)-FIG. 16 (1600) as depicted in the timing diagram of FIG. 17 (1700) and the flowcharts of FIG. 18 (1800)-FIG. 20 (2000). Within this context a dot-product of a given AMM row with a BMM column to generate a partial CPM row value will overlap both the storing of a preceding CPB row calculation to the EMB and also the loading of a new BMM row that will be used in a later CPF+=AMF*BMF calculation.

FIG. 17 (1700) depicts a typical timing diagram associated with a partial-row foreground/background matrix multiplier embodiment. Here it can be seen that the timing is generally divided into a bi-phase ("ping-pong") format (1710, 1720) in which AMF/BMF/CPF/DSF foreground buffers are active in a first phase (1710) and AMB/BMB/CPB/DSB background buffers are active in a second phase (1720). During the first phase (1710), the foreground/background selector is active (1711) indicating foreground MUX selection of AMF/BMF/CPF/DSF foreground buffers. A ROW×COL dot product multiply is initiated (1712) which activates the matrix multiplier/accumulator (MAC) (1713) for a period of time after which the multiplication product is stored using the LMB (1714). During this first phase (1710) a BMB row read (1715) is simultaneously executed to load a new row into the current background BMB matrix from the EMB and subsequent to this four write cycles are executed (1716) to write the previously calculated CPM row product values to the EMB. Note that the EMB transfer operations (1715, 1716) overlap the compute execution (1712, 1713) and internal storage (1714) operations associated with the current matrix multiplication operation. The second phase (1720) operates identically to the first phase (1710) with the exception that the foreground/background MUX register selector is inactive (1721) so as to select a different set of active register/memory buffers (AMB/BMB/CPB/DSB) such that foreground/background buffers are reversed during the row read operations to BMB and the row write operations to CPB.

As generally depicted in the flowcharts of FIG. 18 (1800)-FIG. 20 (2000), implementation of the partial-row foreground/background execution/transfer timing diagram of FIG. 17 (1700) may be generally accomplished using a partial-row foreground/background execution/transfer method comprising the steps of:
(1) Initializing A,B,C,D matrix sizing parameters (1801);
(2) Loading an initial AMM multiplier foreground matrix/vector (AMF) (1802) (AMM is generally fixed for multiple operations on separate BMM multiplicands, but in some circumstances AMM may be reloaded with the next BMM in step (8));
(3) Loading an initial BMM multiplicand foreground matrix (BMF) (1803);
(4) Optionally initializing a CPM product foreground matrix (CPF) to a fixed value (1804);
(5) Initializing a row index pointer (W) for BMM matrix row processing (1905);
(6) Calculating a CPM foreground matrix row (CPF) dot product (1906);
(7) Simultaneously with step (6), proceeding to step (10) if the row index pointer is equal to zero (1907);
(8) Simultaneously with step (6), loading a next BMM multiplicand background matrix row (BMB) (AMM may also be optionally reloaded in this step from step (2)) (1908);
(9) Simultaneously with step (6), storing a CPM product background matrix row (CPB) from a prior matrix ROW×COL multiplication operation (this may involve 1-4 EMB bus write cycles) (1909);
(10) Swapping foreground/background memory/register pointers for AMF/AMB, BMF/BMB, and CPF/CPB (2010);
(11) Incrementing the row index pointer W for next ROW×COL multiplication/accumulation (2011);
(12) Determining if all product rows of the matrix multiplication have been completed, and if not, proceeding to step (6) (2012);
(13) Storing the CPM product background matrix row (CPB) from current matrix ROW×COL multiplication operation (this may involve 1-4 EMB bus write cycles) (this completes storage of all product rows after computations are completed) (2013); and
(14) Setting an OPERATION COMPLETE indicator in a RMM STATUS register (2014).

As with many embodiments, this method may in some circumstances assume that the B, C, and D matrices are square. Furthermore, this example method indicates the use of a single external memory bus (EMB) from which the A, B, C, and D matrices are loaded/stored. It should be noted in some embodiments separate external memory busses are utilized for one or more of these matrices.

This general method may be modified depending on a number of factors, with rearrangement and/or addition/deletion of steps anticipated by the scope of the present disclosure. Integration of this and other embodiment methods in conjunction with a variety of embodiment systems described herein is anticipated by the overall scope of the present disclosure.

Full-Row Foreground/Background Method (2100)-
(2400)

Figure 21:
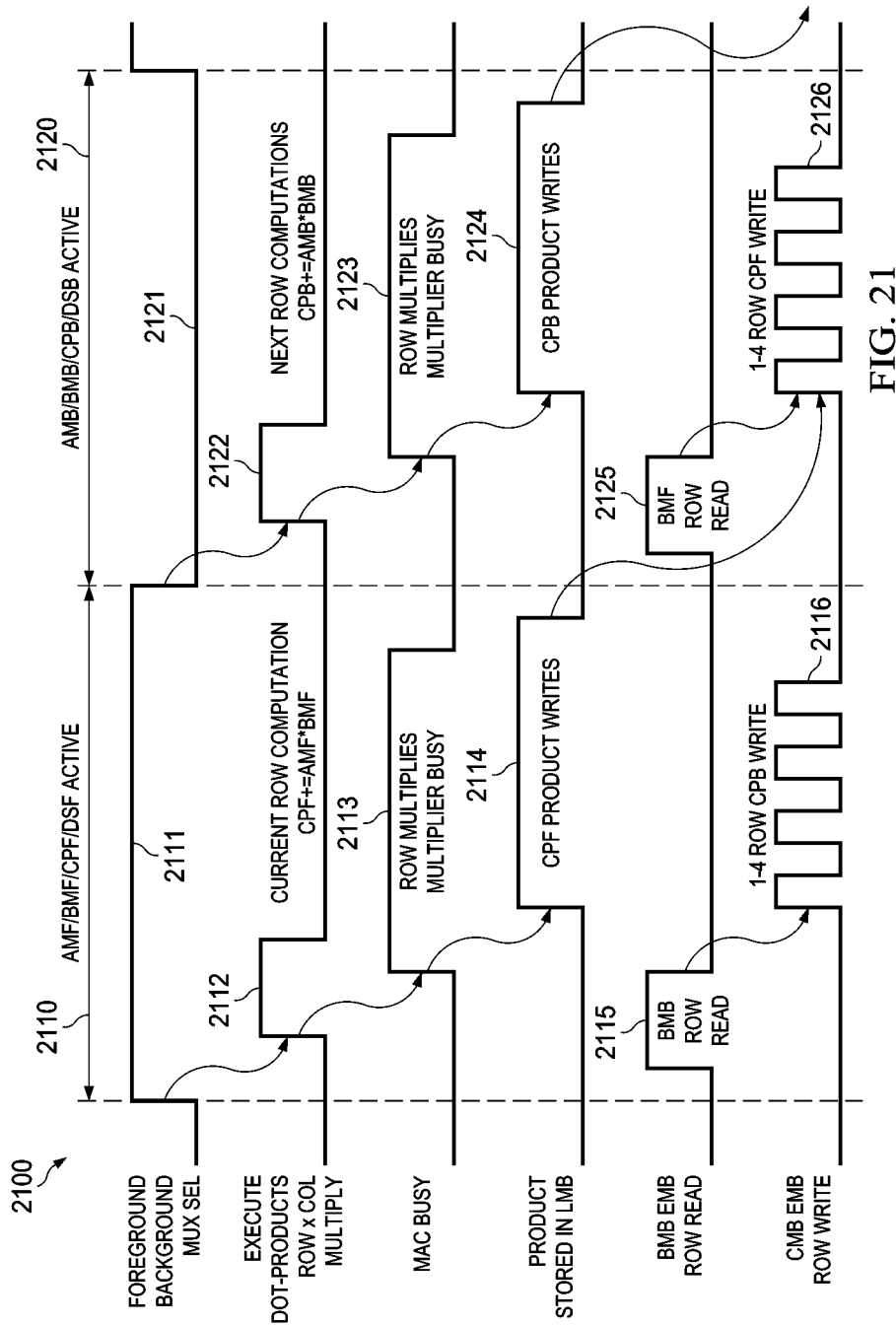
FIG. 21 illustrates a timing diagram depicting an embodiment of a foreground/background matrix multiplier method in which full-row multiplication/accumulation compute cycles overlap data transfer cycles between a local memory bus (LMB) and an external memory bus (EMB)
Figures 22, 24:
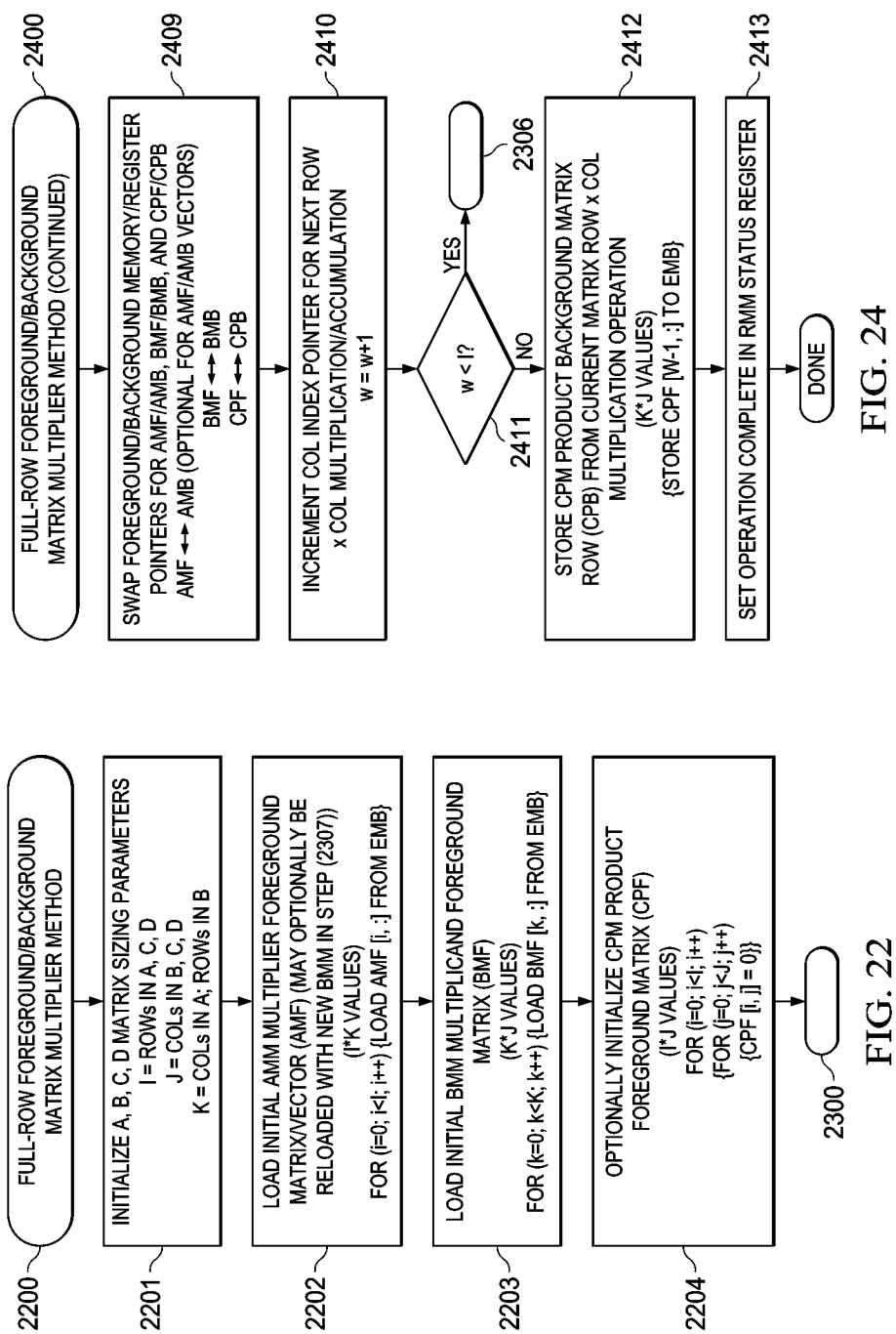
FIG. 22 illustrates a flowchart depicting an embodiment of a foreground/background matrix multiplier method in which full-row multiplication/accumulation compute cycles overlap data transfer cycles between a local memory bus (LMB) and an external memory bus (EMB) (page 1/3)
FIG. 24 illustrates a flowchart depicting an embodiment of a foreground/background matrix multiplier method in which full-row multiplication/accumulation compute cycles overlap data transfer cycles between a local memory bus (LMB) and an external memory bus (EMB) (page 3/3)
Figure 23:
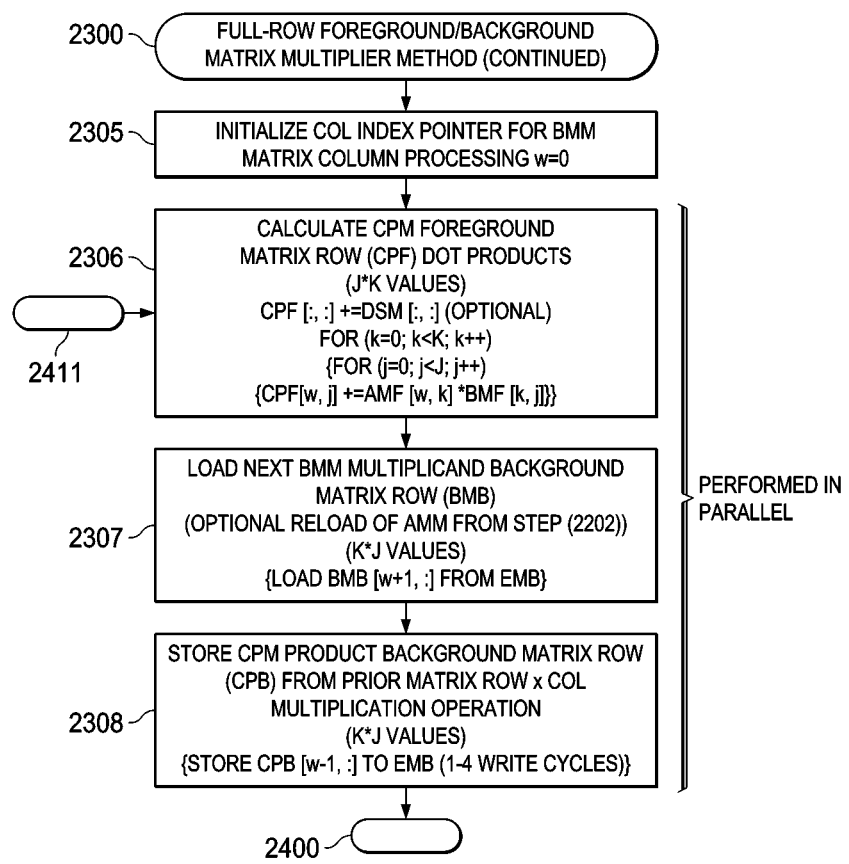
FIG. 23 illustrates a flowchart depicting an embodiment of a foreground/background matrix multiplier method in which full-row multiplication/accumulation compute cycles overlap data transfer cycles between a local memory bus (LMB) and an external memory bus (EMB) (page 2/3)

The present disclosure teaches a full-row foreground/background matrix multiplier method in conjunction with the hardware functionality described in FIG. 13 (1300)-FIG. 16 (1600) as depicted in the timing diagram of FIG. 21 (2100) and the flowcharts of FIG. 22 (2200)-FIG. 24 (2400). Within this context a multiple dot-product of a given AMM row with multiple BMM columns to generate multiple CPM row values will overlap both the storing of a preceding CPB row calculation to the EMB and also the loading of a new BMB row that will be used in a later CPF+=AMF*BMF calculation.

FIG. 21 (2100) depicts a typical timing diagram associated with a partial-row foreground/background matrix multiplier embodiment. Here it can be seen that the timing is generally divided into a bi-phase ("ping-pong") format (2110, 2120) in which AMF/BMF/CPF/DSF foreground buffers are active in a first phase (2110) and AMB/BMB/CPB/DSB background buffers are active in a second phase (2120). During the first phase (2110), the foreground/background selector is active (2111) indicating foreground MUX selection of AMF/BMF/CPF/DSF foreground buffers. Multiple ROW×COL dot product multiplys are initiated (2112) which activates the matrix multiplier/accumulator (MAC) (2113) for a period of time after which the multiplication products are stored using the LMB (2114). Thus, typically a full row of dot-product multiplies are performed during this multiply activate/execute time (2112, 2113). During this first phase (2110) a BMB row read (2115) is simultaneously executed to load a new row into the current background BMB matrix from the EMB and subsequent to this four write cycles are executed (2116) to write the previously calculated CPM row product values to the EMB. Note that the EMB transfer operations (2115, 2116) overlap the compute execution (2112, 2113) and internal storage (2114) operations associated with the current matrix multiplication operations. The second phase (2120) operates identically to the first phase (2110) with the exception that the foreground/background MUX register selector is inactive (2121) so as to select a different set of active register/memory buffers (AMB/BMB/CPB/DSB) such that foreground/background buffers are reversed during the row read operations to BMB and the row write operations to CPB. As can be seen from this diagram, this allows a large number of ROW×COL multiply/accumulate operations to overlap the data transfer operations to the EMB. In many application contexts this is suitable for situations in which the EMB bus speed is significantly slower than that of the LMB and the execution time associated with the MAC compute cycles.

As generally depicted in the flowcharts of FIG. 21 (2100)-FIG. 24 (2400), implementation of the full-row foreground/background execution/transfer timing diagram of FIG. 21 (2100) may be generally accomplished using a full-row foreground/background execution/transfer method comprising the steps of:

(1) Initializing A,B,C,D matrix sizing parameters (2201);
(2) Loading an initial AMM multiplier foreground matrix/vector (AMF) (2202) (AMM is generally fixed for multiple operations on separate BMM multiplicands, but in some circumstances AMM may be reloaded with the next BMM in step (7));
(3) Loading an initial BMM multiplicand foreground matrix (BMF) (2203);
(4) Optionally initializing a CPM product foreground matrix (CPF) to a fixed value (2204);
(5) Initializing a COL index pointer (W) for BMM matrix column processing (2305);
(6) Calculating CPM foreground matrix row (CPF) dot products (2306);
(7) Simultaneously with step (6), loading a next BMM multiplicand background matrix row (BMB) (AMM may also be optionally reloaded in this step from step (2)) (2307);
(8) Simultaneously with step (6), storing a CPM product background matrix row (CPB) from a prior matrix ROW×COL multiplication operation (this may involve 1-4 EMB bus write cycles) (2308);
(9) Swapping foreground/background memory/register pointers for AMF/AMB, BMF/BMB, and CPF/CPB (2409);
(10) Incrementing the COL index pointer W for next ROW×COL multiplication/accumulation (2410);
(11) Determining if all product rows of the matrix multiplication have been completed, and if not, proceeding to step (6) (2411);
(12) Storing the CPM product background matrix row (CPB) from current matrix ROW×COL multiplication operation (this may involve 1-4 EMB bus write cycles) (this completes storage of all product rows after computations are completed) (2412); and
(13) Setting an OPERATION COMPLETE indicator in a RMM STATUS register (2413).

As with many embodiments, this method may in some circumstances assume that the B, C, and D matrices are square. Furthermore, this example method indicates the use of a single external memory bus (EMB) from which the A, B, C, and D matrices are loaded/stored. It should be noted in some embodiments separate external memory busses are utilized for one or more of these matrices.

This general method may be modified depending on a number of factors, with rearrangement and/or addition/deletion of steps anticipated by the scope of the present disclosure. Integration of this and other embodiment methods in conjunction with a variety of embodiment systems described herein is anticipated by the overall scope of the present disclosure.

Multiplexed Foreground/Background Memory Selection (2500)

Figure 25:
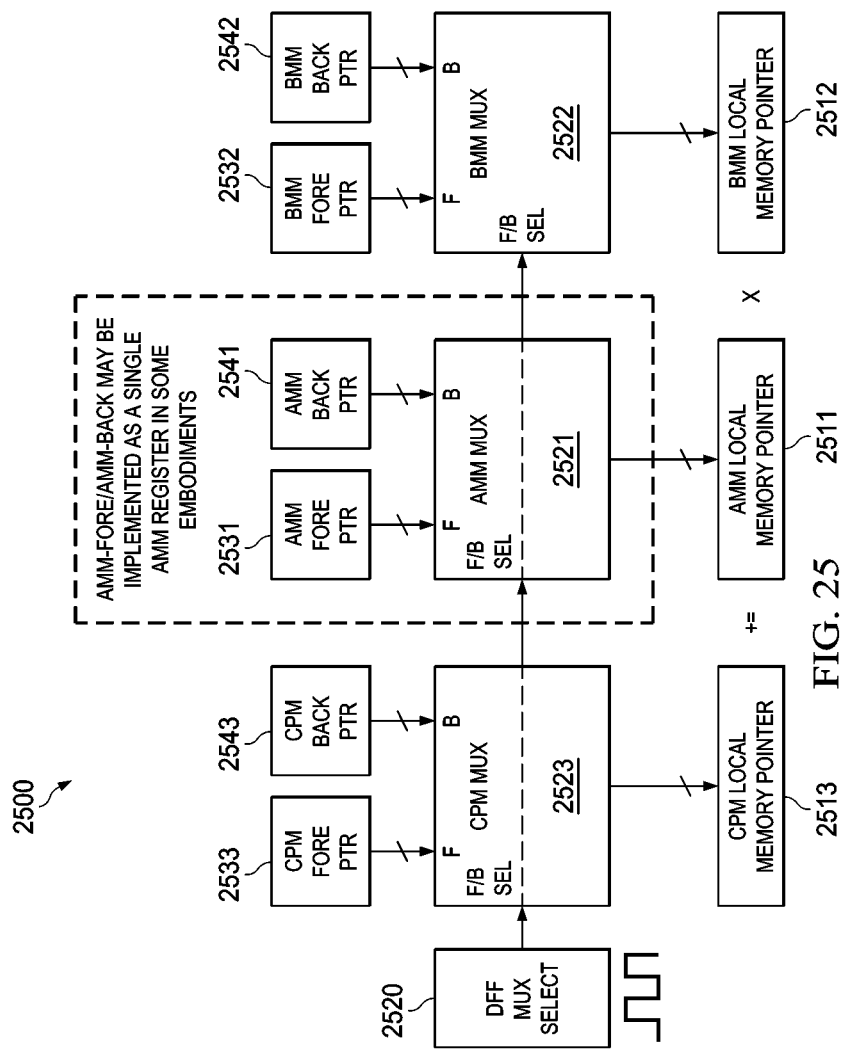
FIG. 25 illustrates a system block diagram depicting a typical foreground/background memory/register mapping technique useful in some disclosed embodiments.

The present disclosure may provide for a multiplexed selection of foreground/background CPM, AMM, BMM, and/or DSM elements within the construction of the RMM as generally depicted in FIG. 25 (2500). Here it can be seen in the general case of the current operation involving CPM (2513)=AMM (2511)*BMM (2512), the operation is executed on local memory pointers (2511, 2512, 2513) derived from corresponding address multiplexers (2521, 2522, 2523) that are selected using a D-flip-flop multiplex selector (2520) that alternates between selection of foreground memory addresses (2531, 2532, 2533) and background memory addresses (2541, 2542, 2543). Note that in many embodiments only a single AMM register is implemented instead of a foreground/background register pair. In this circumstance the implementation reduces to a single non-multiplexed register.

Similar selection methodologies can be utilized for the DSM elements if incorporated into the previously discussed matrix multiplication function configuration CPM=AMM*BMM+DSM. The present disclosure anticipates that any subset of AMM, BMM, CPM, and/or DSM may be selected using this methodology. It should be noted that embodiments of the present disclosure utilize powers-of-two datum sizing so that in many circumstances the address widths utilized by the address busses depicted in FIG. 25 (2500) may be considerably reduced in size as the low order bits of the foreground/background pointers will be identical and only the upper order bits will be different depending on foreground/background selection. In the extreme case of separate local memories for the AMM, BMM, CPM, and/or DSM, the multiplexing may only involve a single memory address bit, in which the output (2529) of the DFF multiplexer selector (2520) may be directly used as the address selection input for the local memory pointers (2511, 2512, 2513).

Exemplary Memory Data Transfer Architecture (2600)

Figure 26:
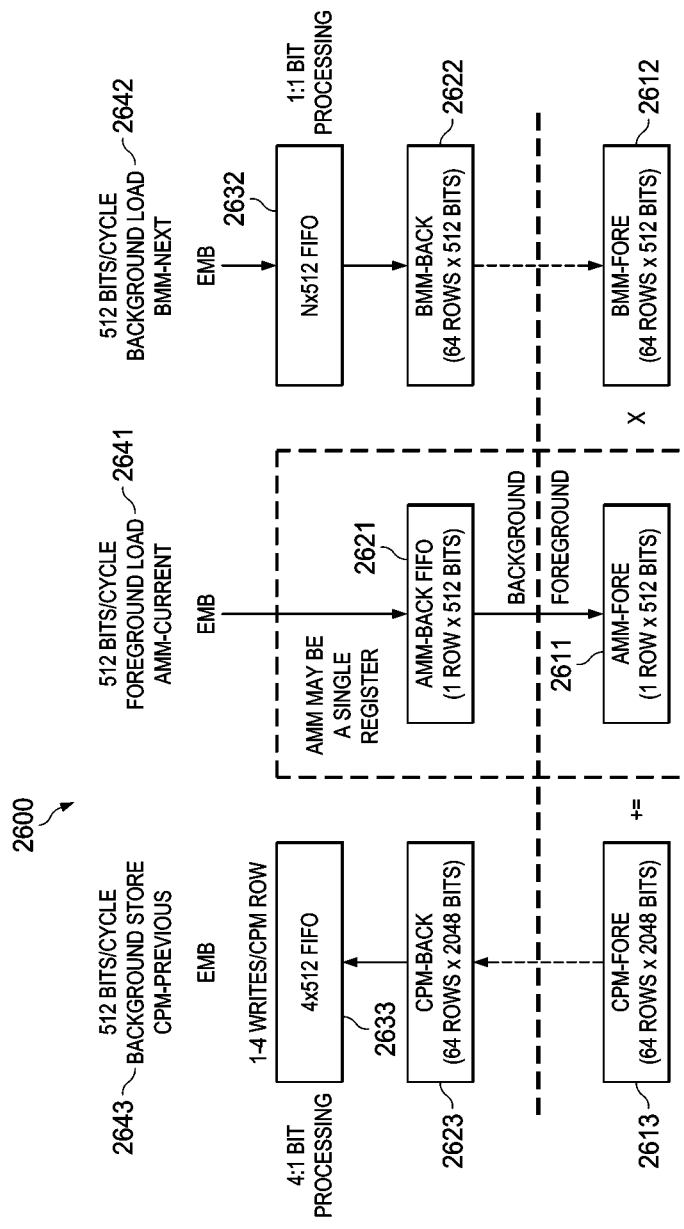
FIG. 26 illustrates a memory data transfer architecture useful in some disclosed system embodiments.

The previously discussed foreground/background processing may be in some embodiments be integrated with a memory data transfer architecture that streamlines data transfers between a slower external memory bus (EMB) and a faster local memory bus (LMB) within the RMM. A general memory data transfer architecture depicting this implementation is depicted in FIG. 26 (2600). Here an exemplary memory data bus width of 512 bits is implemented (although the exact bus width is arbitrary and not limited as shown) in which 512 bits may be transferred to/from the EMB per bus cycle. The current computation of CPM+=AMM*BMM is calculated in the foreground using foreground memory/registers CPM-fore (2613)+=AMM-fore (2611)*BMM-fore (2612). Note that in many embodiments only a single AMM register is implemented instead of a foreground (2611)/background (2621) register pair. In this circumstance the implementation reduces to a single non-multiplexed register.

Simultaneously with these calculations the corresponding background registers for CPM-back (2623) comprising 4×512=2048 bits are stored into a FIFO (2633) in sections of 512 bits and written with separate bus cycles to the EMB (2643). Note that this write to the EMB may involve 1-4 EMB bus write cycles as in some circumstances only a portion of the CPM-back result may be written back to the EMB. Thus, from one to four 512-bit sections of the resulting 2048 bit result may be written to the EMB (2643). The 64 rows of the CPM-back (2623) register represent 4×512=2048 bits each and thus four writes to the EMB are required to completely store each 2048-bit row of the CPM-back (2623) row vector. This is best accomplished using a FIFO (2633), but may equivalently be accomplished using a memory selection multiplexer configured to write 512-bit sections of the CPM-back (2623) row vector using four separate offset memory addresses.

Similarly, data may be background loaded into the BMM-back (2622) matrix for each of the 64 rows in the matrix in sections of 512 bits from the EMB (2642) using a FIFO (2632) or other buffering methodology. If implemented as a FIFO (2632) this buffering methodology may incorporate sufficient depth (N) to accommodate all rows of the BMM-back (2622) matrix.

Finally, an EMB read cycle (2641) may load a background AMM row in a background register/FIFO (2621) to prepare for a new calculation of ROW×COL dot products that are stored in the CPM-fore (2613) matrix. In many implementations, writing data into the AMM-fore (2621) FIFO will trigger CPM-fore (2613) matrix row dot-product calculations until the AMM-fore (2621) FIFO has been exhausted.

CPM Load/Store Path (2700)

In some embodiments the present disclosure may incorporate an additional CPM load/store path to improve the performance of operations that require saving and reusing the CPM (such as in computations involving long convolutions, etc.) or matrix multiplication and matrix addition (such as C=A*B+D). In these situations, it is useful to include:

(a) an extra CPM matrix load/store path (2743, 2744); and
(b) an extra CPM memory (herein referred to as a D summation matrix (DSM)) (which in some circumstances can be utilized from extra rows in the CPM) (2724).

Figure 27:
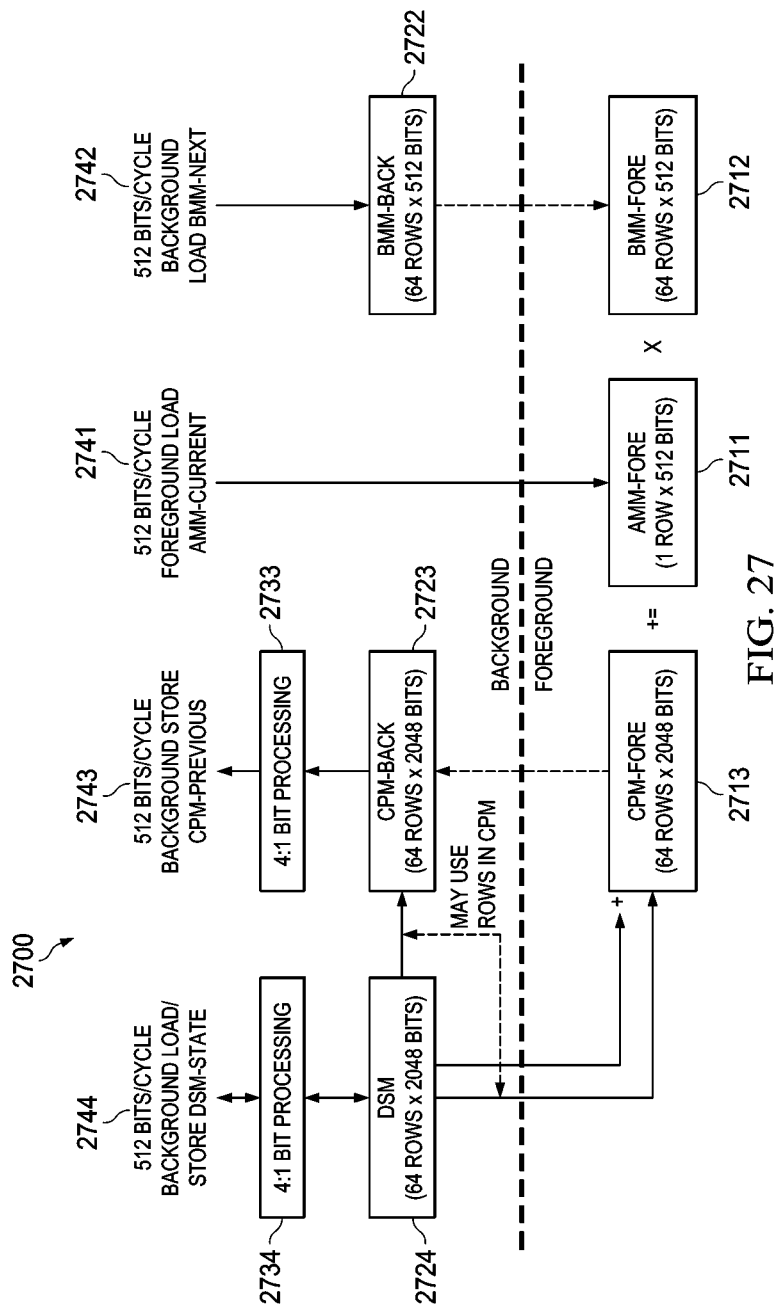
FIG. 27 illustrates a system embodiment employing an additional CPM matrix load/store data path.

A typical implementation of this architecture is generally depicted in FIG. 27 (2700) wherein a foreground computation of CPM (2713)=AMM (2711)*BMM (2712) is computed using the current AMM (2741) from memory (as loaded into foreground AMM (2711)) multiplied by the foreground BMM (2712) to produce the foreground CPM (2713). In this example the multiplier AMM (2711) and multiplicand BMM (2712) have data widths of 512 bits with internal datum typically defined using a multiple of 8 bits (8, 16, 32, etc.) as dynamically configured by the system prior to the multiplication operation. The resulting CPM product (2713) has a data width of 512*4=2048 data bits so as to accommodate the 512×512 multiplication operations (in 8, 16, 32, etc. bit individual datum) in addition to the summation/accumulation operation of prior multiplication operations.

Note that for the case of 16-bit and wider input data, extra rows in the CPM-fore (2713) and/or CPM-back (2723) memory may be used to store the DSM (2724) matrix. Depending on application context, the data path from the DSM matrix (2724) to the CPM matrix (2713) may be absent and replaced by direct loading of the DSM (2724) matrix as desired.

CPM-to-BMM/AMM Matrix Store Path (2800)

In some embodiments an additional CPM-to-BMM and/or CPM-to-AMM matrix store path(s) may be implemented. This architecture supports various algorithms that may require the output of an operation to be used as the input to a next operation (e.g., in a FFT, the rows of a matrix then the columns of the result). The addition of a direct CPM to BMM back path allows outputs from a first operation to be used as inputs to another operation with minimal transfer latency, and eliminates any additional delays associated with EMB memory accesses. A similar strategy may be used to implement a CPM-back to A-fore data path.

Figure 28:
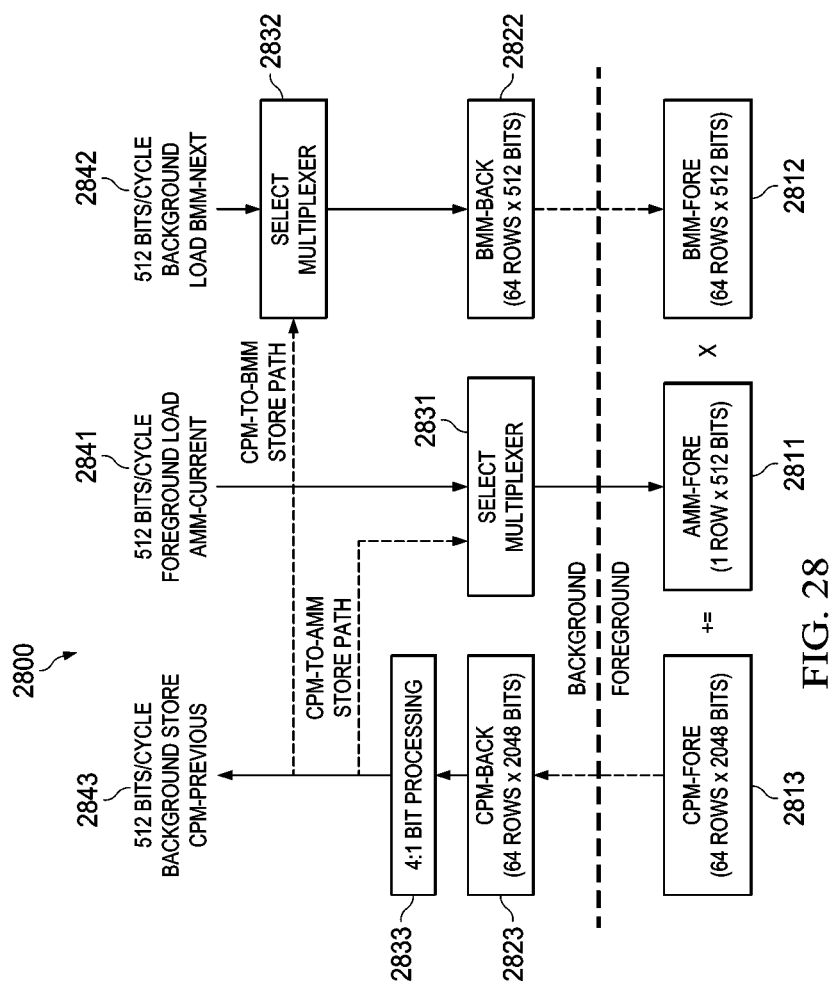
FIG. 28 illustrates a system embodiment employing an additional CPM-to-BMM matrix store data path and an additional CPM-to-AMM matrix store data path.

An example of this architecture enhancement is generally depicted in FIG. 28 (2800) wherein the optional CPM-to-BMM load/store path is implemented using a selection multiplexer (2832) that selects between the BMM EMB data (2842) and previously computed CPM data (2833) (as selected within a portion of the output CPM data bus). A similar CPM-to-AMM load/store path is depicted as implemented using a selection multiplexer (2831) that selects between the EMB AMM data (2841) and previously computed CPM data (2833) (as selected within a portion of the output CPM data bus).

Multiplication/Accumulation Data Widths (2900)

The present disclosure anticipates a wide variety of multiply/accumulate operations may be implemented. Generally speaking, the RMM may be configured to achieve any of the following operations:

CPF=(AMM×BMM)

CPF=−(AMM×BMM)

CPF=DSM+(AMM×BMM)

CPF=DSM−(AMM×BMM)

Within each of these primitive operators a dot product is generated within each row of CPF for every column element wherein a row of AMM is multiplied by a column of BMM to produce a dot product resulting column element of the selected CPF row. In the implementations depicted herein, the scalar multiplication associated with these dot products utilizes a fixed scalar entity bit width of W data bits. Since scalar product multiplication of two W-bit quantities may produce a resulting product of 2×W data bits, a CPM product matrix should incorporate individual data entries having a minimum width of 2×W data bits. For example, if AMM and BMM contain 8-bit data, the resulting scalar product will necessitate that 16-bit data be supported.

Additionally, since the primitive functions above may incorporate accumulation functions (as in CPF=DSM+ (AMM×BMM) and CPF=DSM−(AMM×BMM)), additional scalar data storage in excess of the 2×W data bits may be provided. The present disclosure provides for this requirement by way of embodiments of the CPM matrix containing sufficient storage to handle scalar quantities each having a data width of 4×W data bit. This provides for sufficient storage to accommodate a full 2×W scalar multiplication plus additional accumulation operations (that may be cascaded in the case of accumulation functions such as (as in CPF=DSM+(AMM×BMM) and CPF=DSM−(AMM× BMM)).

Figure 29:
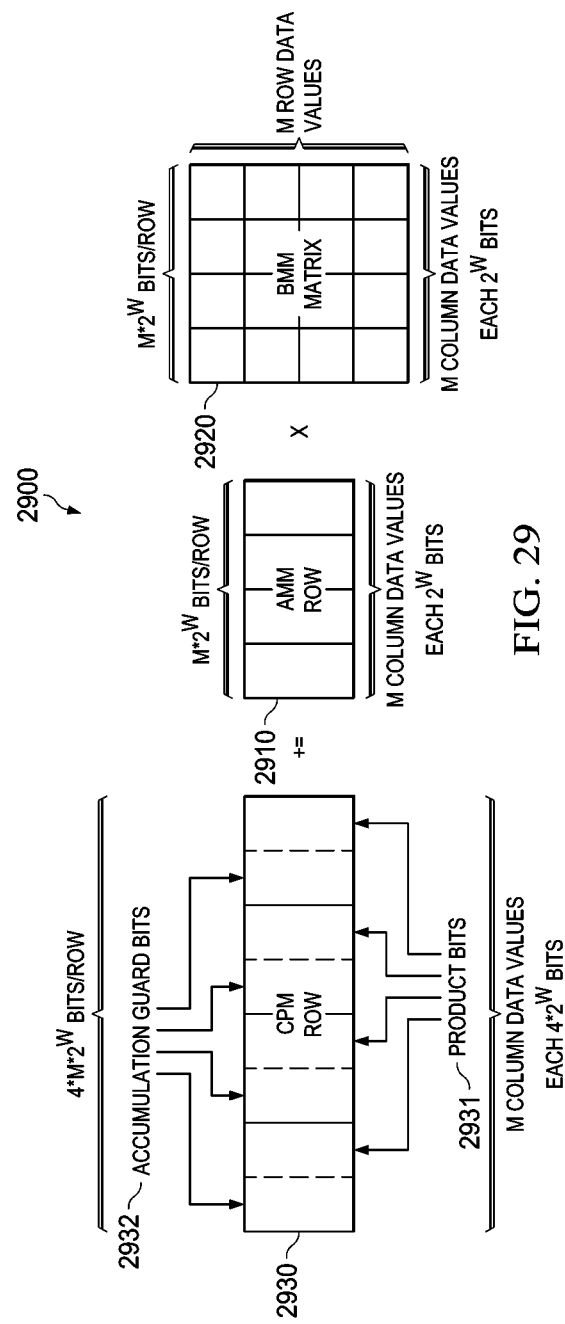
FIG. 29 illustrates a data format for a multiplication/accumulation operation and depicts typical AMM row data entry sizing, BMM matrix data entry sizing, and CPM row data entry sizing with product data bits and accumulation guard bits detailed.

This concept is generally depicted in FIG. 29 (2900) wherein an AMM (2910) by BMM (2920) product CPM (2930) is generated using scalar ROWs/COLs having M entries of $2^W$ bits in the AMM (2910) vector and BMM (2920) matrix. Data within the CPM (2930) includes a row having M column entries each comprising $4 \times 2^W$ bits, $2^{W+1}$ bits comprising the product result (2931) and $2^{W+1}$ bits comprising the accumulation guard bits (2932).

For many embodiments of the present disclosure the matrix multiplication is always on the full size of the AMM vector and BMM matrix. 8-bit operations always multiply a 64-element vector by a 64×64 element matrix. 16-bit operations always multiply a 32-element vector by a 32×32 element matrix. 32-bit operations always multiply a 16-element vector by a 16×16 element matrix. 64-bit operations always multiply an 8-element vector by an 8×8 element matrix.

The AMM×BMM operation is performed with sufficient operand and result widths such that wrap-around or saturation cannot occur. The CPM matrix storage element size has sufficient width to support a number of accumulations without wraparound or saturation. Long-running calculations can periodically store C matrix partial results for later processing in higher precision formats outside the RMM unit.

The 4×W data bit storage in the CPM matrix provides for approximately the following margins for repeated accumulations without overflow:

| AMM/BMM Data Width (bits) | CPM Data Width (bits) | Approximate number of accumulation operations without overflow |
|---|---|---|
| 8 | 32 | $2^{10}$ |
| 16 | 64 | $2^{27}$ |
| 32 | 128 | $2^{60}$ |
| 64 | 256 | $2^{125}$ |

Memory Vs. Data Precision (3000)

Figure 30:
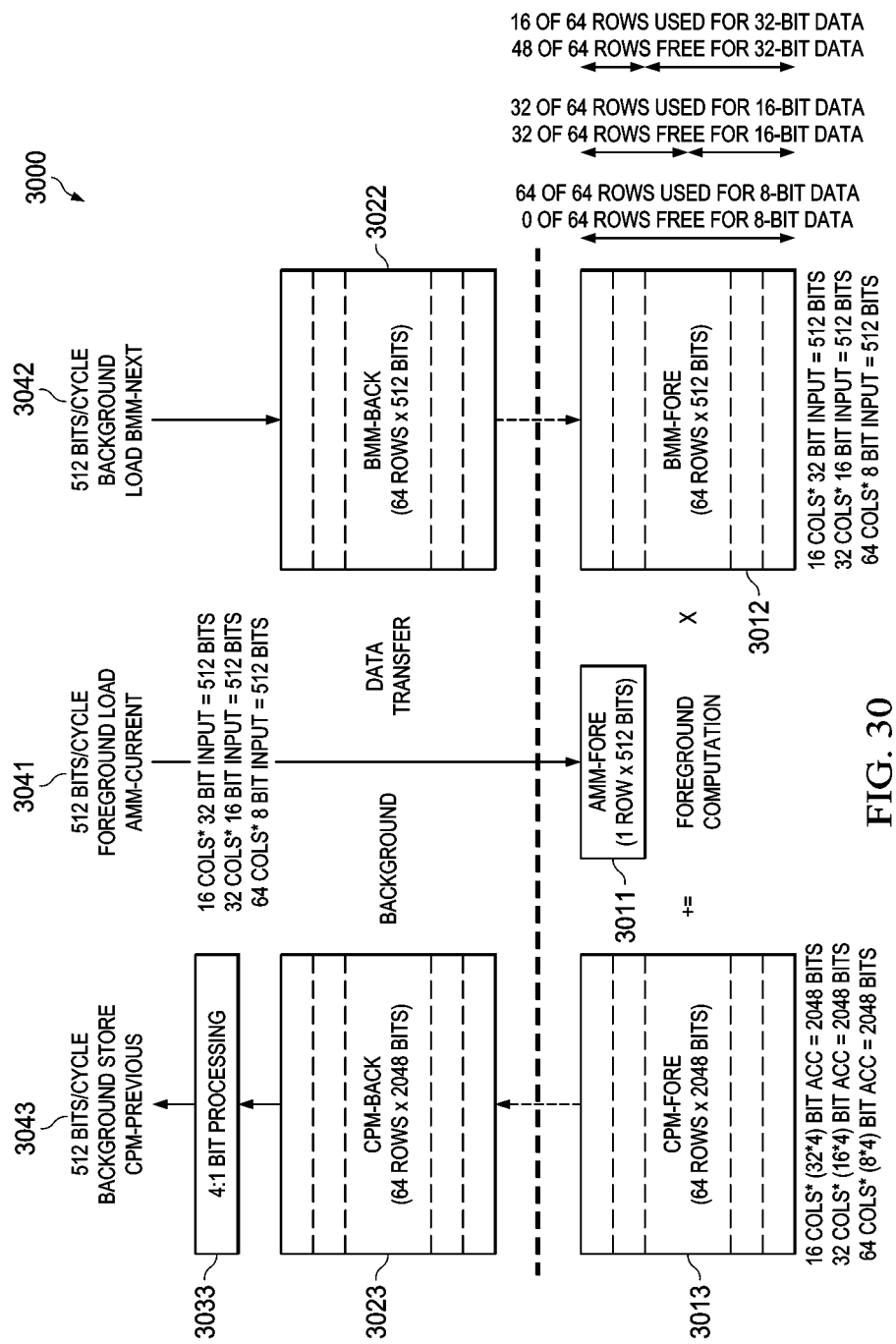
FIG. 30 illustrates a graphical depiction of memory vs. data precision in a system embodiment.

The present disclosure anticipates that local memory associated with the RMM and accessed via the LMB may be dynamically reconfigured based on the type of data being processed by the RMM. Thus, the LMB memory configuration varies dynamically based on the data precision of the data being operated on by the RMM. This technique is generally depicted in an embodiment employing a 512-bit EMB in FIG. 30 (3000) wherein a CPM+=AMM*BMM computation is performed using foreground (3011, 3012, 3013) memory arrays while background data transfers occur using background arrays (3022, 3023) and any multi-cycle bus access processing (3033).

It can be noted from this example that for the AMM row vector, memory requirements are the same irrespective of input data type. For the CPM and BMM matrices the following statements hold:
The 8 bit (lowest precision) input data type sets the memory requirements as it requires 64 rows.
The 16 bit and 32 bit input data types have 32 and 48 extra rows, respectively.
Extra rows can be used for extra panel storage or to simplify the hardware implementation.
The number of accumulator bits is typically four times the number of input data bits irrespective of the input data type. In some alternate embodiments, the number of accumulator bits is a bipolygonal multiple of the number of input data bits irrespective of the input data type. In some other alternate embodiments, the number of accumulator bits is a bipolygonal-power-of-two multiple of the number of input data bits irrespective of the input data type.
Thus it can be seen that for all but 8-bit data in this example, extra rows of the BMM and CPM matrices may be utilized for other functions.

Data Movement Vs. Data Precision (3100)

Figure 31:
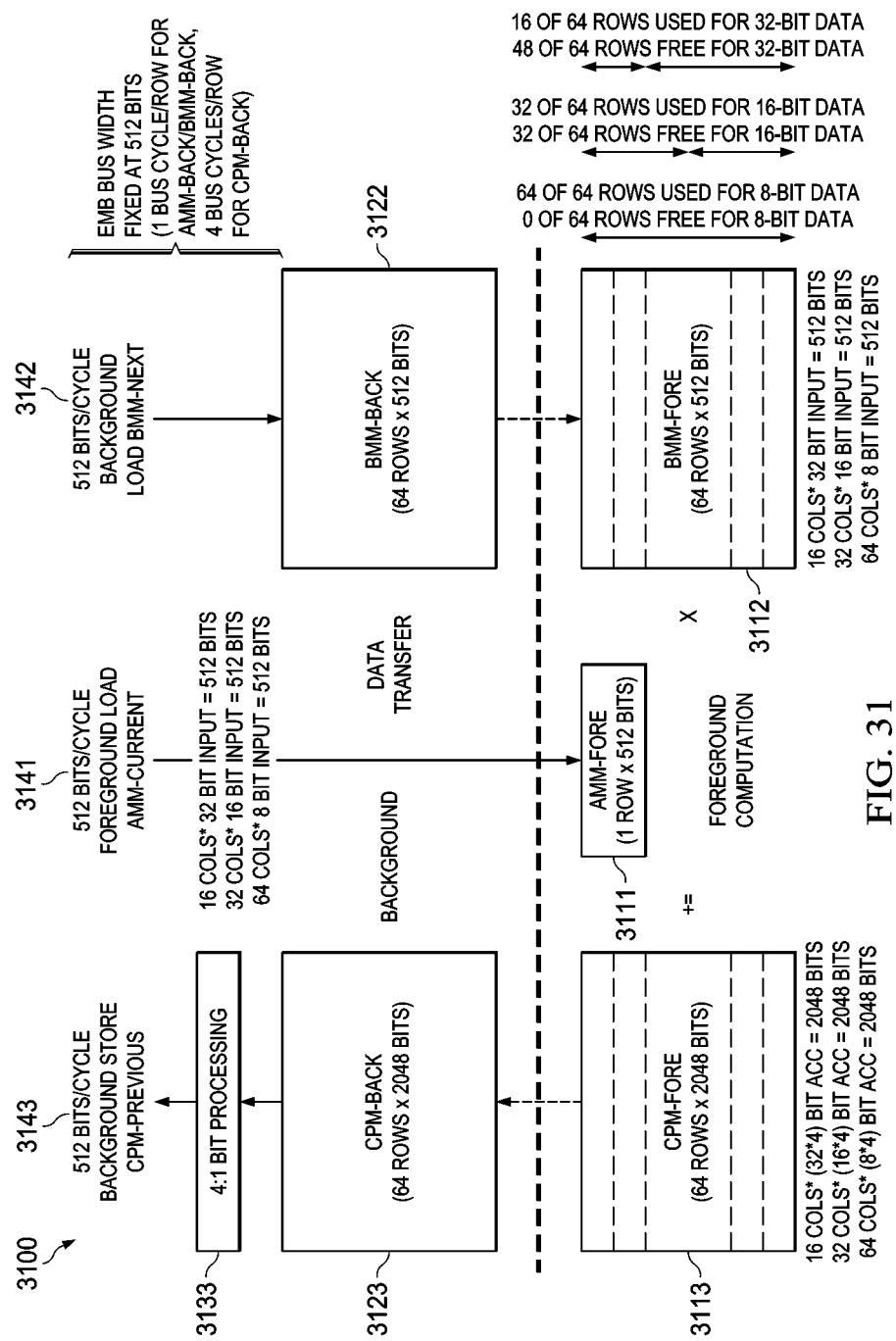
FIG. 31 illustrates a graphical depiction of data movement vs. data precision in a system embodiment.

As generally depicted in the embodiment employing a 512-bit EMB in FIG. 31 (3100) wherein a CPM+= AMM*BMM computation is performed using foreground (3111, 3112, 3013) memory arrays while background data transfers occur using background arrays (3122, 3123) and any multi-cycle bus access processing (3133), the present disclosure anticipates fixed per-cycle data movement in which:
Per cycle data movement requirements are identical irrespective of data precision because the matrix size scales with the precision to allow the matrix row bits to remain constant.
Each EMB bus cycle can load a row of AMM-fore or BMM-back and store a row of CPM-back.
Load or storing a square matrix for 8 bit data in a 64×64 matrix occurs in 64 EMB bus cycles.
Load or storing a square matrix for 16 bit data in a 32×32 matrix occurs in 32 EMB bus cycles.
Load or storing a square matrix for 32 bit data in a 16×16 matrix occurs in 16 EMB bus cycles.
Load or storing a square matrix for 64 bit data in an 8×8 matrix occurs in 8 EMB bus cycles.
One skilled in the art will recognize that these data movement details are only exemplary embodiments of many implementations of the present disclosure.

Multiplier Reuse/Compute Vs. Data Precision (3200)

Figure 32:
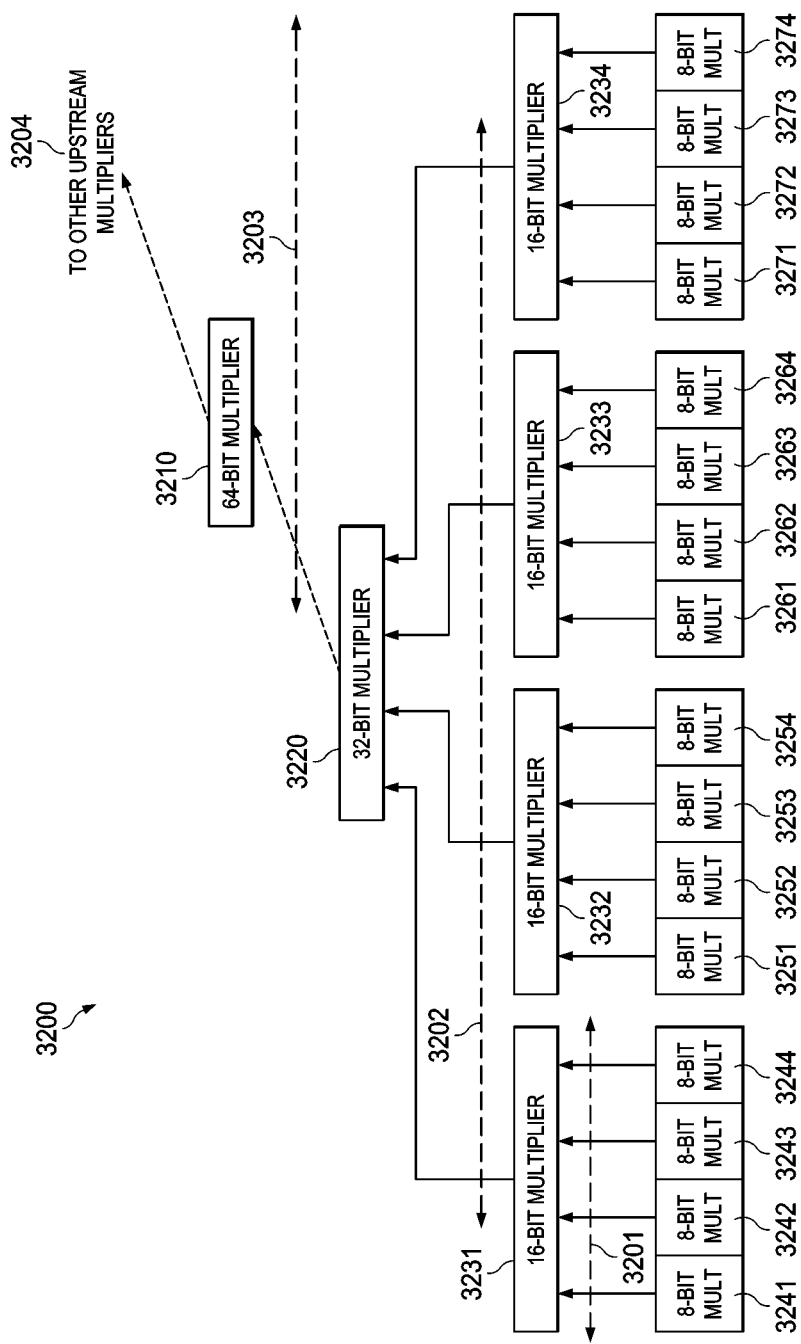
FIG. 32 illustrates a graphical depiction of multiplier reuse/compute vs. data precision in a system embodiment.

The present disclosure anticipates that the multiplication operations performed by the reconfigurable multiplier-accumulator (MAC) as taught herein may be implemented using a tiered multiplication approach so as to increase the reuse of multiplier hardware within implementations of the present disclosure. This tiered approach to the multiply calculation permits the RMM to reuse atomic P-bit multipliers in such a way that the data in the EMB may be dynamically re-interpreted to include a variety of data types. This hierarchical approach to the MAC is generally depicted in FIG. 32 (3200) that depicts a portion of a MAC system operating in the context of a 512-bit EMB data width. It can be discerned from the example tree hierarchy depicted in FIG. 32 (3200) that:

- The number of 8 bit fixed point multiplies per cycle ($64^2=4096$) (3201) is exactly a 4:1 ratio to the required number of 16 bit multiplies per cycle ($4096/4=32^2=1024$) (3202);
- The number of 16 bit fixed point multiplies per cycle is exactly a 4:1 ratio to the required number of 32 bit multiplies per cycle ($1024/4=16^2=256$) (3203);
- Four P bit fixed point multipliers can be efficiently combined to implement one 2*P bit fixed point multiplier;
- As the MACs/cycle scale by ¼ for every doubling of the data precision, there is a maximum amount of computer hardware reuse across precisions.

For example, a 2*P bit fixed point multiplier can be built from four P bit fixed point multipliers with some additional shifts and adds. Examples depicted provide for 8→16→32 bit multipliers ($high_b/low_b$ refers to the high/low b bits of a 2*b bit number and $2^n$ is efficiently implemented as a left shift by n bits):

$$x_{32}*y_{32} = (xhigh_{16}*2^{16} + xlow_{16})*(yhigh_{16}*2^{16} + ylow_{16})$$
$$= (xhigh_{16}*yhigh_{16}*2^{32}) +$$
$$(xhigh_{16}*ylow_{16}*2^{16}) +$$
$$(xlow_{16}*yhigh_{16}*2^{16}) +$$
$$(xlow_{16}*ylow_{16})$$

$$x_{16}*y_{16} = (xhigh_8*2^8 + xlow_8)*(yhigh_8*2^8 + ylow_8)$$
$$= (xhigh_8*yhigh_8*2^{16}) +$$
$$(xhigh_8*ylow_8*2^8) +$$
$$(xlow_8*yhigh_8*2^8) +$$
$$(xlow_8*ylow_8)$$

One skilled in the art will recognize that these techniques may be equally applied to any size of scalar multiplication/accumulation operation and are not limited to the bit widths described above. Generally speaking the present disclosure anticipates that the optimal width of the EMB bus is a power-of-two, with many implementations utilizing 512-bit bus widths. This power-of-two sizing allows simplified memory addressing, but also permits the ratio of the EMB bus width to the individual scalar datum width to be a power-of-two as well. For example a 512-bit EMB bus width is evenly divisible by 8-bit individual scalar datum widths such that 64 8-bit bytes may be contained within one 512-bit EMB bus cycle. Similar conditions exist for 16-bit, 32-bit, 64-bit, 128-bit data. One skilled in the art will recognize pattern provided for in FIG. 32 (3200) may be expanded (3204) to any number of nested multiplication operations of arbitrary bit widths.

Exemplary Vector/Matrix Multiplier (3300)-(3400)

Figure 33:
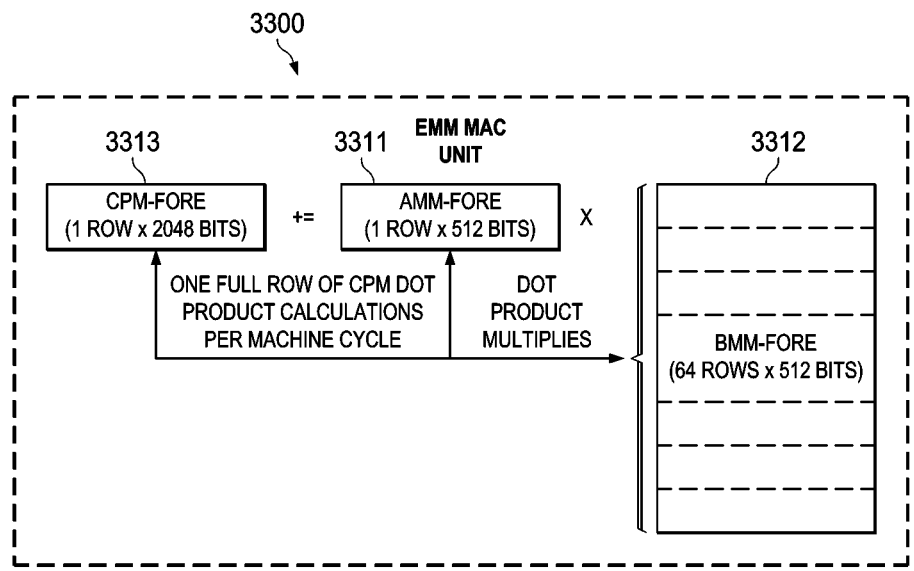
FIG. 33 illustrates a multiplier/accumulator embodiment in which a CPM vector is calculated using a dynamically loaded AMM vector and statically loaded BMM matrix.

The present disclosure will now be described in terms of an exemplary embodiment wherein a CPM+=AMM*BMM matrix multiplication is performed wherein the CPM and AMM matrices are vector quantities and the BMM matrix is square. For this example, the EMB bus will be assumed to be 512 bits in length dictating that the AMM vector be 512 bits in length, each row of the CPM vector to be 4*512=2048 bits in length, and each row of the BMM matrix be 512 bits in length. This example will also assume a minimum individual scalar bit width of 8 bits, allowing for 8×8 multiplications to occur in additions to binary multiples of this (16×16, 32×32, 64×64). A typical RMM compute configuration with these parameters is generally depicted in FIG. 33 (3300) wherein column entries of the AMM vector (3311) are multiplied by row entries of the BMM matrix (3312) and summed to produce a single column entry within the CPM result vector (3313).

For each column entry in the CPM result vector (3313), a corresponding dot product is produced using the same AMM vector (3311) and a new column of the BMM matrix (3312). Depending on the scalar data type selected for the reconfigurable multiplication operation, a different number of rows in the BMM matrix (3312) will be utilized in the dot product calculation, as the number of scalar entities in the AMM vector (3311) will vary based on the scalar data type selected (64 8-bit entities, 32 16-bit entities, 16 32-bit entities, 8 64-bit entities, etc.).

The RMM is configured with a sufficient number of hardware multiplier/accumulator units to simultaneously compute all the resulting columns in the CPM vector (3313) based on the required number of individual dot products occurring between the AMM vector (3311) column entries and the corresponding row entries in the BMM matrix (3312). For example, if configured for 8×8 multiplication, each machine cycle of the MAC units in the RMM will compute 64 dot products in the CPM row (3313) that correspond to the dot product of 64 row elements of AMM (3311) and each of the 64 columns (each containing 64 rows) in BMM (3312).

In this configuration where the CPM matrix (3313) and AMM matrix (3311) represent vectors, the RMM system may be configured to allow application control logic (ACL) to initially fill the contents of the BMM matrix (3312) with static data and then sequentially write data to the AMM register (3311) which automatically triggers a matrix multiplication operation of CPM(row)=AMM(row)*BMM(matrix) and thus generate a new CPM row value. The computed CPM row value is then automatically written back to the EMB using foreground/background techniques previously discussed (with optional data transformation/lookup operations as previously discussed). This cycle may continue as new AMM row entries are written to the AMM vector (3311) by the ACL, subsequently multiplied by the statically stored BMM matrix (3312), and stored in the CPM vector (3313) (with subsequent transfer to the EMB).

Figure 34:
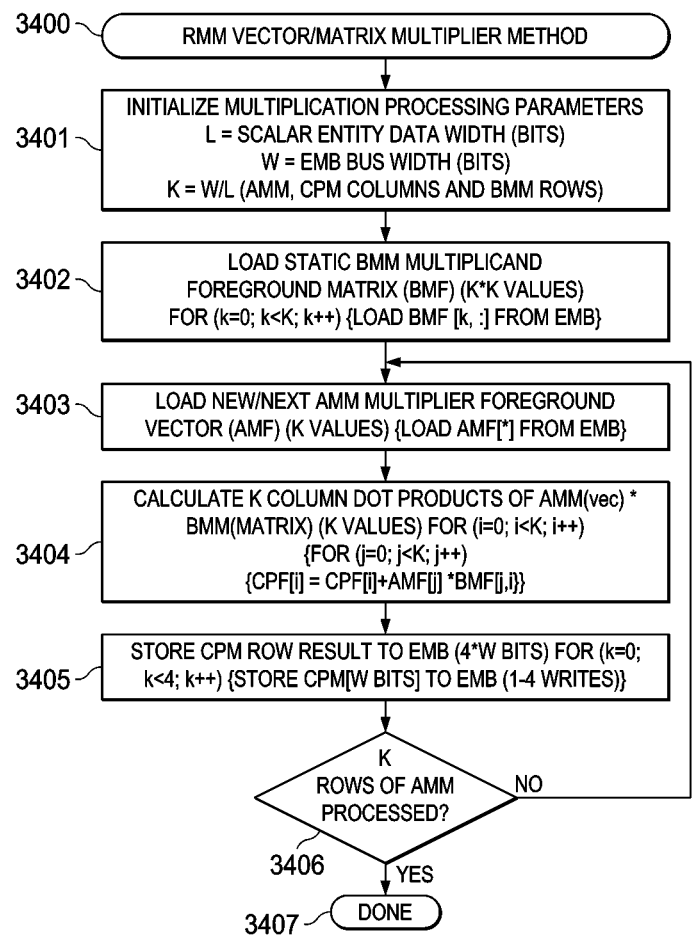
FIG. 34 illustrates a flowchart depicting a RMM vector/matrix multiplier method in which a dynamically loaded AMM vector is simultaneously dot product multiplied against multiple columns of a static BMM matrix to produce a CPM vector result that is stored in multiple bus cycles to the EMB and wherein loading of new AMM vectors results in subsequent dot-product multiplications that result in subsequent CPM results such that an entire AMM*BMM matrix multiply may be accomplished using multiple loads of an AMM vector which trigger multiply/accumulate operations and CPM vector storage.

This typical multiply/accumulate bus cycle can be generally described in terms of the flowchart depicted in FIG. 34 (3400) wherein the RMM vector/matrix multiplication method includes the steps of:
(1) Initializing multiplication processing parameters (L=scalar entity data width (bits); W=EMB bus width (bits); K=W/L (AMM,CPM columns and BMM rows)) (3401);
(2) Loading a static BMM multiplicand foreground matrix (BMF) (K*K values) (3402);
(3) Load a new/next AMM multiplier foreground vector (AMF) (K values) (3403);

(4) Simultaneously calculating K column dot products of AMM(vec)*BMM(matrix) (K dot product values) (3404);
(5) Storing the CPM product row result to EMB (4*W bits) using 1-4 EMB write cycles (number of write cycles dependent on output data type requirements) (3405);
(6) Determining if K rows of AMM vectors have been processed, and if not proceeding to step (3) (3406); and
(7) Terminating the RMM vector/matrix multiplication method (3407).

This method assumes that the CPB and AMM matrices are vectors and calculation of an AMM*BMM matrix product wherein the AMM multiplier is a matrix having more than one row is accomplished using multiple AMM vector multiplies against a static BMM matrix. This is accomplished using the looping logic in step (6) but may be in some instances simply be accomplished by multiple writes to the AMM memory (3311) using sequential ACL write functions or equivalently a FIFO memory between the ACL and AMM memory that feeds sequential rows of the AMM matrix to the AMM vector (3311). In any case, the RMM is configured to simultaneously during each bus cycle compute K column elements of the CPM vector (3330) using K dot product multiplies of the AMM vector (3310) against a selected column of the BMM matrix (3320). One skilled in the art will recognize that the EMB bus width W and scalar entity bit length L may be varied in a number of ways without departing from the spirit of the disclosure.

Exemplary Output Formatting Logic (3500)-(3600)

Figure 35:
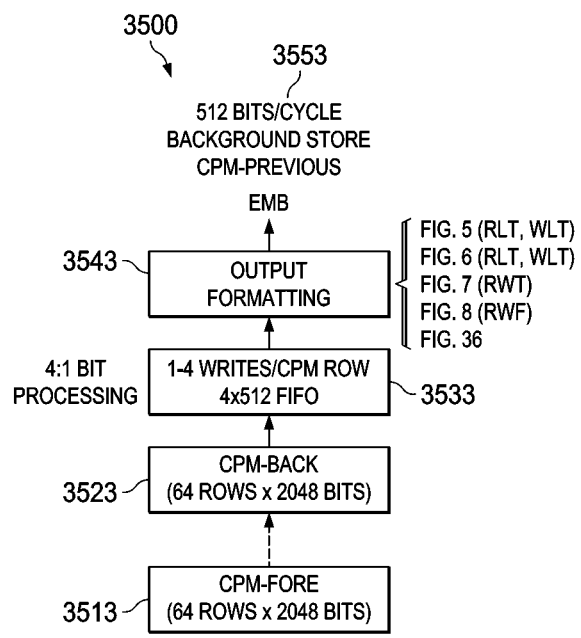
FIG. 35 illustrates a system embodiment employing a reconfigurable output formatting interface to the EMB.

As generally depicted in FIG. 35 (3500), the present disclosure anticipates that as the CPM-fore (3513) foreground data is calculated and later referenced internally as CPM-back (3523) background data, it will be transferred (3533) and formatted (3543) before being eventually transferred to the EMB (3553).

The present disclosure anticipates that many RMM implementations will provide for flexible output formatting (3533) to transform the CPM accumulator element data formats into a range of output element sizes and Q points. Several of these data lookups/transform have been discussed in relation to FIG. 5 (0500)-FIG. 8 (0800). In several embodiments a combined output formatting unit is anticipated. This output formatting method is generally illustrated in the flowchart of FIG. 36 (3600). Within this context and applied to an exemplary application having a 512-bit EMB bus width, in a typical X0 output pipeline stage, the 2048-bit CPM storage element (3601) is right shifted in a multistage SIMD barrel shifter with 4 32-bit-stride selections (3602, 3603), 4 8-bit-stride selections (3604, 3605), and 8 1-bit-stride selections (3606, 3607). The shift amount (3699) is decremented prior to the X0 output pipeline stage in cases where the shift is non-zero so that the LSB-1 position is available for the rounding addition. CPM element type specific logic preprocesses the data to handle sign/zero extension and operand boundaries before each shifter stage. After the shift is complete, an early saturation check (3608) is performed to eliminate deep logical AND and OR reduction trees from the critical path. The early saturation detection cases are adjusted after rounding by examining a small number of bits. In the X1 output pipeline stage (3609), the shifted CPM elements are optionally incremented in the LSB-1 weight by a binary single instruction multiple data (SIMD) adder (3610). The rounding incrementer output is shifted by one more position to the right and the final saturation detection is performed (3611). Finally, the output fields or saturation values are selected (3612). Up to the final output field selection (3613), processing on elements from the CPM matrix is performed at the CPM element width.

As generally depicted in FIG. 35 (3500), the data portion of the transfer buffer contains 4 rows of 512 bits. It has a write port used by the transfer finite state machine to move data from CPM storage into the transfer buffer. The transfer buffer also has a read port used by RMM instructions to move data from the RMM unit to an ACL vector register. The read and write ports are independent. The write port can bypass data to the read port when there is a simultaneous write and read on the same transfer buffer row. All read and write accesses to the transfer buffer are 512 bits wide in many embodiments. The transfer buffer storage elements are optimally clock-gated standard cell scanable flip-flops or the like.

Exemplary System Implementation (3700)

Figure 37:
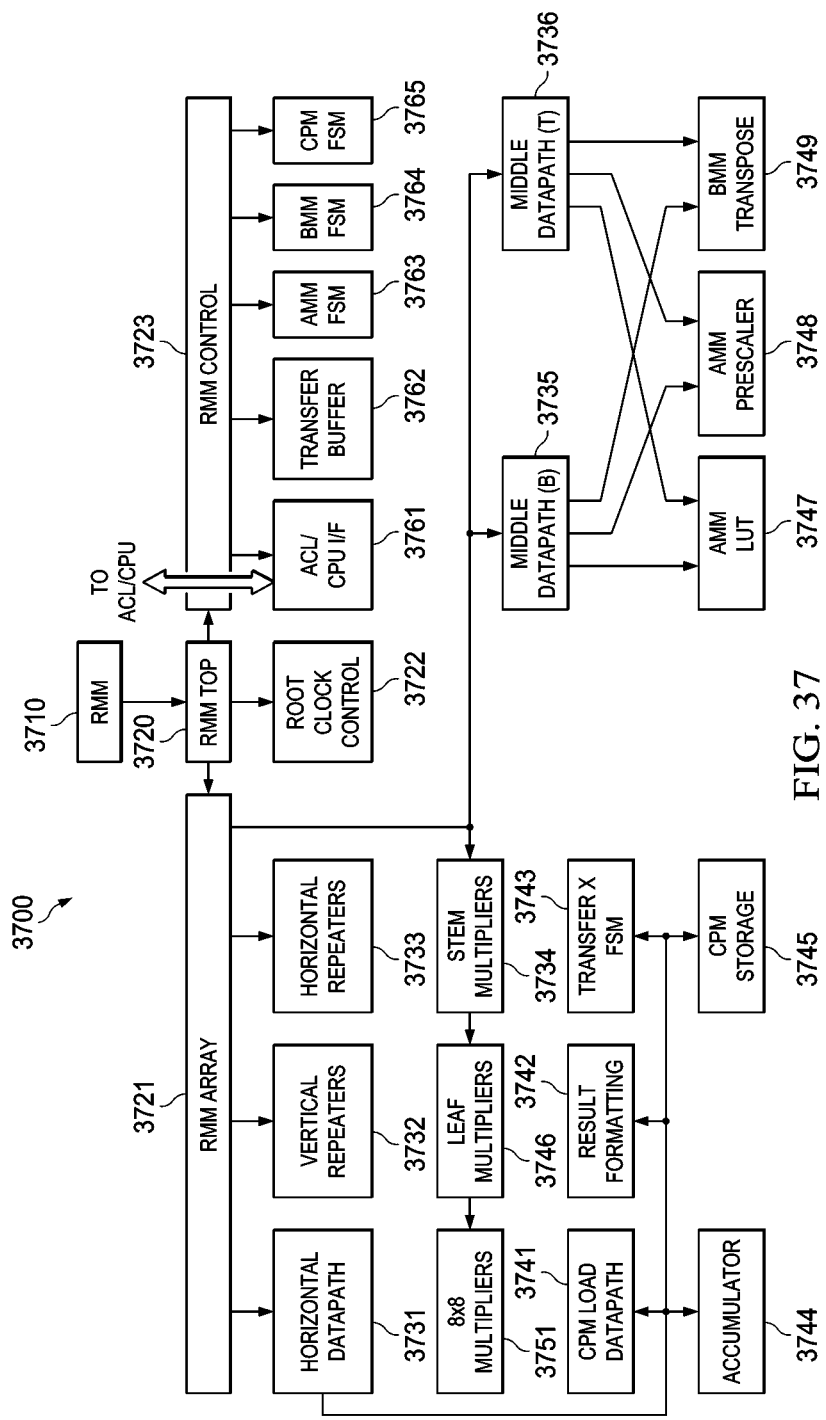
FIG. 37 illustrates a block diagram depicting function blocks and control flow for a system embodiment of the present disclosure.

A detailed block diagram of functions and data paths associated with a typical RMM implementation is depicted in FIG. 37 (3700) wherein the RMM (3710) is broken down into a top level RMM function block (3720) comprising the RMM array (3721), root clock control/generator (3722), and RMM control logic (3723).

The RMM array (3721) includes additional function blocks including a horizontal data path (3731), vertical repeaters (3732), horizontal repeaters (3733), stem multipliers (3734), a middle data path bottom (3735), and a middle data path top (3736).

The horizontal data path (3731) further includes a CPM load data path (3741), result formatter (3742), transfer data path finite state machine (RSM) (3743), accumulator (3744), and CPM storage (3745).

The multipliers used within the RMM system are hierarchically tiered such that stem multipliers (3734) are arrayed and include internally arrayed leaf multipliers (3746) which include internally arrayed 8×8 multipliers (3751) that are implemented as radix-8 Booth multipliers.

The middle data path bottom (3735) and a middle data path top (3736) interface to support for an AMM lookup table (LUT) (3747), AMM prescaler (3748), and BMM transpose unit (3749). The AMM lookup table (LUT) (3747) and/or AMM prescaler (3748) may incorporate additional logic to perform data translation as well as lookup functions as described herein. The BMM transpose unit (3749) allows the BMM matrix to be loaded in row-major or column-major order and thus allows automated matrix transposition on BMM loading. This row-major/column-major order selection may be determined in part by data stored in the mode/control register (MCR) and/or the function/opcode register (FOR). Furthermore, the loading of data into the BMM may be adjusted via a transfer offset register (TOR) that determines the offset in the BMM to which data is transferred.

RMM control logic (3723) provides for an ACL/CPU interface (3761), transfer buffer logic (3762), AMM finite state machine (FSM) (3763), BMM finite state machine (FSM) (3764), and CPM finite state machine (FSM) (3765). This control interface allows the external ACL/CPU to interface to the RMM (3710) and coordinates data transfers between the AMM, BMM, and CPM and the ACL/CPU. This control interface is also responsible for triggering multiply/accumulate operations, performing system diagnostics, and providing software debugging support for the RMM when used in conjunction with the external ACL/CPU.

Exemplary System Implementation (3700)

Figure 38:
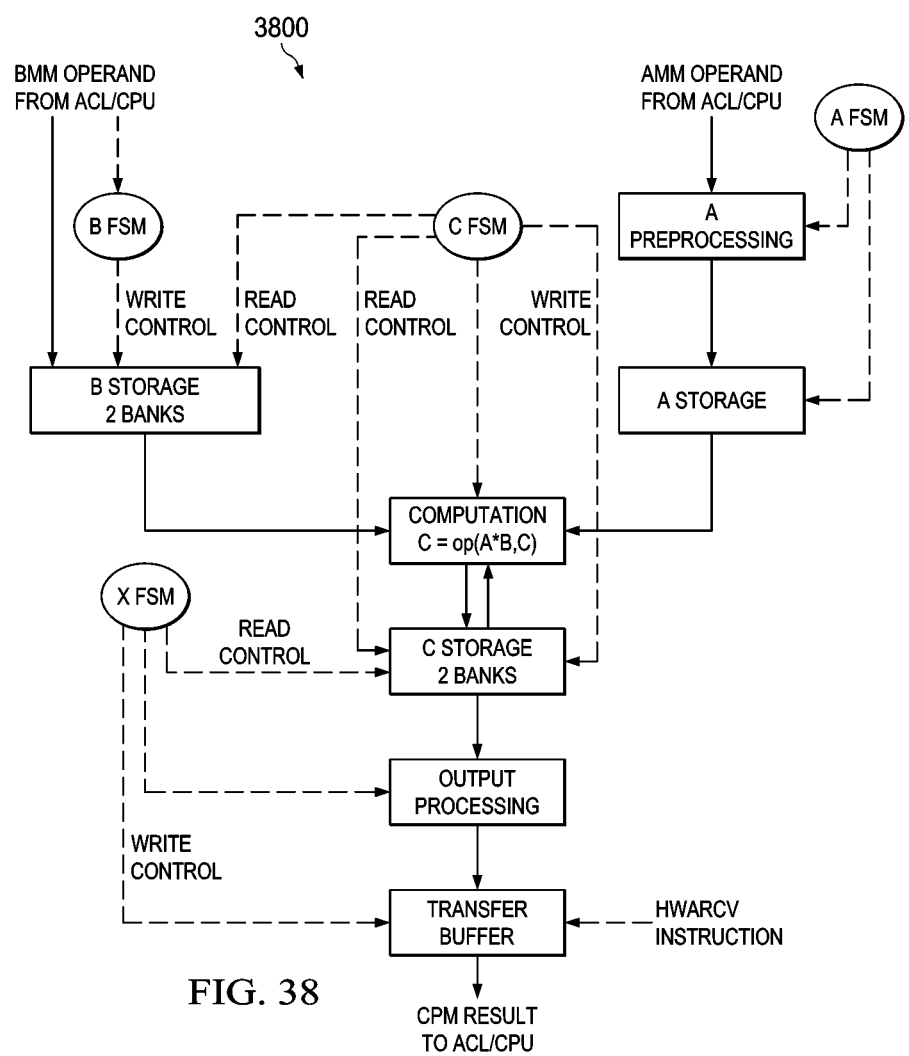
FIG. 38 illustrates a computation processing state machine/data flow diagram associated with many embodiments.

Consistent with the system block diagram of FIG. 37 (3700), the present disclosure may utilize a computation state machine/data flow configuration as generally depicted in FIG. 38 (3800).

As shown in FIG. 38 (3800), dataflow in the RMM is fixed and proceeds from the operand inputs to operand storage. The matrix multiplication operands are next read and multiplied and added with an optional earlier value from the CPM matrix storage. The CPM matrix results are passed through an output processing block to an output buffer which is accessed by the ACL/CPU. Major control paths are indicated with dashed lines.

Exemplary Computation State Machine/Data Flow (3900)

Figure 39:
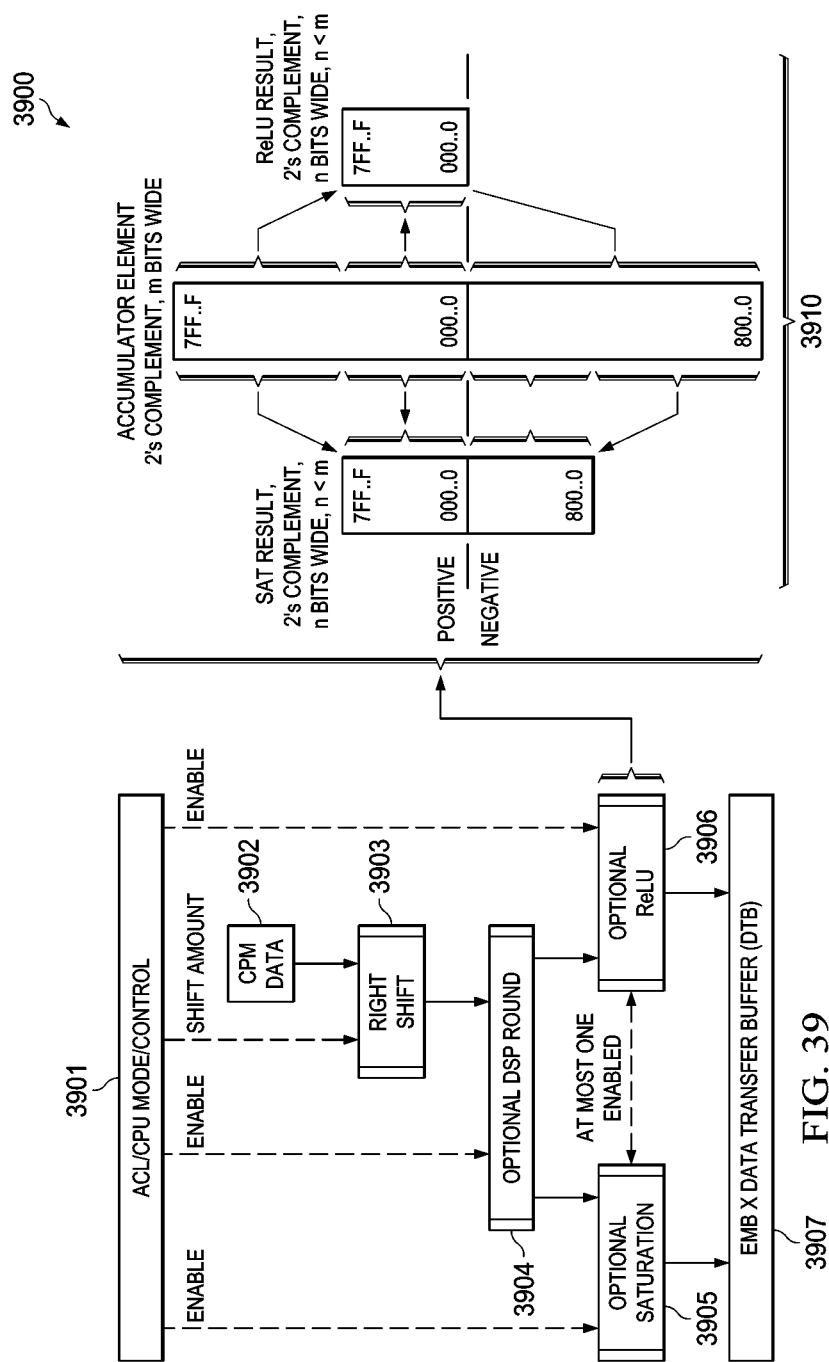
FIG. 39 illustrates a output formatting state machine/data flow diagram and saturation/ReLU translation mapping associated with many embodiments.

Consistent with the system block diagram of FIG. 37 (3700) and data flow diagram of FIG. 38 (3800), the present disclosure may utilize an output data formatting (ODF) state machine/data flow configuration as generally depicted in FIG. 39 (3900).

The X FSM controls subfunctions that make up the output processing block in the RMM unit. The order of subfunctions is fixed but the subfunction operation may be parametrized by fields in the ACL/CPU control/mode register (3901).

The shift amount must be less than width of the element size of the CPM matrix (3902). The DSP round step (3903) is a 1/2-LSBweight increment followed by truncation (3904), or:

$$\text{rounded} = ((C\text{ value} \gg (\text{shift}-1))+1) \gg 1$$

where shift is the ACL/CPU control/mode register value. Rounding (3904) is suppressed when the ACL/CPU control/mode register value is zero. The system also permits the CPM matrix (3902) value to be range limited using a variety of methods, two of which (saturation (SAT) (3905) and ReLU (3906)) are depicted. ReLU (3906) is implemented as a case of saturation (SAT) (3905) that changes the lower limit from the smallest representable number to zero. In both ReLU (3906) and SAT (3905) modes, numbers too large to represent in the destination format are converted to the maximum representable number in the destination format written to the X transfer buffer (3907). ReLU (3906) and SAT (3905) modes are detailed (3910) on the right side of FIG. 39 (3900) and should not be simultaneously enabled.

Exemplary MAC IC Floorplan Physical Placement (4000)-(4400)

While the system block diagram of FIG. 37 (3700) may be implemented in a variety of ways, several construction techniques utilizing semiconductor integrated circuit (IC) technologies are envisioned. Exemplary floorplans for these implementations will now be discussed in detail.

Exemplar IC Floorplan (4000)

The present disclosure is anticipated to be typically implemented using integrated circuit (IC) technology generally as part of a system-on-a-chip (SOC) as discussed previously. Within this context the organization of the multiplier/accumulator (MAC) functions within the RMM may be used to optimize the physical layout, improve data transfer latencies, and provide for a uniform interface to the ACL component of the SOC. An example of this MAC organization is generally depicted in FIG. 40 (4000) for an exemplary RMM having a 64×64 8-bit MAC functionality capable of simultaneously performing a full row of AMM 64 8-bit MAC column operations against a BMM 8-bit matrix of dimensions 64×64.

Figure 40:
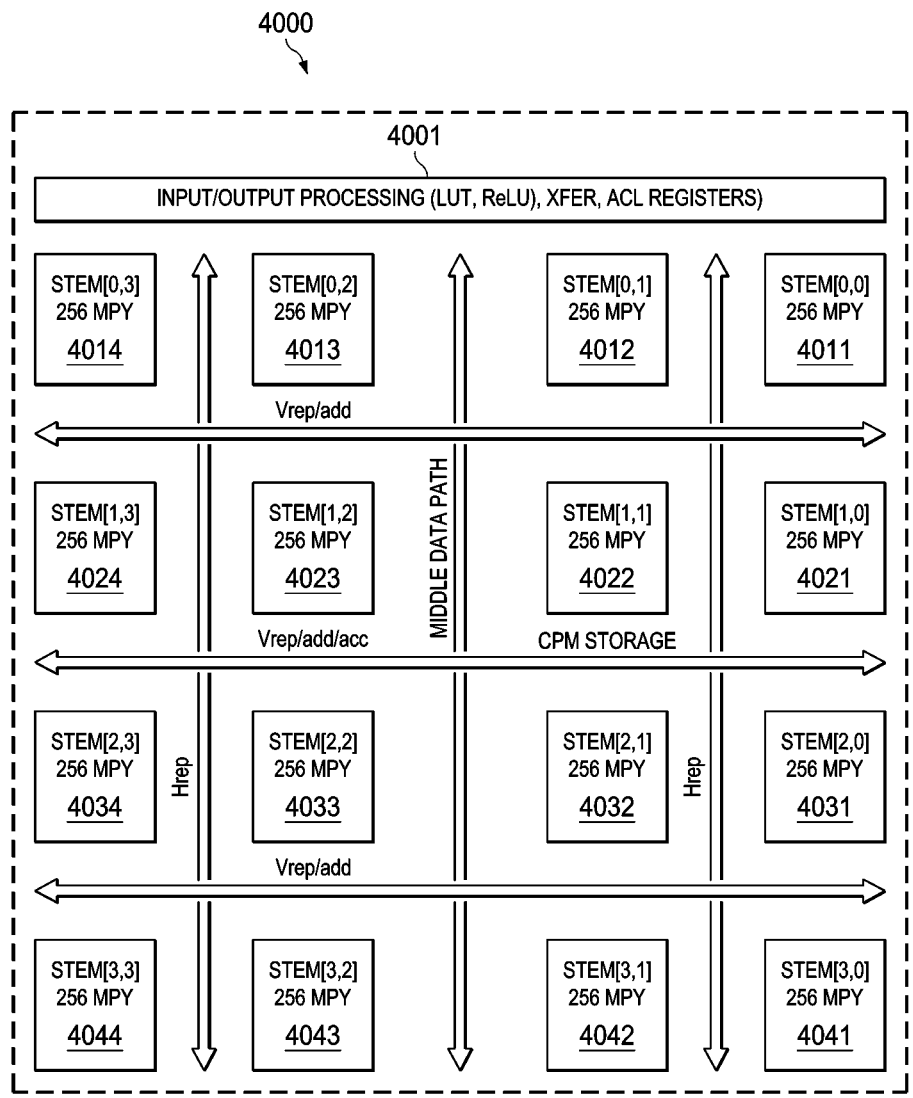
FIG. 40 illustrates a top level block diagram depicting an integrated circuit (IC) floorplan for a RMM implementation.

The exemplary top level floorplan depicted in FIG. 40 (4000) is composed of an array of hierarchical multiply-accumulate modules (4011, 4012, 4013, 4014, 4021, 4022, 4023, 4024, 4031, 4032, 4033, 4034, 4041, 4042, 4043, 4044) a data path for operand pre-processing, and an interface/control region (4001). The interface and control region (4001) is at the top of the EMM unit and is expected to be adjacent to the ACL or supervisory CPU. Vector operands and results that pass between the ACL/CPU and RMM unit are interleaved but not folded and extend across a large fraction of the horizontal width. The least significant bits of these vector data busses are on the right-most top side of the RMM unit floorplan as depicted. These bits also correspond to the lowest-numbered vector element contained by these busses. The stem array multiplier (SAM) modules (4011, 4012, 4013, 4014, 4021, 4022, 4023, 4024, 4031, 4032, 4033, 4034, 4041, 4042, 4043, 4044) that instantiate the multipliers are arranged in a 4×4 array. Vertical sections between the columns of stem arrays contain repeaters (Vrep) and operand processing logic. Horizontal sections between the rows of stem arrays contain adders and repeaters. The middle horizontal section (Vrep/add/acc/CPM storage) is typically reserved for the final accumulator, CPM matrix storage, CPM operand shifting, and output processing.

Scaling the RMM design depicted in FIG. 40 (4000) is accomplished by increasing or decreasing the number of stem array multiplier (SAM) modules (4011, 4012, 4013, 4014, 4021, 4022, 4023, 4024, 4031, 4032, 4033, 4034, 4041, 4042, 4043, 4044) instances. Ideally the number of stem array multiplier (SAM) modules (4011, 4012, 4013, 4014, 4021, 4022, 4023, 4024, 4031, 4032, 4033, 4034, 4041, 4042, 4043, 4044) should have an integer power-of-two square root for optimal implementation efficiency. One skilled in the art will recognize that the exemplary implementation of FIG. 40 (4000) may be expanded or contracted based on the needs of a particular application context.

Dataflow

Dataflow associated with this exemplary floorplan is described as follows. Operands and instructions enter interface logic in the top block of the floorplan. The BMM vector rows and AMM vector are distributed to the multipliers in the leaf module as described herein, but generally from top to bottom of the RMM floorplan and with clocked repeaters in the regions between the stem modules. Products from the stem modules are summed to form dot products in a binary tree. The root of the tree is physically in the middle horizontal section of the floorplan between rows 1 and 2 of the stem array multiplier (SAM) module instances. The middle section also contains the CPM matrix storage and the output processing data path. Results from the output processing data path travel up to the interface block where the transfer buffer is located. Processing of the ACL/CPU instructions which read the transfer buffer is totally confined to the region at the top of the floorplan.

Decode and Operand Distribution Pipeline Stages

The present disclosure anticipates that pipelining may be incorporated into the RMM system as taught herein, including but not limited to a number of decode and operand distribution pipeline stages. Within this context, there are typically 7 pipeline stages associated with instruction decode, FSM processing, and operand distribution to the leaf level multipliers. They are herein named d0 through d6. The path that defines the pipeline depth is from the AMM operand, through the pre-scaling data path and the operand distribution to the leaf level multiplier operand registers. In reality, different groups of leaf level multipliers may observe different AMM operand delays based on their location. These delays are balanced with compensating delays in the dot product summation trees. The advantage of performing the compensation in the adder trees rather than the leaf operands is that it reduces the cut size in the tree where delay flops need to be inserted.

Computation Pipeline Stages

The computation pipeline stages span the data flow from the leaf multiplier operand registers to the output of the accumulator that adds or subtracts the per-column dot products with a prior CPM row value. Four pipeline stages are allocated for the leaf multiplier array. Four additional pipeline stages are allocated for the remaining summations in the adder tree (2 in the stem arrays plus 2 adding stem results). Two stages are allocated to the CPM row accumulation and conversion to binary from carry-save format. Finally, one stage is allocated for the CPM matrix storage write setup time. These combine to form 11 pipeline stages for the computation hardware referred to herein as c0 through c10.

Stem Array Multiplier (SAM) Module Detail (4100)

Figure 41:
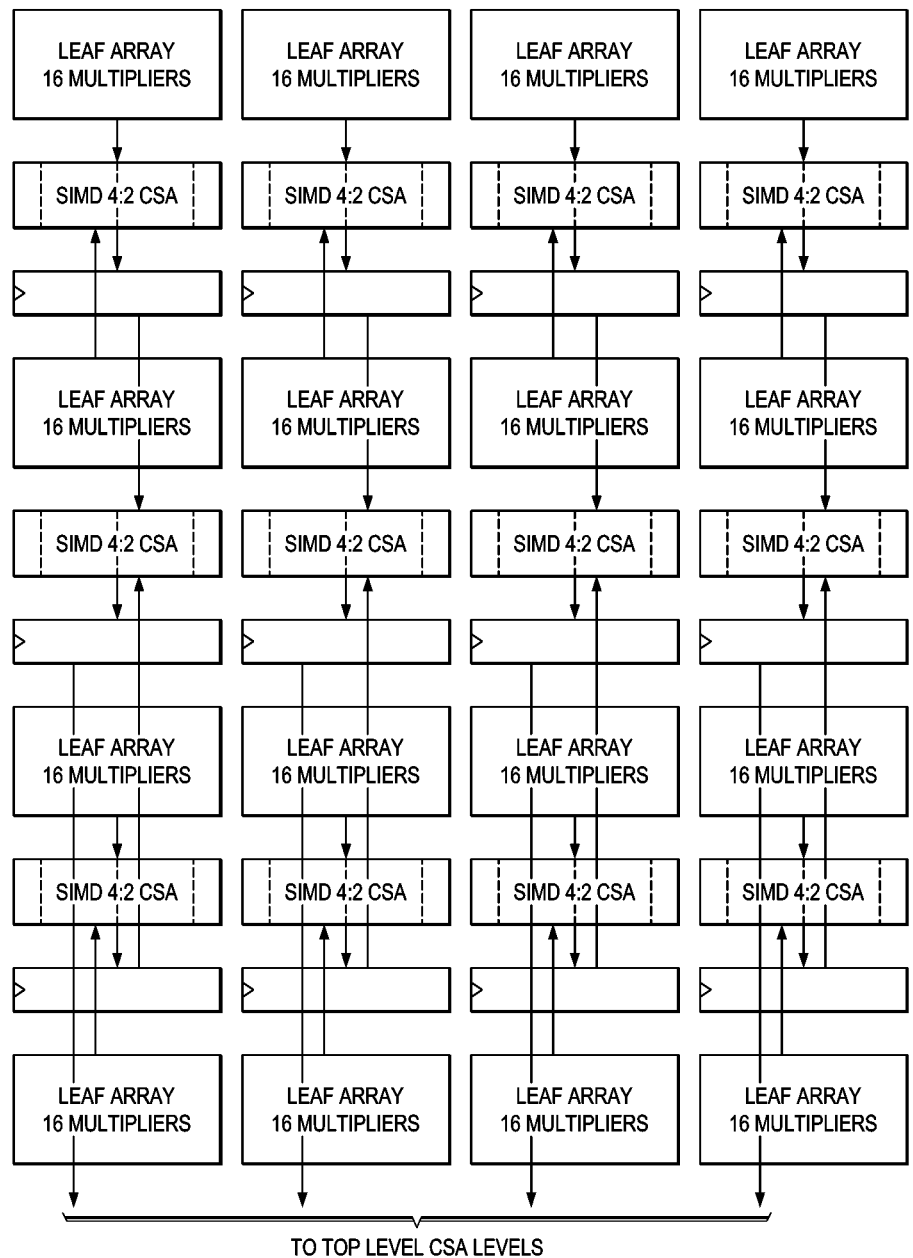
FIG. 41 illustrates a block diagram depicting an integrated circuit (IC) floorplan for a stem array multiplier module (SAM) implementation useful in some preferred disclosure embodiments.

Additional detail of the stem array multiplier (SAM) modules is provided in FIG. 41 (4100) that depicts a typical stem array multiplier (SAM) modules floorplan. As can be seen from this diagram the stem multiplication array is further hierarchically defined in terms of leaf array multiplier modules (LAMs). In this embodiment, the stem array multiplier (SAM) module is composed of 16 instances of the leaf array multiplier module (LAM) and indirectly instantiates 256 multipliers. The packed SIMD results from the leaf array multiplier modules are combined in two levels of 4:2 SIMD carry save adders to contribute to the dot product summation. Each level of addition is followed by a pipeline register to provide sufficient time for transport delay and the subsequent additions. Sixteen instances of the stem array multiplier (SAM) modules are instantiated in the top-level floorplan to form the full 4096 MMA multipliers. For pitch matching with other RMM components the width of the stem array multiplier (SAM) module is typically approximated to 128 flip flop widths.

Leaf Array Module (LAM) Detail (8-Bit) (4200)

Figure 42:
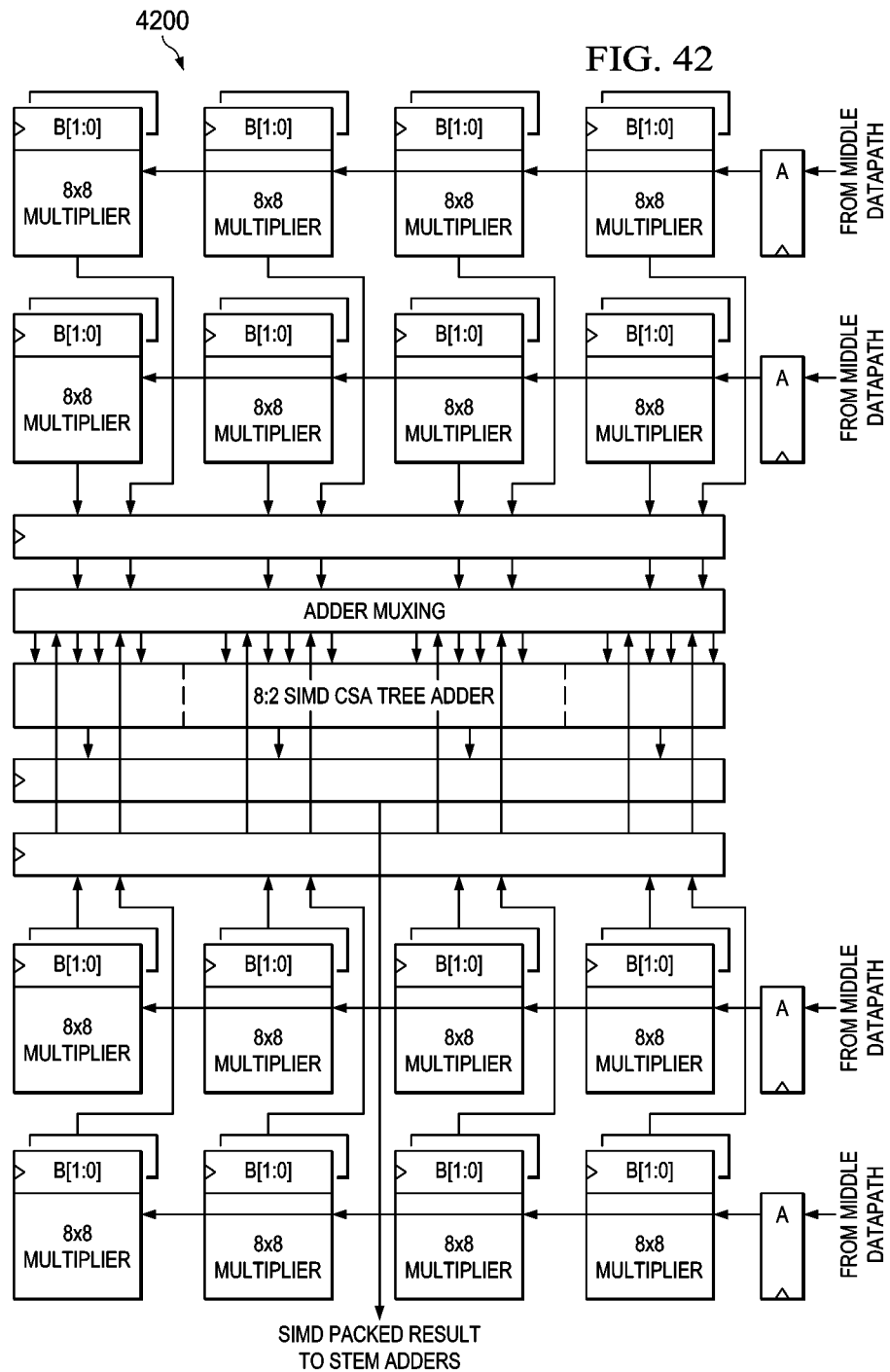
FIG. 42 illustrates a block diagram depicting an integrated circuit (IC) floorplan for a leaf array multiplier module (LAM) implementation (with data path configured as shown in 8×8 multiply mode) useful in some embodiments.

Each of the stem array multiplier (SAM) modules depicted in FIG. 40 (4000) includes leaf array multiplier modules (LAMs) as depicted in FIG. 41 (4100). Additional detail of a typical leaf array multiplier module (LAM) operating in 8-bit mode is provided in FIG. 42 (4200). All the multipliers in the RMM unit are located in the leaf array multiplier module (LAM) as generally depicted in FIG. 42 (4200). The leaf array multiplier module (LAM) is replicated in a tree structure to construct the full set of RMM multipliers. The leaf array multiplier module (LAM) also includes the first level dot product CSA adders, pipeline registers, and data muxing to support the different operand size and signed/unsigned options. The lowest-level multiplier block is an 8×8 radix-8 Booth multiplier. The BMM data is always connected to the Booth encoded multiplier operand. The four AMM vector data elements are pre-scaled in the middle data path and connect to the partial product generator data inputs for the non-recoded operand. Pre-scaling in the middle data path avoids replication of pre-scaling hardware in each leaf multiplier and saves chip area and power. In different operand size modes, groups of the 8×8 multipliers are reconfigured to form 8 8×16 multipliers or 4 8×32 multipliers. The operand size configuration is defined in ACL/CPU mode/control register. The configuration controls are pipelined to the leaf array multiplier module (LAM) in parallel with the data pipeline such that ACL/CPU mode/control register changes do not affect earlier instructions in the RMM pipeline. For pitch-matching with other components in the RMM unit, the width of the LAM approximates 32 flop flip widths in many embodiments.

Leaf Array Module (LAM) Detail (16-Bit) (4300)

Figure 43:
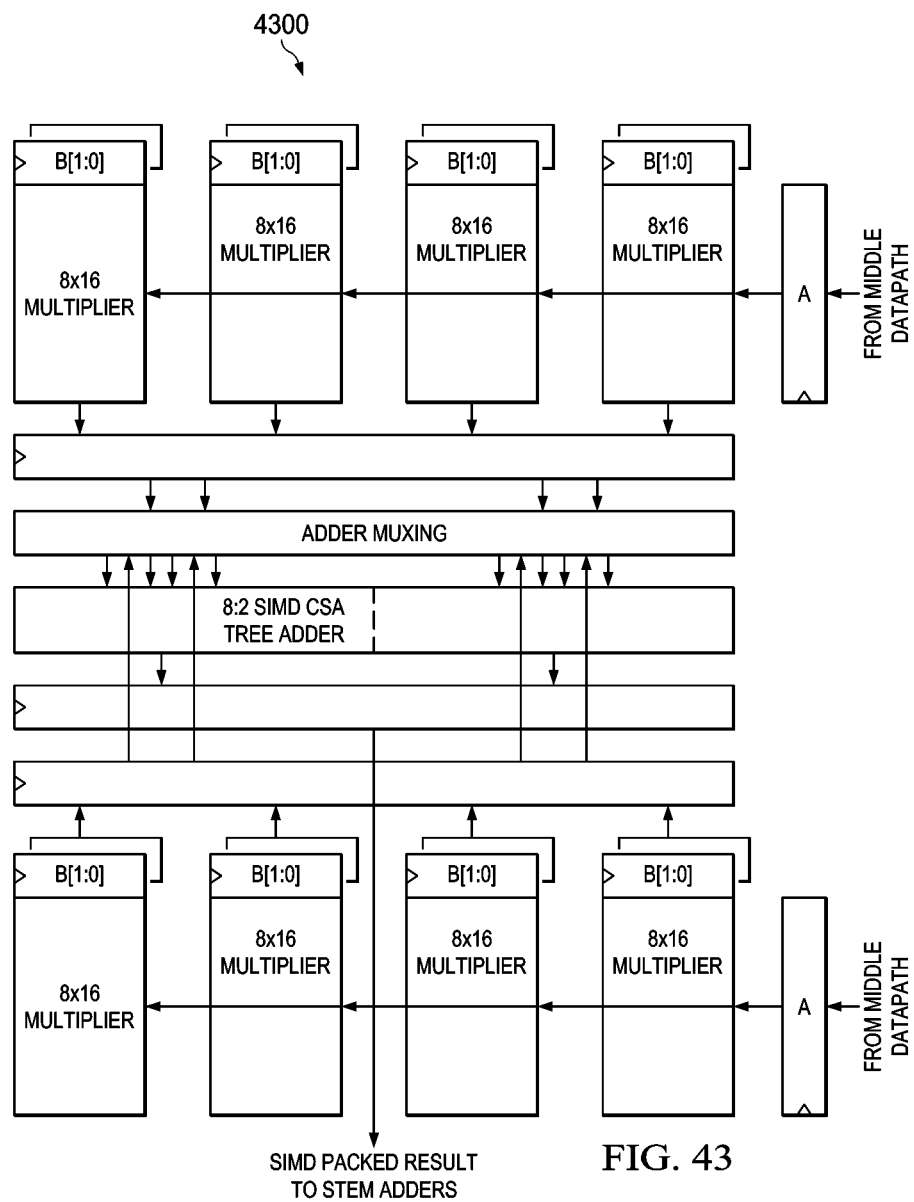
FIG. 43 illustrates a block diagram depicting an integrated circuit (IC) floorplan for a leaf array multiplier module (LAM) implementation (with data path configured as shown in 16×16 multiply mode) useful in some embodiments.

As generally depicted in FIG. 43 (4300), in 16-bit mode, pairs of vertically adjacent 8×8 multipliers are reconfigured to form a single 8×16 multiplier. In this mode, both the multipliers in the vertical pair share the same 8-bit field of the BMM matrix operand and a 16-bit pre-scaled AMM operand. To form the 16×16 product, the adjacent 8×16 multiplier is connected to the same 16 bit pre-scaled AMM operand. The two 8×16 products are then summed (with appropriate shifts) in the adders that performs the dot product addition. The remaining 6 8×16 multipliers form the remaining 3 16×16 multipliers. The result is two sums of the four 16×16 multiplications.

Leaf Array Module (LAM) Detail (32-Bit) (4400)

Figure 44:
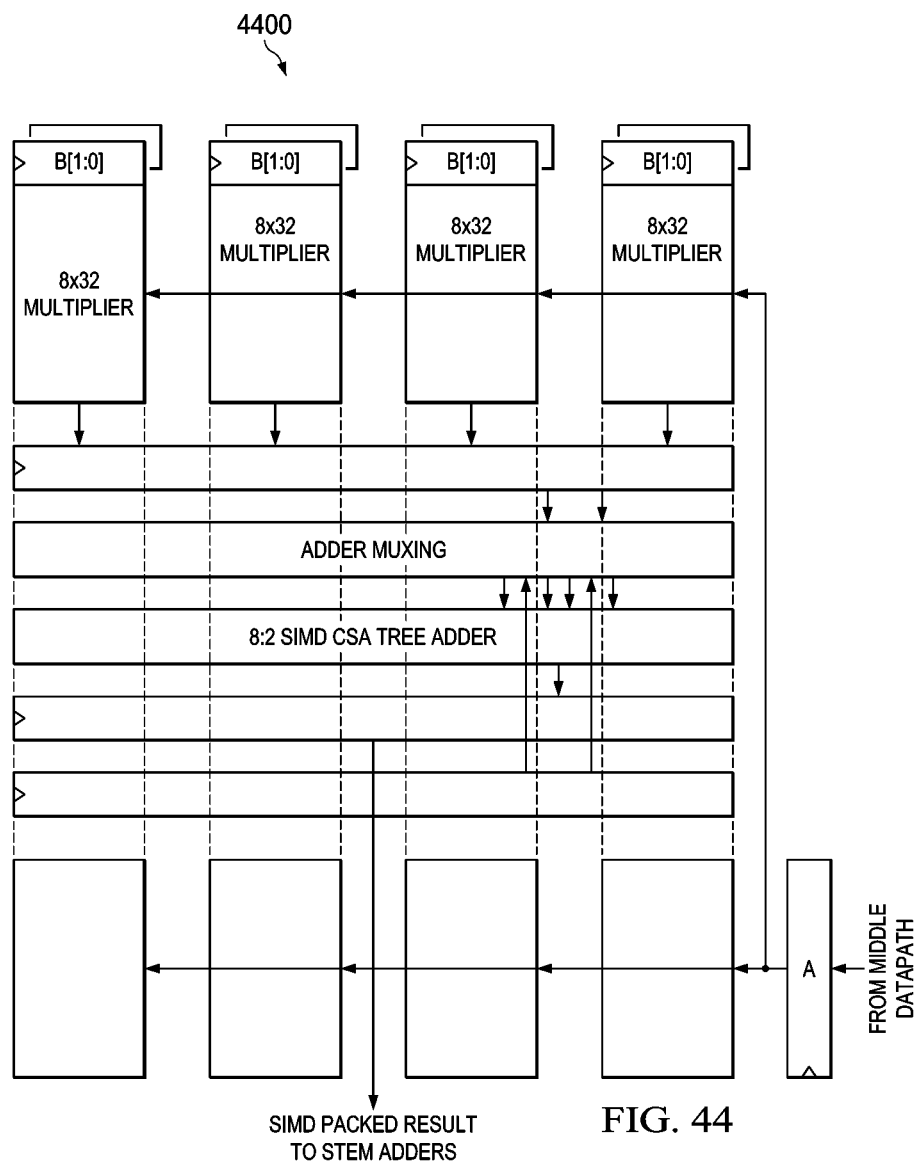
FIG. 44 illustrates a block diagram depicting an integrated circuit (IC) floorplan for a leaf array multiplier module (LAM) implementation (with data path configured as shown in 32×32 multiply mode) useful in some embodiments.

As generally depicted in FIG. 44 (4400), in 32-bit mode, 4 8×8 multipliers in a column are reconfigured to form a single 8×32 multiplier. In this mode, the four multipliers share the same 8-bit field of the BMM matrix operand and a 32-bit pre-scaled AMM operand. To form the 32×32 product, the remaining columns of are connected to the same 32-bit pre-scaled AMM operand. The four 8×32 products are then summed (with appropriate shifts) in the adders that performs the dot product addition in lower-precision formats to produce a single 32×32 product.

Exemplary AMM FSM and Data Path (4500)

In many embodiments the AMM data path includes the following components:
 AMM finite state machine (FSM);
 AMM vector storage;
 AMM vector lookup table;
 AMM vector radix-8 pre-scaling;
 AMM vector pipeline; and
 AMM and BMM vector distribution.

Figure 45:
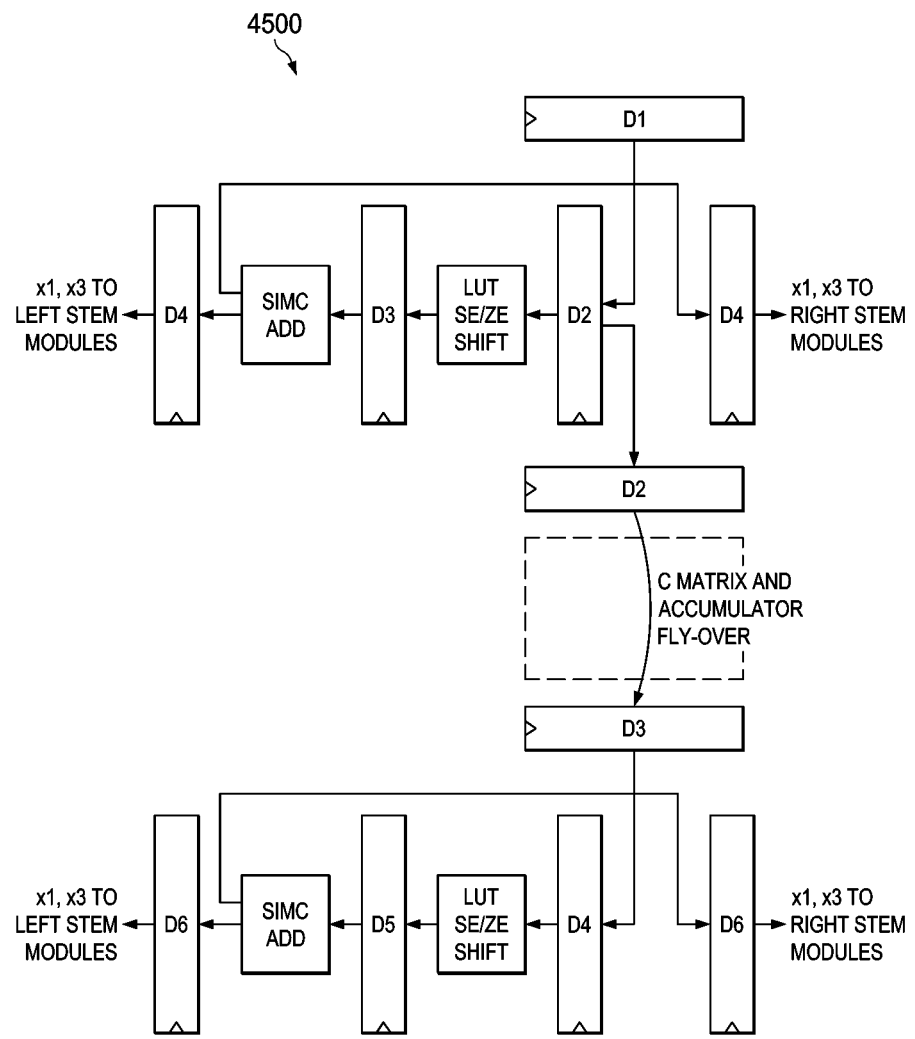
FIG. 45 illustrates an implementation of an AMM middle data path useful in many embodiments.

A typical AMM middle data path is depicted in FIG. 45 (4500).

AMM FSM

Physically the AMM FSM is located in the top interface and control block and computes state updates in the d0 pipeline stage. Control signals are pipelined along with operands.

AMM Vector Storage

The AMM vector storage is a 512 bit register distributed along the center vertical portion of the RMM floorplan. The AMM vector storage elements may be implemented as clock-gated standard cell scanable flip-flops.

AMM Vector Lookup Table

Functionally there may exist one 4-bit to 8-bit expansion lookup table for every 8 bits of the AMM vector, or 64 independent lookups. For implementation, there are 32 3-port lookup tables, each with a broadside write port and two independent read ports. The lookup tables may be constructed from clock-gated scanable flops and each may contain 16 9-bit entries. The lookup tables hold data that must be valid for long periods of time and errors in the lookup tables can lead to systematic errors in matrix calculations. Therefore, one parity bit per 8-bit entry may optionally be computed when the table contents are broadcasted to the 32 copies of the lookup table. Parity is checked on lookup table reads.

AMM Vector Radix-8 Prescaling

For the AMM vector multiplication with the BMM matrix, the same AMM vector element is used to multiply all of the corresponding elements in all the columns of the BMM matrix. For power and area savings, the scaled AMM vector element values used in the Booth multipliers in the array may be pre-computed (pre-scaled) and broadcast across the columns of LMA multipliers by the HMA. For the radix-8 case, the only multiple that is non-trivial is the ×3 weight. The remaining multiples may be computed by the Booth multiplier partial product generator muxes. For the different operand sizes, the ×3 logic can be implemented economically with SIMD carry-break adders.

AMM Vector Pipeline

Two pipeline stages are allocated for AMM vector processing. The first pipeline stage includes the optional lookup operation, sign/zero extension and shift muxing required for the ×3 multiple generation for the supported operand types. The second pipeline stage contains the SIMD binary adders and some allowance for transport delay to the output flops. The output flops of the second pipeline stage are probably duplicated left and right to drive the left and right multiplier arrays of the MMA unit. Slack in the SIMD adder stage can be exchange for additional time for transport delay in the following distribution stage by moving the left/right output flops into the vertical channel between the stem multiplier arrays.

A Vector and B Column-Major Distribution

Physically the AMM vector storage, lookup table and pre-scaling is in the middle vertical section of the MMA unit to help equalize the transport delay of the ×3 and ×1 multiples to the individual multipliers. In column-major loading order for BMM matrix transpose operations there is a distribution network parallel to the AMM vector storage and logic that brings the BMM column data vertically down the middle of the RMM unit and turns to send portions of the B data across all the multiplier columns. Logic in the leaf multiplier module selects the row-major or column-major form of the B matrix data.

BMM FSM and Data Path (4600)-(4800)

BMM FSM

The BMM FSM is physically located in the top interface and control module in the floorplan. State updates are computed in the dl pipeline stage. Control signals are broadcast from the top module down to the stem and leaf arrays and from the middle data path to the left and right side stem arrays.

BMM Row Major Distribution

Figure 46:
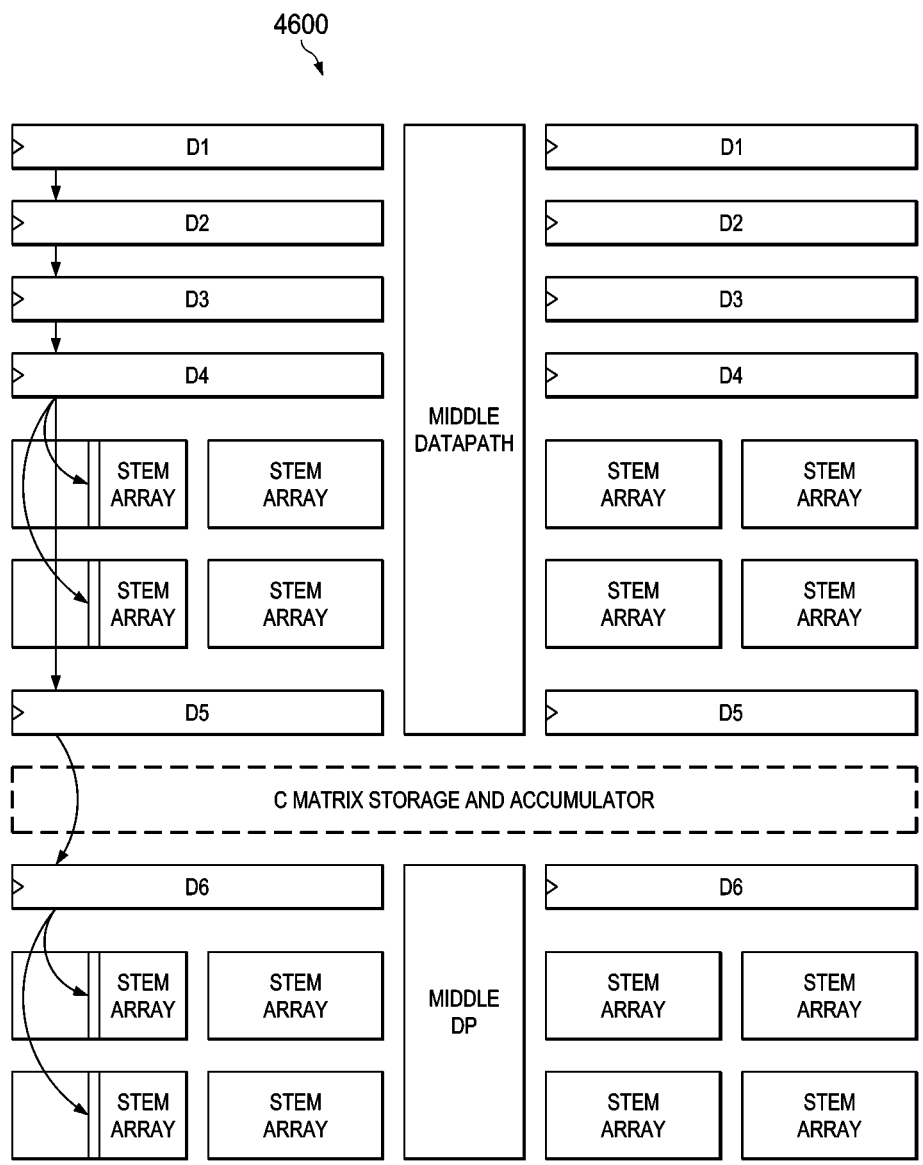
FIG. 46 illustrates an implementation of a row-major BMM distribution data path useful in many embodiments.

As generally depicted in FIG. 46 (4600), BMM matrix rows are loaded into the BMM matrix storage through a network of repeaters that is cycle-matched to the AMM vector distribution. There are several cycle-matching pipeline stages near the top of the floorplan. Once BMM matrix rows are driven to the stem array multiplier (SAM) modules, the next repeater is in the middle horizontal section of the floorplan. A second repeater allows data to travel over the congested area around the accumulator and CPM matrix storage with generous margin. Finally, the data leaving the middle section is broadcast to the remaining stem array multiplier (SAM) module columns.

BMM Matrix Write Enables

Figure 47:
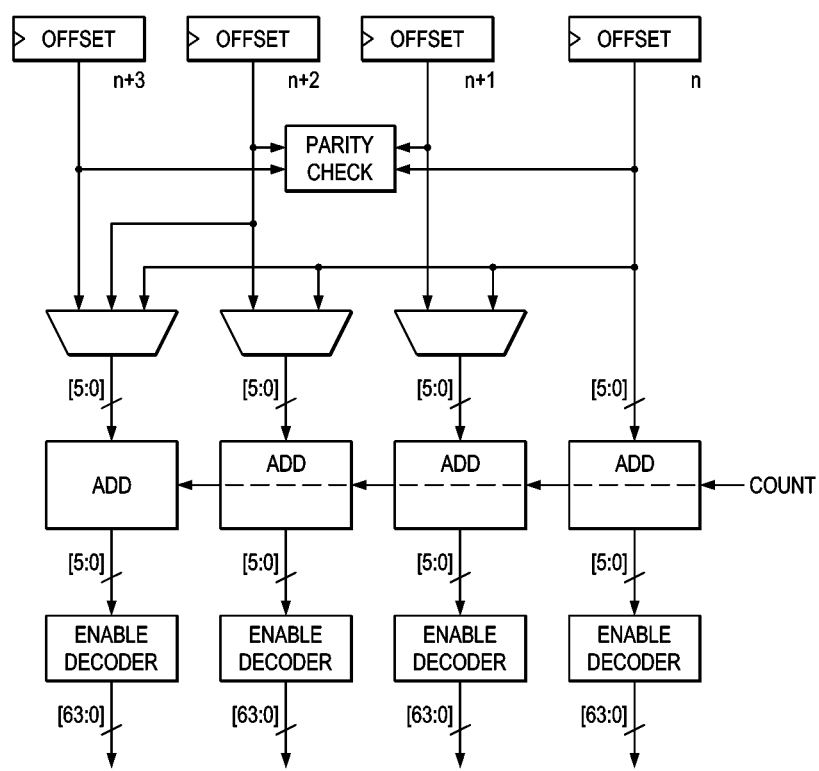
FIG. 47 illustrates a BMM element write enable logic (4-column block)

In cases where BMM matrix storage is updated, 4096 write enables are computed and distributed to the storage elements. The write enable computation depends on write offset values written by the ACL/CPU, the BMM matrix element size, the global offset and the ACL/CPU BMM transposition setting. These offset registers, adders, and decoding logic allow software to have precise control over where elements are loaded into the B matrix. For example, software can set up per-element offsets to quickly load matrix types like sparse or band symmetric matrices. Physically there are two copies of the write enable logic as generally depicted in FIG. 47 (4700): one located horizontally in the control and interface module at the top of the floorplan for row-major order and one located vertically in the middle data path for column-major order. One or the other is enabled and BMM element write enables from both sets of logic are logically ORed to form the final write enable. The same enables control row vs. column data selection in the leaf array. The column offset registers programmed by the ACL/CPU registers may be parity protected. There may be one parity bit per 4 offsets, which is one parity bit per 24 bits of data. The vertical and horizontal copies of the offset registers may have independent parity checking.

Figure 48:
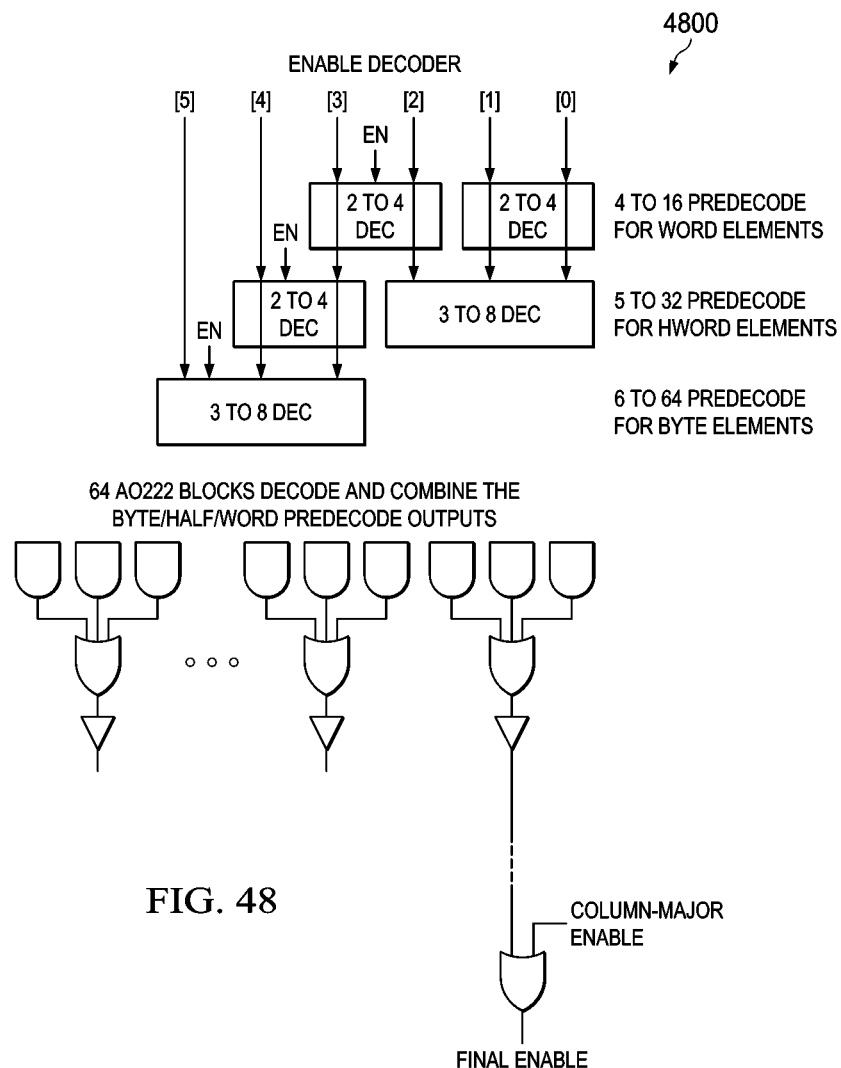
FIG. 48 illustrates a BMM element write enable decoder logic.

The enable logic as depicted in FIG. 48 (4800) is constructed from 4-column blocks that match the stride of the leaf array. The per-column offset fields of ACL/CPU offset registers are muxed to form byte, half word, and word granular enables. The 6-bit output of the muxes is added to the current row or column offset that is maintained by the BMM FSM. That sum is decoded by logic that handles the byte, half word, and word size cases. For each size case there is predecode logic that partitions the bits that participate in the decoding into two sets. The three groups of predecoded signals are then decoded by an array of 64 AO222 functions that logically AND the pairs of predecoded signals.

BMM Matrix Storage

The BMM matrix storage is functionally two banks of 64 entries by 512-bit rows, with a total capacity of 65536 bits (8KiB). The array has a single write port and a single read port. No bypassing is provided from the write to the read port.

Writes to the BMM matrix storage are always 512 bits. Reads from the BMM matrix storage are always the full BMM matrix bank capacity of 32768 bits. The BMM matrix storage elements are typically clock-gated standard cell scanable flip-flops that are physically distributed in the leaf multiplier tiles.

CPM FSM and Data Path (4900)-(5200)

CPM FSM

The CPM FSM is physically located in the top interface and control module in the floorplan. Next state values are computed in the dl pipeline stage. Control signals are pipelined to the middle accumulator and C storage blocks such that control signals are available as dot product components enter the final computation pipeline stages.

CPM Accumulator Data Path (4900)

Figure 49:
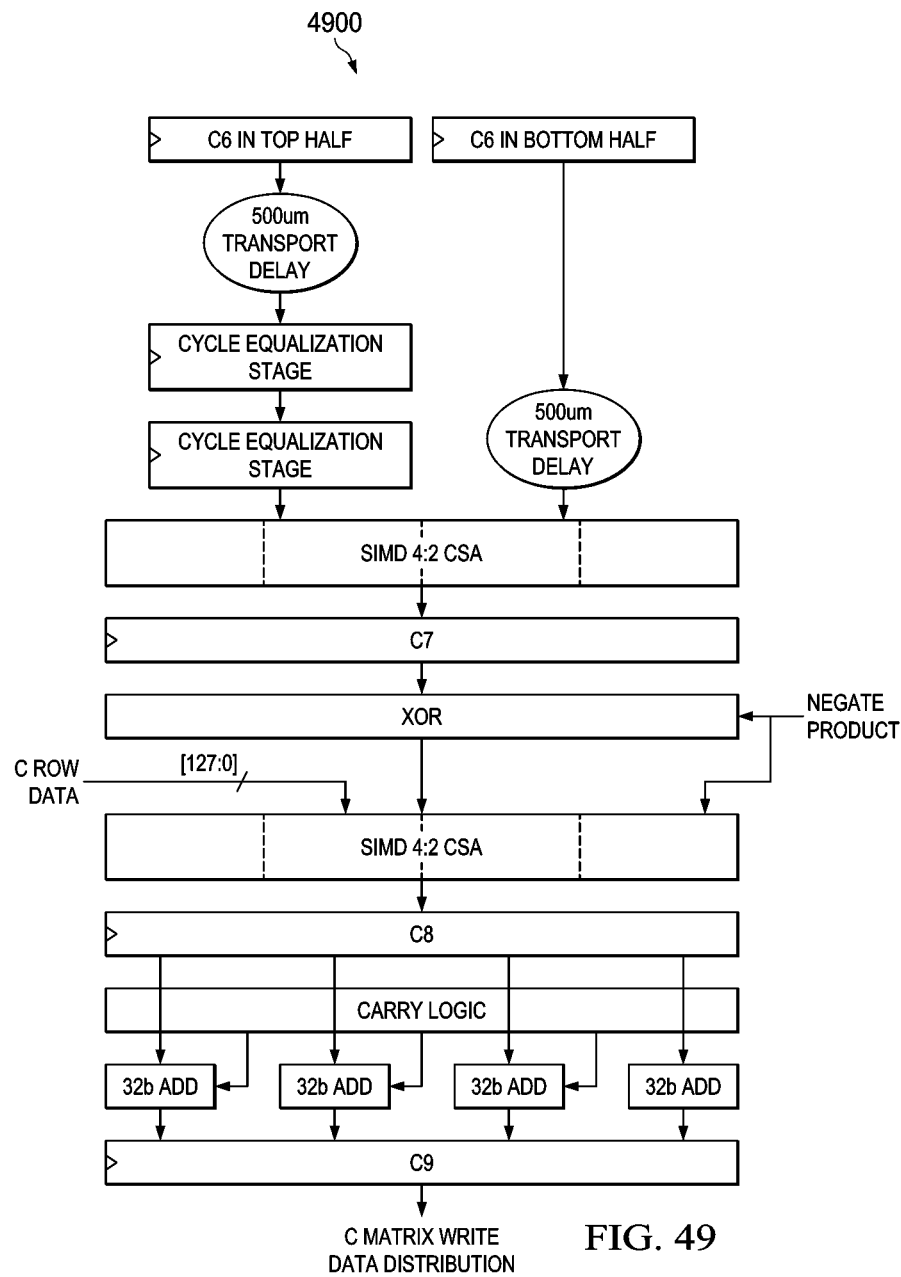
FIG. 49 illustrates a CPM accumulator data path 128$b$ section (1 of 16 sections depicted)

As generally depicted in FIG. 49 (4900), the accumulator data path implements the functions that complete the dot product and combine the dot product with a row from the CPM storage. The outputs of the C6 pipeline registers in the upper and lower halves of the array of stem modules are sent to the middle section of the array. There, two cycles of delay are added to the upper pipeline partial sum to match the time offset in the lower stem modules. The delayed upper sum and lower sum are added with a carry-save 4:2 SIMD adder then registered in pipeline register C7. The output of C7 register is optionally 1's complemented (both the sum and carry) then added, again with a carry save 4:2 SIMD adder (a simplified 4:2 adder with most of the bits configured as a full-adder/half-adder combination). That adder result is captured in the C8 pipeline register. When complementing the C7 register output, the same logical signal that produces the 1's complement is used as a carry into the 12 weight of the SIMD adder to finish the 2's complement for the sum and carry inputs. The C8 pipeline register outputs are still in carry save form. They are converted to binary by a split-carry array composed of four 32-bit binary adders and logic to generate the carry inputs to the 32-bit sections. The carry logic may be moved up to the C7 stage if there is slack. The binary result is written into pipeline register C9. The C9 pipeline register then sends the data destined for the CPM matrix to the CPM matrix data distribution logic.

CPM Load Data Path (5000)

Figure 50:
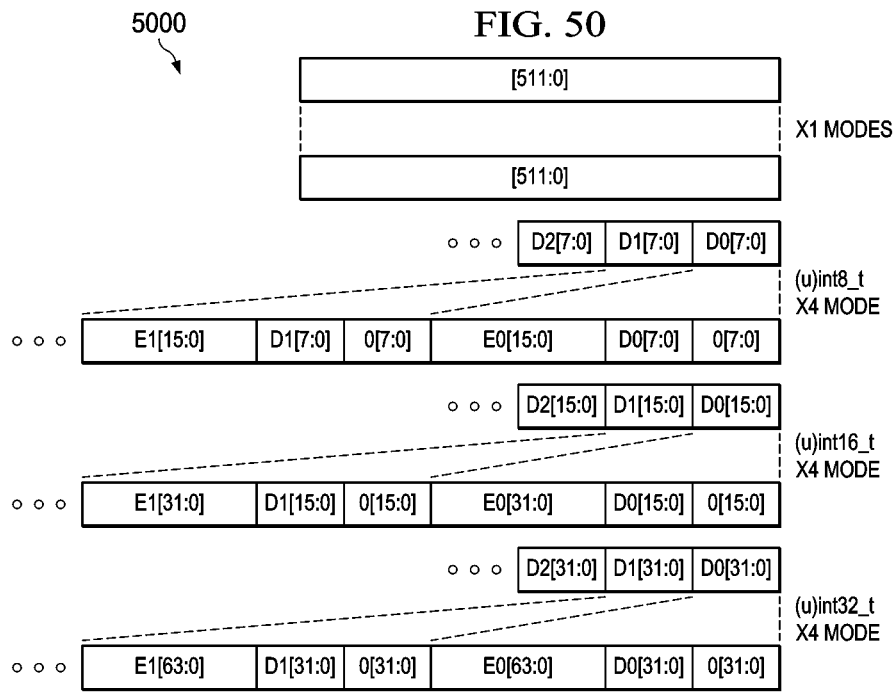
FIG. 50 illustrates a CPM load data formatting data transfer/mapping.

As generally depicted in FIG. 50 (5000), the CPM load data path performs fixed shifting and sign extension to move CPM matrix elements packed in a 512-bit vector in to the 2048-bit CPM storage rows. The options can be implemented with a 4:1 mux or AO2222 structure.

CPM Matrix Storage (5100)

Figure 51:
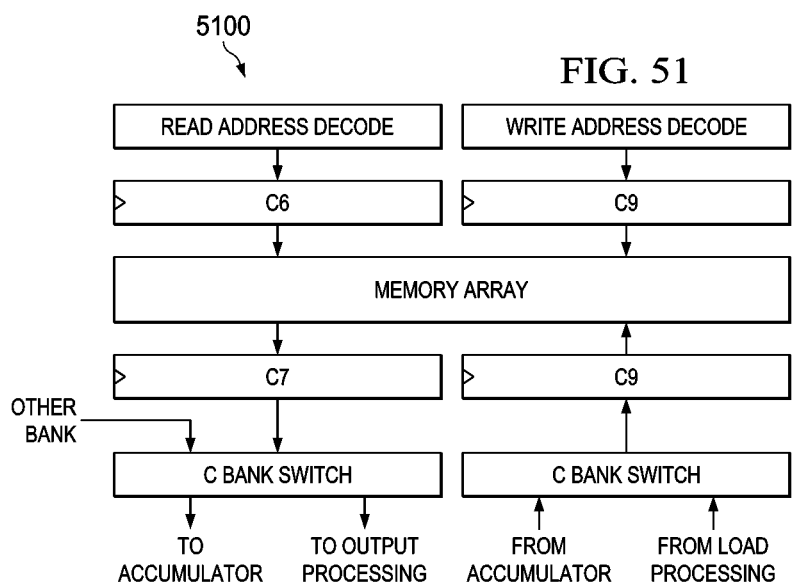
FIG. 51 illustrates a CPM storage pipeline data path.

As generally depicted in FIG. 51 (5100), the CPM matrix storage is functionally two banks of 64 entries by 2048-bit rows, with a total capacity of 262144 bits (32KiB). Each of the banks has an independent read port and an independent write port. No bypassing is typically provided from the write to read port within a bank. C6, C7, and C9 pipeline registers are integrated with the CPM storage.

Figure 52:
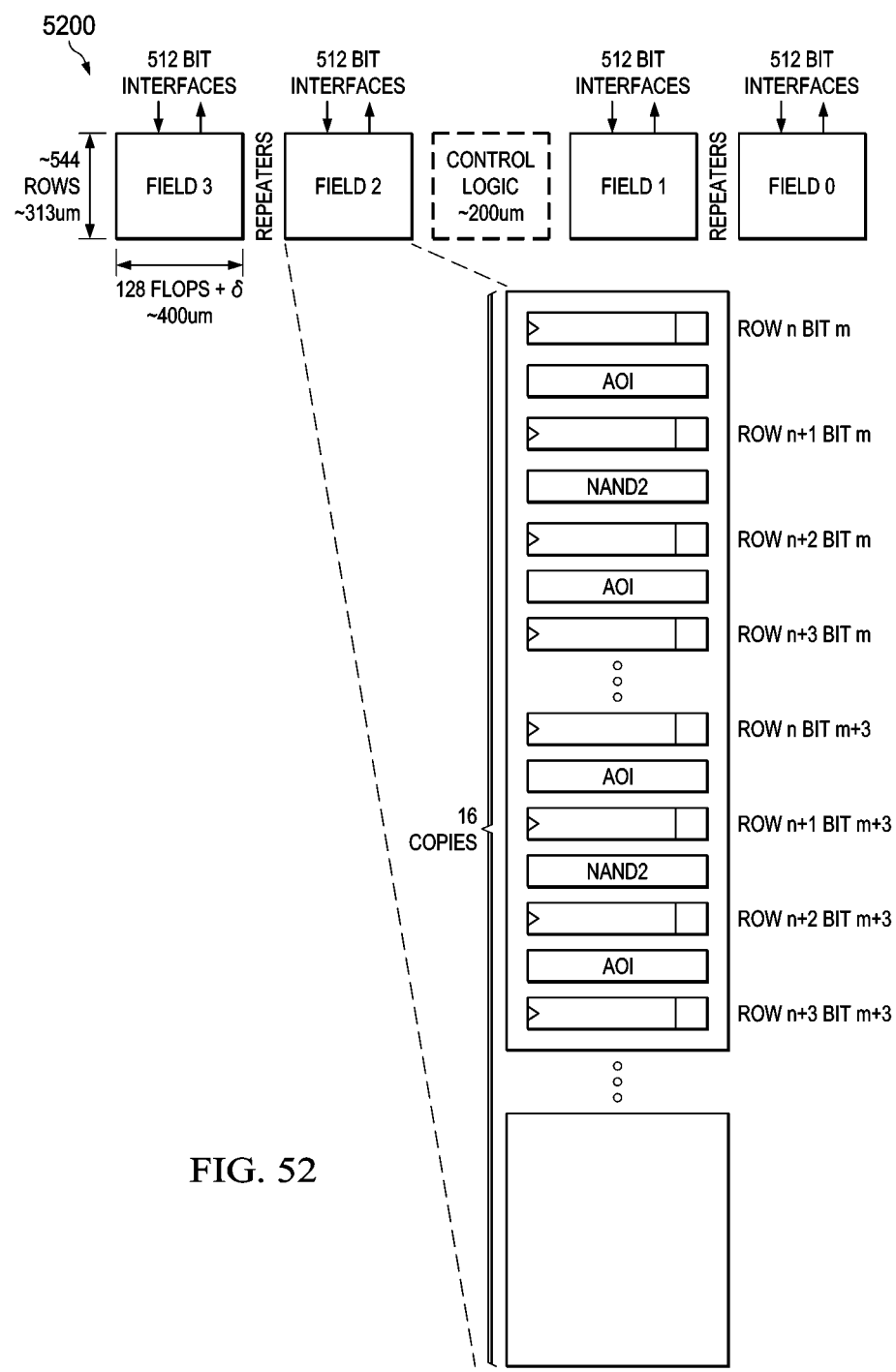
FIG. 52 illustrates a CPM storage bank construction (1 of 2 data banks shown)

As generally depicted in FIG. 52 (5200), writes to the CPM matrix storage rows may be 512 bits aligned on 512-bit boundaries, 1024 bits aligned on 1024-bit boundaries or 2048 bits. The common case is a 2048-bit write from the accumulator logic. Reads from the CPM matrix storage rows may be 512 bits aligned on 512-bit boundaries, 1024 bits aligned on 1024-bit boundaries or 2048 bits. The common cases are a 2048-bit read initiated by the X FSM to move a CPM row through result processing and into the transfer buffer or a 2048-bit read for accumulation with a row-by-matrix product. Physically, the CPM matrix storage is folded and divided 512-bit subfields of the 2048-bit read width. This simplifies the operations that read or write 512-bit granular values. The 512-bit subfields are then folded 4 times such that that the flop-width of each subfield is 128 bits and the total width of the storage flops in the CPM matrix storage is 512 flop-widths. The CPM matrix storage elements are typically clock-gated standard cell scanable flip-flops. The read path is written in RTL to map to AOI gates that combine word-line selects and the flip-flop outputs, followed by NAND/NOR reduction tree bitlines.

Data Transfer (X) FSM and Data Path

The data transfer (X) FSM is physically located in the middle of the array of stem adders, along with the final accumulator and CPM matrix storage. Next state values are computed in the x0 pipeline stage, and control signals related to the transfer buffer are pipelined vertically in the floorplan to the interface and control module where the transfer buffer is located. Output formatting and transfer buffer storage associated with the X FSM has been previously discussed in reference to FIG. 35 (3500)-FIG. 36 (3600).

Exemplary Radix-8 Matrix Multiply Accelerator Multipliers (5300)

In many embodiments the basic 8×8 signed or unsigned integer multiplier building block is a Booth-encoded carry-save implementation. Sometimes Booth-encoded multipliers are referred to as Booth Multipliers. Booth encoding is a technique to reduce the number of partial products in a multiplication and was first published by Andrew D. Booth in 1951 ("A Signed Binary Multiplication Technique" in The Quarterly Journal of Mechanics and Applied Mathematics, Volume IV, Pt. 2, 1951).

The idea behind Booth encoding is to represent a first multiplier operand as a numerically equivalent sum of powers-of-2 scaled by a small set of coefficients. In the case of a radix-8 Booth encoder, the coefficients are {−4,−3,−2,−1,0,1,2,3,4} and these coefficients scale the powers-of-two of the form $2^{(3n)}$. Because the multiplications by powers-of-two can be realized as simple shift operations, the multiplication problem has been reduced to a small number of additions of shifted values scaled by small coefficients.

For example, consider the 8-bit binary 2's complement value $01110110_2$, equal to $118_{10}$. Applying Booth's algorithm, this can be recoded as $(-2*2^0)+(-1*2^3)+(2*2^6)$, which equals $118_{10}$. So, multiplication of an arbitrary value B by $118_{10}$ can be realized by: $(-2*B<<0)+(-1*B<<3)+(2*B<<6)$ where $<<$ is the C programming language left shift operator.

Note that in the case of radix-8 Booth encoding, only one non-trivial coefficient scaling (a multiplication by 3) needs to be computed. Higher radices result in fewer addition terms but a larger set of non-trivial coefficients. One skilled in the art may select a specific radix to optimize for the number of additions, the amount of wiring associated with distributing scaled operands, and the number of logic levels between memory elements.

Figure 53:
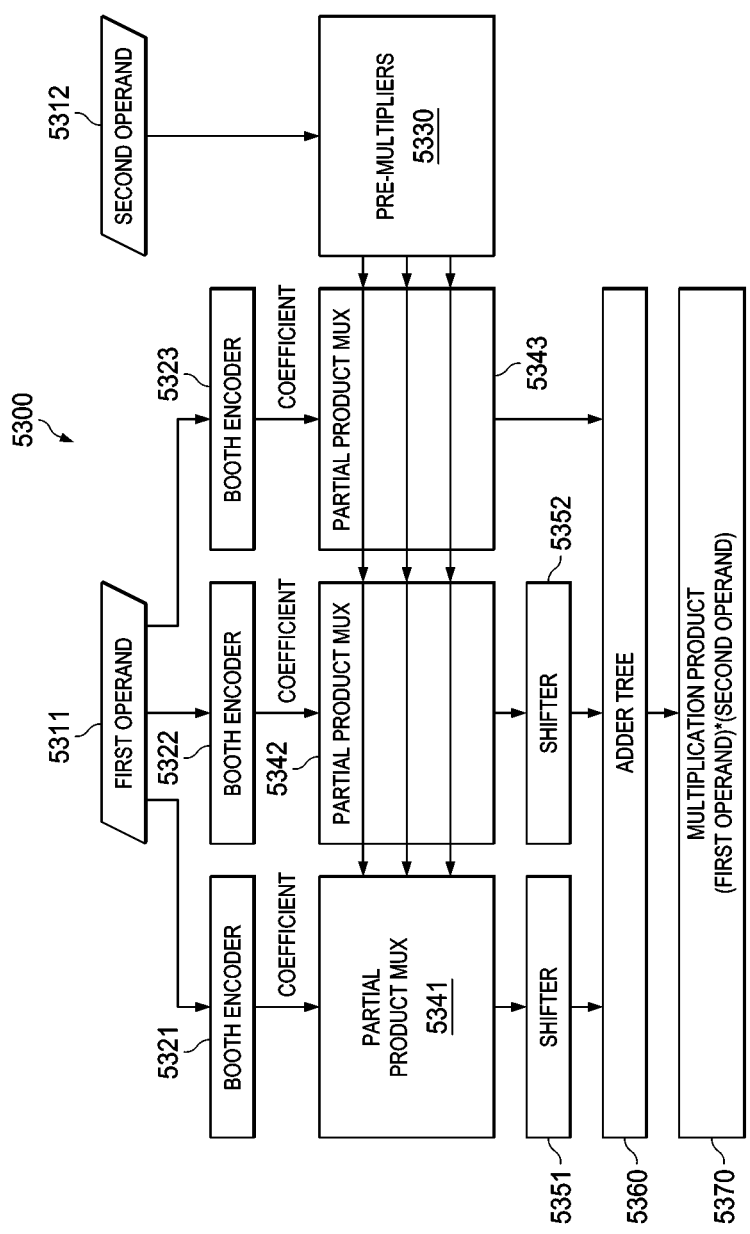
FIG. 53 illustrates a block diagram depicting a basic 8×8 signed or unsigned integer multiplier Booth-encoded carry-save implementation building block used in many radix-8 matrix multipliers.

In common Booth encoded multiplier designs there are several sub-components as illustrated in FIG. 53 (5300). These are the Booth encoders (5321, 5322, 5323), pre-multipliers (5330), partial product multiplexors (5341, 5342, 5343), multiply shifters (5351, 5352) and an adder tree (5360). The Booth encoders (5321, 5322, 5323) implement Booth's algorithm to map a range of a first operand's bits to control lines that correspond to the required coefficients. The pre-multipliers (5330) produce the non-trivial set of coefficients multiplied by a second operand. The partial product multiplexors (5341, 5342, 5343) are responsive to the Booth encoded coefficient controls and select the appropriate value of the second operand multiplied by the Booth encoded coefficient. The adder tree (5360) combines the partial product multiplexor (5341, 5342, 5343) outputs, called partial products, after offsetting the partial products by fixed shifts (5351, 5352) that represent the powers-of-two for each Booth encoded coefficient. The output of the adder tree 5360 is a Multiplication Product 5370.

Adder tree (5360) construction can have many variations. Carry-free addition, either with 3:2 or 4:2 carry save adders or compressors or 4:2 signed digit redundant notation is useful due to the number of serial additions. Many embodiments use 4:2 carry save compressors in an extended binary tree that includes both the partial product additions and the dot product additions that complete the vector row-by-column dot products which compute each result matrix element.

Pre-Multiplied Row Operand Broadcast (5400)

The calculation performed in the matrix multiplier implemented in many embodiments lead to some simplification of the individual multiplier building blocks. Recall that when computing the inner product of a vector on the left by a matrix on the right, each element n of the resulting product vector is the dot product of the vector on the left (AMM) and column ii in the right operand matrix (BMM). Because the same left vector (AMM) is used for all the columns of the right matrix (BMM), each row in the right matrix (BMM) is multiplied by the same element from the left vector (AMM). If the vector elements (AMM) are taken to be the second operand (5312) in FIG. 53 (5300), the pre-multiplier function (5330) can be removed from the individual multipliers and a single copy of the pre-multiplier can broadcast the pre-multiplied values to all the multipliers that are processing the same row of elements from the right matrix (BMM). In large matrix multiplication arrays, the elimination of the per-multiplier pre-multipliers provides useful chip area and power savings.

Figure 54:
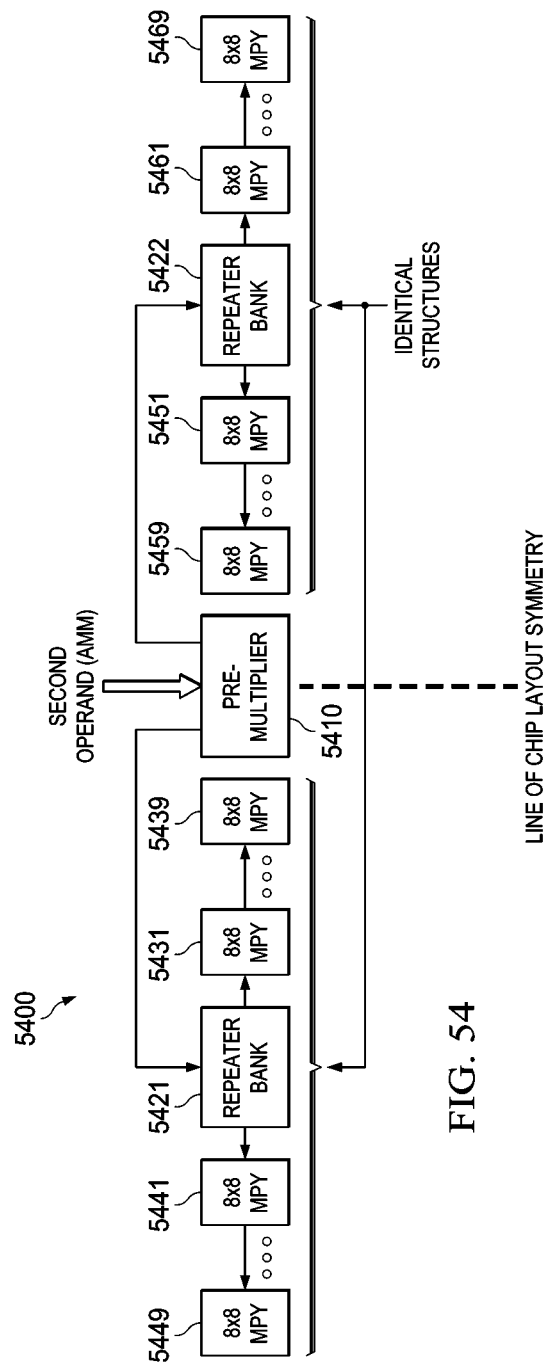
FIG. 54 illustrates a block diagram of an exemplary 8-bit pre-multiplied row operand broadcast layout configuration used in many embodiments.

Furthermore, if this shared pre-multiplier is physically implemented in the middle of a set of multipliers and processes the same row from the right matrix (BMM) then a balanced repeater tree can be constructed such that the number of clock cycles to reach each row element multiplier is constant. Constant operand arrival time simplifies coordinating the activities across the entire matrix multiplication array. FIG. 54 (5400) illustrates this arrangement. Here it can be seen that the second operand is input to the pre-multiplier (5410) whose output is then applied to left/right symmetric repeater banks (5421, 5422) and then routed to symmetrically constructed left pairs of repeated row multipliers (5431, 5439, 5441, 5449) and right pairs of repeated row multipliers (5451, 5459, 5461, 5469)). This physical construction optimizes system timing, reduces dynamic power dissipation, and provides for optimal silicon area consumption for the RMM.

Exemplary Mode/Control Configuration (5500)

While the mode/control interface configuration between the ACL/CPU and RMM may take many forms, the following list of mode/control functions is anticipated within the scope of the present disclosure:
  Scalar bit width and signed/unsigned mode (number of bits in each individual AMM/BMM/CPM vector/matrix entity) (4, 8, 16, 32, 64, 128, 256, etc.);
  Right shift count for CPM output formatting (0 . . . 32);
  Output rounding enabled for CPM output formatting (0 . . . 1);
  Saturation transform enabled for CPM output formatting;
  ReLU transform enabled for CPM output formatting;
  Output lookup translation table (LUT) enabled;
  Input lookup translation table (LUT) enabled;
  Number of CPM bus write cycles for result storage (1 . . . 4) (allows only a portion of the accumulation result to be stored);
  BMM data interpretation as either normal (0) or transposed (1);
  Enable feedback path such that BMM-next=CPM-fore;
  Enable feedback path such that AMM-next=CPM-fore; and
  Enable feedback path such that DSM-next=CPM-fore.

Figure 55:
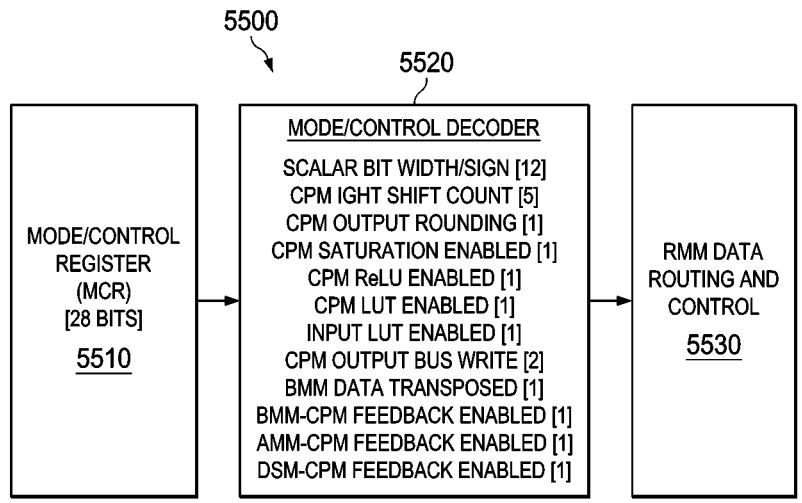
FIG. 55 illustrates a mode/control configuration encoding.

This list is non-exhaustive and in some implementations only a portion of this list may be included based on application context requirements. In some embodiments elements of this list may be incorporated within the RMM function/opcode register. A general depiction of how this mode/control functionality may be encoded in an embodiment of the present disclosure is generally depicted in FIG. 55 (5500) wherein the mode/control register (MCR) (5510) is decoded (5520) prior to data routing and control operations executed by the internal RMM logic (5530). In some circumstances the number of bits in the MCR may be reduced and/or some modes/controls may be eliminated or expanded upon those listed above.

Exemplary Function/Opcode Configuration (5600)

While the function/opcode interface configuration between the ACL/CPU and RMM may take many forms, the following list of mode/control functions is anticipated within the scope of the present disclosure:

CPM=AMM*BMM;

CPM+=AMM*BMM;

CPM=−AMM*BMM;

CPM+=−AMM*BMM;

CPM=AMM*BMM+DSM;

CPM+=AMM*BMM+DSM;

CPM=−AMM*BMM+DSM; and

CPM+=−AMM*BMM+DSM.

Figure 56:
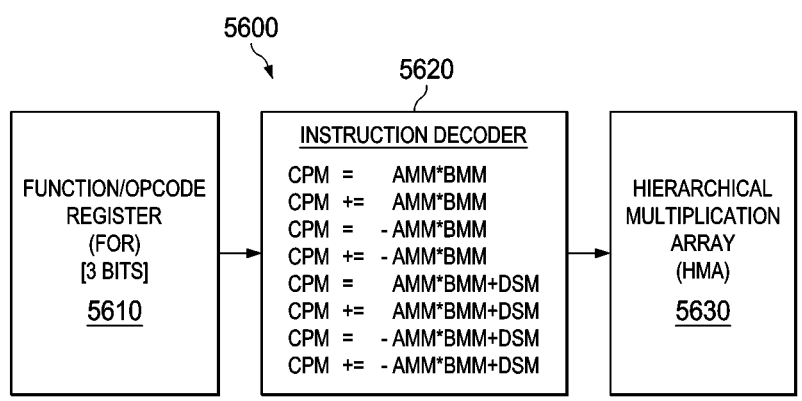
FIG. 56 illustrates a function/opcode configuration encoding.

This list is non-exhaustive and in some implementations only a portion of this list may be included based on application context requirements. In some embodiments elements of this list may be incorporated within the RMM mode/control register. A general depiction of how this instruction set may be encoded in an exemplary embodiment is generally depicted in FIG. 56 (5600) wherein the function/opcode register (FOR) (5610) is decoded (5620) prior to calculation operations executed by the hierarchical multiplication array (HMA) (5630).

Exemplary Performance

In many system embodiments, the RMM is configured as a multiplier that permits an AMM[0,:] row vector to be multiply a BMM[:,:] square matrix to produce a CPM[0,:] dot product row vector. In this configuration, multiple AMM row vectors may be sequentially loaded to produce multiple CPM[:,:] dot product row vectors.

The RMM in this exemplary context computes the vector dot product of row-vector operand AMM with each the columns of matrix operand BMM and accumulates the dot products into a row of matrix CPM with a throughput of one clock cycle. These operations can be sustained indefinitely.

For 8-bit operands there are 64 elements in row vector AMM and 4096 elements in square matrix BMM resulting in a requirement for 4096 multiplications and the equivalent of 4096 summations per clock cycle. The intermediate dot product summations are accomplished without rounding or overflow.

For 16-bit operands there are 32 elements in row vector AMM and 1024 elements in square matrix BMM resulting in a requirement for 1024 multiplications and the equivalent of 1024 summations per clock cycle. The intermediate dot product summations are accomplished without rounding or overflow.

For 32-bit operands there are 16 elements in row vector AMM and 256 elements in square matrix BMM resulting in a requirement for 256 multiplications and the equivalent of 256 summations per clock cycle. The intermediate dot product summations are accomplished without rounding or overflow.

For 64-bit operands there are 8 elements in row vector AMM and 64 elements in square matrix BMM resulting in a requirement for 64 multiplications and the equivalent of 64 summations per clock cycle. The intermediate dot product summations are accomplished without rounding or overflow.

System Summary

The presently disclosed system may be broadly generalized as a reconfigurable matrix multiplier (RMM) system comprising:
(a) mode/control register (MCR);
(b) function/opcode register (FOR);
(c) external memory data bus (EMB);
(d) data translation buffer (DTB);
(e) local memory data bus (LMB);
(f) A-multiplier-matrix (AMM) registered storage memory;
(g) B-multiplicand-matrix (BMM) registered storage memory;
(h) C-product-matrix (CPM) registered storage memory;
(i) hierarchical multiplication array (HMA); and
(j) output data formatter (ODF);
wherein:
the EMB interfaces external data memory (EDM) to the DTB;
the DTB interfaces the EMB to the LMB;
the LMB is selectively electrically coupled to the AMM;
the LMB is selectively electrically coupled to the BMM;
the LMB is selectively electrically coupled to the CPM;
the ODF interfaces the EMB to the CPM;
the EMB has an external memory data width (EMW) value equal to two-to-the-power-E, where the E is a natural number;
the LMB has a local memory data width (LMW) value equal to a positive integer multiple of two-to-the-power-L, where the L is a natural number;
the EMW is evenly divisible by the LMW such that an external-to-local-bus-width ratio value (ELR) of the EMW to the LMW is a bipolygonal number;
the LMW has a value determined based on data stored in the MCR;
the AMM includes a registered storage memory matrix having at least one row;
the AMM has a number of data bits in each row equal to the EMW;
the BMM includes a BMM-fore registered storage memory and a BMM-back registered storage memory each organized as a matrix having a number of rows equal to the ELR value;
the BMM has a number of data bits in each of the ELR rows equal to the EMW value;
the CPM includes a CPM-fore registered storage memory and a CPM-back registered storage memory each organized as a matrix having at least one row;
the CPM has a number of data bits in each row equal to a bipolygonal multiple of the EMW value;
the HMA includes a square array of stem array multiplier (SAM) modules;
the SAM modules each includes a square array of leaf array multiplier (LAM) modules;
the LAM modules each includes square array of 8-bit× 8-bit multiplier (EEM) modules;
the HMA reconfigures data path interconnections between the AMM, the BMM-fore, and the CPM-fore registered storage memories and the SAM modules, the LAM modules, and the EEM modules based on data stored in the MCR;
the HMA calculates a multiplication/accumulation registered result (MAR) generated by the SAM modules, the LAM modules, and the EEM modules based on data stored in the FOR;
the HMA calculation includes a simultaneous dot product of a row of the AMM-fore and one or more columns of the BMM-fore to produce a resulting CPM-fore row vector result;
the BMM-back loads a matrix row from the LMB during the HMA calculation; the ODF transforms a registered row result of the CPM-back comprising a previously calculated dot product from an initial data format (IDF) to an output data format (ODF) to generate a transformed multiplication/accumulation result (TMR);
the ODF includes a register that transfers the TMR to the EMB during the HMA calculation;
the BMM-fore and the BMM-back swap their respective functions as calculation and data transfer registers during alternate cycles of each the HMA calculation; and
the CPM-fore and the CPM-back swap their respective functions as calculation and data transfer registers during alternate cycles of each the HMA calculation.

This general system summary may be augmented by the various elements described herein to produce a wide variety of embodiments consistent with this overall design description.

Method Summary

The presently disclosed method may be broadly generalized as a reconfigurable matrix multiplier (RMM) method operating on a reconfigurable matrix multiplier (RMM) system, the system comprising:
(a) mode/control register (MCR);
(b) function/opcode register (FOR);
(c) external memory data bus (EMB);
(d) data translation buffer (DTB);
(e) local memory data bus (LMB);
(f) A-multiplier-matrix (AMM) registered storage memory;
(g) B-multiplicand-matrix (BMM) registered storage memory;
(h) C-product-matrix (CPM) registered storage memory;
(i) hierarchical multiplication array (HMA); and
(j) output data formatter (ODF);
wherein:
the EMB interfaces external data memory (EDM) to the DTB;
the DTB interfaces the EMB to the LMB;
the LMB is selectively electrically coupled to the AMM;
the LMB is selectively electrically coupled to the BMM;
the LMB is selectively electrically coupled to the CPM;
the ODF interfaces the EMB to the CPM;

the EMB has an external memory data width (EMW) value equal to two-to-the-power-E, where the E is a natural number;

the LMB has a local memory data width (LMW) value equal to a positive integer multiple of two-to-the-power-L, where the L is a natural number;

the EMW is evenly divisible by the LMW such that an external-to-local-bus-width ratio value (ELR) of the EMW to the LMW is a bipolygonal number;

the LMW has a value determined based on data stored in the MCR;

the AMM includes a registered storage memory matrix having at least one row;

the AMM has a number of data bits in each row equal to the EMW;

the BMM includes a BMM-fore registered storage memory and a BMM-back registered storage memory each organized as a matrix having a number of rows equal to the ELR value;

the BMM has a number of data bits in each of the ELR rows equal to the EMW value;

the CPM includes a CPM-fore registered storage memory and a CPM-back registered storage memory each organized as a matrix having at least one row;

the CPM has a number of data bits in each row equal to a bipolygonal multiple of the EMW value;

the HMA includes a square array of stem array multiplier (SAM) modules;

the SAM modules each includes a square array of leaf array multiplier (LAM) modules;

the LAM modules each includes square array of 8-bit× 8-bit multiplier (EEM) modules;

wherein the method includes the steps of:

(1) writing one or more rows of BMM matrix data to the EMB;

(2) transferring the BMM matrix data to the BMM-fore registered storage memory;

(3) writing one or more rows of AMM matrix data to the EMB;

(4) transferring the AMM matrix data to the AMM registered storage memory;

(5) with the HMA, reconfiguring data path interconnections between the AMM, the BMM-fore, and the CPM-fore registered storage memories and the SAM modules, the LAM modules, and the EEM modules based on data stored in the MCR;

(6) with the HMA, calculating a multiplication/accumulation registered result (MAR) generated by the SAM modules, the LAM modules, and the EEM modules wherein the HMA calculation includes a simultaneous dot product of a row of the AMM-fore and one or more columns of the BMM-fore to produce a resulting CPM-fore row vector result;

(7) transferring a matrix row from the LMB to the BMM-back during the HMA calculation;

(8) with the ODF, transforming a registered result of the CPM-back from an initial data format (IDF) to an output data format (ODF) based on registered data contained in the FOR to generate a transformed multiplication/accumulation result (TMR);

(9) with the ODF, transferring the TMR to the EMB;

(10) swapping the BMM-fore and the BMM-back respective functions as calculation and data transfer registers during alternate cycles of each the HMA calculation; and

(11) swapping the CPM-fore and the CPM-back respective functions as calculation and data transfer registers during alternate cycles of each the HMA calculation.

This general method may be modified depending on a number of factors, with rearrangement and/or addition/deletion of steps within the scope of this disclosure. Integration of this and other embodiment methods in conjunction with a variety of embodiment systems described herein is anticipated by the overall scope of the present disclosure.

System/Method Variations

The present disclosure anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the AMM is configured as a vector having a single row of EMW bits.

An embodiment wherein the EMW is a natural number multiple of 512.

An embodiment wherein the CPM has a number of data bits in each row equal four times the EMW value.

An embodiment wherein the LMW is a natural number multiple of 8.

An embodiment wherein the LMB further includes a multiplexer selector configured to selectively enable loading of the AMM-back registered storage memory from the CPM-fore registered storage memory.

An embodiment wherein the LMB further includes a multiplexer selector configured to selectively enable loading of the BMM-back registered storage memory from the CPM-fore registered storage memory.

An embodiment wherein the LMB further includes a multiplexer selector configured to selectively enable storing of the CPM-back registered storage memory to a D-summation-matrix (DSM) registered storage memory that is summed to the CPM-fore registered storage memory by the HMA.

An embodiment wherein the AMM includes a row vector having N columns and the BMM includes a square matrix of size N rows by N columns wherein the N=two-to-the-power-P minus one (N=$2^{(P-1)}$), where the P is a polygonal number.

An embodiment wherein the DTB further includes a lookup table (LUT) configured to translate data transferred between the EMB and the AMM.

An embodiment wherein the ODF includes sequential data flow through a right shifter, integer rounder, saturation formatter or ReLU formatter, the sequential data flow controlled by data stored in the MCR.

An embodiment wherein the EMB is configured to retrieve data from a hardware interface electrically coupled to a peripheral data source, the peripheral data source selected from a group consisting of: camera; imaging data source; video data source; streaming video source; audio data source; streaming audio source; ultrasonic data source; ultrasonic sensor; radar data source; radar; cryptographic data source; and encrypted data source.

An embodiment wherein the LMB further includes a lookup table (LUT) configured to translate data read from the EMB into data stored in the AMM.

An embodiment wherein the LMB further includes a lookup table (LUT) configured to translate 4-bit data read from the EMB into 8-bit data stored in the AMM.

An embodiment wherein the LMB includes unsigned integer data.

An embodiment wherein the LMB includes signed integer data.

An embodiment wherein the AMM includes a row vector and the BMM includes a square matrix.

An embodiment wherein the LMB transfers data to said BMM in row-major order.

An embodiment wherein the LMB transfers data to said BMM in column-major order.

An embodiment wherein the LMB transfers data to said BMM at an offset in said BMM based on the contents of a transfer offset register (TOR).

An embodiment wherein the LMB is configurable to transfer data simultaneously to said BMM and said CMM.

An embodiment wherein the HMA reconfigures data path interconnections between said AMM and said LAM modules to broadcast pre-scaled data from said AMM to said LAM modules.

One skilled in the art will recognize that other embodiments are possible based on any combination of elements taught within the above disclosure description.

Generalized Computer Usable Medium

In various alternate embodiments, the present disclosure may be implemented as a computer program product for use with a computerized computing system. Those skilled in the art will readily appreciate that programs defining the functions defined by the present disclosure can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present disclosure methods, such computer readable media represent alternate embodiments of the present disclosure.

As generally illustrated herein, the present disclosure system embodiments can incorporate a variety of computer readable media that include computer usable medium having computer readable code means embodied therein. One skilled in the art will recognize that the software associated with the various processes described herein can be embodied in a wide variety of computer accessible media, including tangible and non-transitory forms of such media, from which the software is loaded and activated.

CONCLUSION

A reconfigurable matrix multiplier (RMM) system/method allowing tight or loose coupling to supervisory control processor application control logic (ACL) in a system-on-a-chip (SOC) environment has been disclosed. The RMM provides for C=A*B matrix multiplication operations having A-multiplier-matrix (AMM), B-multiplicand-matrix (BMM), and C-product-matrix (CPM), as well as C=A*B+D operations in which D-summation-matrix (DSM) represents the result of a previous multiplication operation or another previously defined matrix. The RMM provides for additional CPM LOAD/STORE paths allowing overlapping of compute/data transfer operations and provides for CPM data feedback to the AMM or BMM operand inputs from a previously calculated CPM result. The RMM anticipates the use of 8, 16, and 32-bit operand reconfigurable matrix datum in conjunction with a typical external memory bus data width of 512 bits and an instruction control unit (ICU) implemented using a series of RMM configuration words (RCW) and streaming opcode functions (SOF).

What is claimed is:

1. A system comprising:
a buffer;
a first multiplier-matrix memory configured to store a first multiplier matrix;
a first multiplicand-matrix memory configured to store a first multiplicand matrix;
a first product-matrix memory;
a second multiplier-matrix memory;
a second multiplicand-matrix memory;
a second product-matrix memory; and
a matrix multiplier coupled to the first multiplier-matrix memory buffer, the first multiplicand-matrix memory, the first product-matrix memory, the second multiplier-matrix memory, the second multiplicand-matrix memory, and the second product-matrix memory, the matrix multiplier configured to:
calculate first dot products of a first row of the first multiplier matrix and columns of the first multiplicand matrix to produce a first row of a first product matrix to be stored in the first product-matrix memory;
during calculation of the first dot products, load the second multiplicand-matrix memory with a second multiplicand matrix;
calculate second dot products of a first row of a second multiplier matrix and columns of the second multiplicand matrix to produce a first row of a second product matrix to be stored in the second product-matrix memory; and
during calculation of the second dot products:
load the first multiplicand-matrix memory with a third multiplicand matrix; and
transfer the first row of the first product matrix to an external memory bus to be stored in external memory.

2. The system of claim 1, wherein the matrix multiplier is configured to generate reduced-bit first dot products by performing bit processing on the first dot products.

3. The system of claim 1, wherein each of the first multiplier matrix and the second multiplier matrix includes a row vector including having N columns and each of the first multiplicand matrix, the second multiplicand matrix, and the third multiplicand matrix includes a square matrix including N rows and N columns wherein N is equivalent to two raised to a power of a quantity of P minus one, wherein P includes a polygonal number.

4. The system of claim 1, wherein the matrix multiplier is configured to (a) transfer the first multiplicand matrix and the third multiplicand matrix to the first multiplicand-matrix memory in row-major order and (b) transfer the second multiplicand matrix to the second multiplicand-matrix memory in row-major order.

5. The system of claim 1, wherein the matrix multiplier is configured to (a) transfer the first multiplicand matrix and the third multiplicand matrix to the first multiplicand-matrix memory in column-major order and (b) transfer the second multiplicand matrix to the second multiplicand-matrix memory in column-major order.

6. The system of claim 1, wherein the matrix multiplier is configured to (a) transfer the first multiplicand matrix and the third multiplicand matrix to the first multiplicand-matrix memory at a first offset and (b) transfer the second multiplicand matrix to the second multiplicand-matrix memory at a second offset.

7. The system of claim 1, wherein the matrix multiplier is configured to:
load the first multiplicand-matrix memory with the third multiplicand matrix; and
transfer the first row of the first product matrix to the external memory bus in parallel.

8. The system of claim 1, wherein the first multiplier matrix is equivalent to the second multiplier matrix.

9. The system of claim 1, wherein the matrix multiplier is configured to, during calculation of the first dot products, load the second multiplier-matrix memory with the second multiplier matrix.

10. The system of claim 1, wherein the matrix multiplier is configured to, during calculation of the second dot products, load the first multiplier-matrix memory with a third multiplier matrix.

11. A storage disk or storage device comprising instructions that when executed cause one or more processors to at least:
calculate first dot products of a first row of a first multiplier matrix stored in a first multiplier-matrix memory and columns of a first multiplicand matrix stored in a first multiplicand-matrix memory to produce a first row of a first product matrix to be stored in a first product-matrix memory;
during calculation of the first dot products, load a second multiplicand-matrix memory with a second multiplicand matrix;
calculate second dot products of a first row of a second multiplier matrix and columns of the second multiplicand matrix to produce a first row of a second product matrix to be stored in a second product-matrix memory; and
during calculation of the second dot products:
load the first multiplicand-matrix memory with a third multiplicand matrix; and
transfer the first row of the first product matrix to an external memory bus to be stored in external memory.

12. The storage disk or storage device of claim 11, wherein the instructions, when executed, cause the one or more processors to generate reduced-bit first dot products by performing bit processing on the first dot products.

13. The storage disk or storage device of claim 11, wherein each of the first multiplier matrix and the second multiplier matrix includes a row vector including N columns and each of the first multiplicand matrix, the second multiplicand matrix, and the third multiplicand matrix includes a square matrix including N rows and N columns wherein N is equivalent to two raised to a power of a quantity of P minus one, wherein P includes a polygonal number.

14. The storage disk or storage device of claim 11, wherein the instructions, when executed, cause the one or more processors to:
transfer the first multiplicand matrix and the third multiplicand matrix to the first multiplicand-matrix memory in row-major order; and
transfer the second multiplicand matrix to the second multiplicand-matrix memory in row-major order.

15. The storage disk or storage device of claim 11, wherein the instructions, when executed, cause the one or more processors to:
transfer the first multiplicand matrix and the third multiplicand matrix to the first multiplicand-matrix memory in column-major order; and
transfer the second multiplicand matrix to the second multiplicand-matrix memory in column-major order.

16. The storage disk or storage device of claim 11, wherein the instructions, when executed, cause the one or more processors to:
transfer the first multiplicand matrix and the third multiplicand matrix to the first multiplicand-matrix memory at a first offset; and
transfer the second multiplicand matrix to the second multiplicand-matrix memory at a second offset.

17. The storage disk or storage device of claim 11, wherein the instructions, when executed, cause the one or more processors to:
load the first multiplicand-matrix memory with the third multiplicand matrix; and
transfer the first row of the first product matrix to the external memory bus in parallel.

18. The storage disk or storage device of claim 11, wherein the first multiplier matrix is equivalent to the second multiplier matrix.

19. The storage disk or storage device of claim 11, wherein the instructions, when executed, cause the one or more processors to, during calculation of the first dot products, load a second multiplier-matrix memory with the second multiplier matrix.

20. The storage disk or storage device of claim 11, wherein the instructions, when executed, cause the one or more processors to, during calculation of the second dot products, load the first multiplier-matrix memory with a third multiplier matrix.

* * * * *